(12) United States Patent
DeLizio

(10) Patent No.: US 10,753,754 B2
(45) Date of Patent: Aug. 25, 2020

(54) MANAGING AUTONOMOUS VEHICLES

(71) Applicant: Andrew DeLizio, Cypress, TX (US)

(72) Inventor: Andrew DeLizio, Cypress, TX (US)

(73) Assignee: Andrew DeLizio, Cypress, TX (US)

(*) Notice: Subject to any disclaimer, the term of this patent is extended or adjusted under 35 U.S.C. 154(b) by 85 days.

(21) Appl. No.: 15/875,868

(22) Filed: Jan. 19, 2018

(65) Prior Publication Data

US 2018/0202822 A1     Jul. 19, 2018

Related U.S. Application Data

(60) Provisional application No. 62/465,491, filed on Mar. 1, 2017, provisional application No. 62/454,444, filed on Feb. 3, 2017, provisional application No. 62/448,183, filed on Jan. 19, 2017.

(51) Int. Cl.
| | |
|---|---|
| *G01C 21/34* | (2006.01) |
| *G01C 21/36* | (2006.01) |
| *G05D 1/02* | (2020.01) |
| *B60R 25/24* | (2013.01) |
| *G06Q 10/02* | (2012.01) |
| *G06Q 30/06* | (2012.01) |

(52) U.S. Cl.
CPC .......... *G01C 21/3438* (2013.01); *B60R 25/24* (2013.01); *G01C 21/3407* (2013.01); *G01C 21/362* (2013.01); *G05D 1/0276* (2013.01); *G05D 1/0291* (2013.01); *G06Q 10/02* (2013.01); *G06Q 30/0645* (2013.01); *G05D 2201/0213* (2013.01)

(58) Field of Classification Search
CPC ............ G01C 21/3438; G01C 21/3407; G01C 21/362; G05D 1/0276; G05D 1/0291; G05D 2201/0207; G05D 2201/0213; G06Q 10/02; G06Q 30/0645; B60C 23/0479; B60K 2370/175; B60R 25/24
USPC .......................................................... 701/23
See application file for complete search history.

(56) References Cited

U.S. PATENT DOCUMENTS

| | | | | |
|---|---|---|---|---|
| 6,237,647 B1* | 5/2001 | Pong | .................... | B67D 7/0401 |
| | | | | 141/231 |
| 6,338,008 B1* | 1/2002 | Kohut | ....................... | B60S 5/02 |
| | | | | 235/381 |
| 9,606,539 B1* | 3/2017 | Kentley | ................. | G01S 17/023 |
| 9,811,086 B1* | 11/2017 | Poeppel | ................ | G07C 5/0808 |
| 9,817,400 B1* | 11/2017 | Poeppel | ................ | G06Q 10/20 |
| 10,042,359 B1* | 8/2018 | Konrardy | ................ | B60L 58/12 |
| 10,049,505 B1* | 8/2018 | Harvey | .................. | G07C 5/008 |
| 10,354,478 B2* | 7/2019 | Guo | ..................... | B67D 7/0401 |

(Continued)

*Primary Examiner* — Muhammad Shafi
(74) *Attorney, Agent, or Firm* — DeLizio Law, PLLC

(57) ABSTRACT

In some embodiments, a method for an autonomous vehicle obtaining services can include: detecting, by the autonomous vehicle, a need for service; sending, over a network interface of the autonomous vehicle, a request for service; determining a rendezvous location at which service will be received; maneuvering, by the autonomous vehicle, to the rendezvous location; receiving, by the autonomous vehicle over a network, an authentication code; in response to receiving the authentication code, enabling, by the autonomous vehicle, access to components of the autonomous vehicle; determining, by the autonomous vehicle, that the service is complete; and transmitting, by the autonomous vehicle, an indication that the service is complete.

10 Claims, 46 Drawing Sheets

(56) References Cited

U.S. PATENT DOCUMENTS

| | | | |
|---|---|---|---|
| 2015/0348335 A1* | 12/2015 | Ramanujam | G07C 5/006 |
| | | | 701/23 |
| 2016/0123754 A1* | 5/2016 | Li | G01C 21/3469 |
| | | | 701/123 |
| 2016/0139600 A1* | 5/2016 | Delp | B67D 7/04 |
| | | | 701/26 |
| 2016/0247143 A1* | 8/2016 | Ghosh | G06Q 20/3278 |
| 2016/0332535 A1* | 11/2016 | Bradley | B60N 2/002 |
| 2017/0174221 A1* | 6/2017 | Vaughn | G05D 1/0221 |
| 2017/0193627 A1* | 7/2017 | Urmson | G01C 21/3617 |
| 2017/0316635 A1* | 11/2017 | Guo | G05D 1/0088 |
| 2018/0202822 A1* | 7/2018 | DeLizio | G01C 21/3407 |
| 2018/0240288 A1* | 8/2018 | Samper | G07C 5/006 |

\* cited by examiner

| AUTONOMOUS VEHICLE | FLEET CONTROLLER | RIDE SERVICE CONTROLLER |
|---|---|---|
| 1. DETECT NEED FOR SERVICE<br>2. SEND SERVICE REQUEST | | |
| | 3. RECEIVE SERVICE REQUEST<br>4. PUBLISH SERVICE REQUEST TO MOBILE DEVICES | |
| | | 5. PRESENT SERVICE REQUEST IN GUI<br>6. RECEIVE AN INDICATION OF ACCEPTANCE OF SERVICE REQUEST<br>7. SEND INDICATION OF ACCEPTANCE OF THE SERVICE REQUEST |
| | 8. RECEIVE ACCEPTANCE OF THE SERVICE REQUEST<br>9. SEND AUTHENTICATION CODE | |
| | | 10. RECEIVE AUTHENTICATION CODE |
| 11. DRIVE TO SERVICE RENDEZVOUS POINT AND REQUEST AUTHENTICATION CODE | | |
| | | 12. SEND AUTHENTICATION CODE TO AV OVER PERSONAL AREA NETWORK (E.G. BLUETOOTH) |
| 13. RECEIVE AND VERIFY AUTHENTICATION CODE<br>14. ENABLE ACCESS TO COMPONENTS | | |
| | | 15. SEND INDICATION OF SERVICE STATUS (E.G., SERVICE COMPLETE) |
| | 16. RECEIVE AND FORWARD INDICATION OF SERVICE STATUS (E.G., SERVICE COMPLETE) | |
| 17. RECEIVE SERVICE STATUS INDICATION<br>18. QUERY RELEVANT SENSORS<br>19. DETERMINE WHETHER SENSOR INFORMATION IS CONSISTENT WITH THE INDICATION OF SERVICE STATUS<br>20. SEND INDICATION THAT SERVICE IS COMPLETE | | |
| | 21. RECEIVE INDICATION THAT SERVICE IS COMPLETE<br>22. PROVIDE VALUE FOR THE SERVICE | |

FIG. 5

| AUTONOMOUS VEHICLE | FLEET CONTROLLER | RIDE SERVICE CONTROLLER |
|---|---|---|
| 1. DETECT NEED TO PARK<br>2. SEND PARKING REQUEST (MAY INCLUDE LOCATION INFORMATION) | | |
| | 3. RECEIVE PARKING REQUEST<br>4. PUBLISH PARKING REQUEST TO MOBILE DEVICES | |
| | | 5. PRESENT PARKING REQUEST IN GUI<br>6. RECEIVE AN INDICATION OF ACCEPTANCE OF PARKING REQUEST<br>7. SEND INDICATION OF ACCEPTANCE OF THE PARKING REQUEST INCLUDING LOCATION OF PARKING SPOT |
| | 8. RECEIVE ACCEPTANCE OF THE PARKING REQUEST<br>9. SEND LOCATION OF PARKING SPOT | |
| 10. RECEIVE THE LOCATION OF THE PARKING SPOT<br>11. DRIVE TO AND PARK IN THE PARKING SPOT<br>12. SEND INDICATION THAT CAR IS PARKED IN THE PARKING SPOT | | |
| | 13. RECEIVE INDICATION THAT AV IS PARKED IN PARKING SPOT | |
| 14. DETERMINE TO MOVE FROM PARKING SPOT.<br>15. MOVE FROM PARKING SPOT<br>16. SEND INDICATION THAT AV MOVED FROM THE PARKING SPOT | | |
| | 17. DETERMINE TIME AV WAS PARKED IN PARKING SPOT<br>18. PROVIDE VALUE FOR USE OF THE PARKING SPOT | |

FIG. 6

| RIDE SERVICE CONTROLLER | AUTONOMOUS VEHICLE |
|---|---|
| 1. PRESENT NAVIGATION INTERFACE | |
| 2. RECEIVE SELECTION OF TURN-BY-TURN NAVIGATION | |
| 3. PRESENT TURN-BY-TURN INTERFACE INCLUDING CONTROLS FOR RECEIVING INPUT INDICATING UPCOMING TURNS | |
| | 4. BEGIN RIDE |
| 5. RECEIVE INPUT INDICATING A TURN | |
| 6. SEND TURN REQUEST TO AV | |
| | 7. RECEIVE THE TURN REQUEST |
| | 8. ALTER ROUTE BASED ON THE TURN REQUEST |
| 9. IF NOT AT DESTINATION, GOTO 5 | |

FIG. 7

| RIDE SERVICE CONTROLLER | AUTONOMOUS VEHICLE |
|---|---|
| 1. PRESENT MAP ON NAVIGATION INTERFACE<br><br>2. RECEIVE TOUCHSCREEN INPUT TRACING MAP TO INDICATE DESIRED ROUT<br><br>3. SEND ROUTE TO AV | 4. RECEIVE THE USER CREATED ROUTE<br><br>5. DRIVE AV TO DESTINATION ACCORDING TO THE USER CREATED ROUTE |

FIG. 8

| RIDE SERVICE CONTROLLER | FLEET CONTROLLER | AUTONOMOUS VEHICLE |
|---|---|---|
| 1. PRESENT RIDE INTERFACE
2. RECEIVE REQUEST FOR SECURE RIDE FROM PICK-UP LOCATION TO DESTINATION.
3. SEND SECURE RIDE REQUEST INCLUDING PICK-UP LOCATION AND DESTINATION. | | |
| | 4. RECEIVE SECURE RIDE REQUEST
5. CREATE SECURE RIDE AUTHENTICATION CREDENTIAL(S)
5. SEND SECURE RIDE REQUEST AND AUTHENTICATION CREDENTIAL(S) TO AV | |
| | | 6. RECEIVE THE SECURE RIDE REQUEST INCLUDING PICK-UP LOCATION, DESTINATION, AND AUTHENTICATION CREDENTIAL(S)
7. VERIFY PASSANGER COMPARTMENT HAS NO PASSENGERS AND DOORS LOCKED (SEAT SENSOR, CAMERA, MIC, ETC.)
8. SEND INDICATION THAT PASSENGER COMPARTMENT IS EMPTY AND LOCKED |
| | 9. RECEIVE INDICATION THAT PASSENGER COMPARTMENT IS EMPTY AND LOCKED
10 FORWARD INDICATION THAT PASSENGER COMPARTMENT IS EMPTY AND LOCKED | |
| 11. RECEIVE INDICATION THAT PASSENGER COMPARTMENT IS EMPTY AND LOCKED | | 12. NAVIGATE TO PICK-UP LOCATION
13. SEND INDICATION THAT AV ARRIVED AT PICK-UP LOCATION |
| | 14. RECEIVE INDICATION THAT AV ARRIVED AT PICK-UP LOCATION
15. FORWARD INDICATION THAT AV ARRIVED AT PICK-UP LOCATION | |
| 16. RECEIVE INDICATION THAT AV ARRIVED AT PICK-UP LOCATION | | 17. REQUEST AUTHENTICATION CREDENTIAL(S) OVER PERSONAL AREA NETWORK |
| 18. RECEIVE REQUEST FOR AUTHENTICATION CREDENTIAL(S) OVER PERSONAL AREA NETWORK (PAN)
19. SEND AUTHENTICATION CREDENTIALS OVER THE PAN. | | 20. RECEIVE AND VERIFY AUTHENTICATION CREDENTIAL(S)
21. UNLOCK DOORS
22. DETECT PASSENGER IN PASSENGER COMPARTMENT
23. LOCK DOORS |

FIG. 9

| RIDE SERVICE CONTROLLER | FLEET CONTROLLER | AUTONOMOUS VEHICLE |
|---|---|---|
| | | 24. DETECT ARRIVAL AT DESTINATION
25. SEND ARRIVAL MESSAGE, REQUEST AUTHENTICATION CREDENTIAL(S), AND OPEN MEDIA FEED (CAMERA SHOWING DESTINATION) |
| | 26. RECEIVE AND FORWARD ARRIVAL MESSAGE AND MEDIA FEED | |
| 27. RECEIVE ARRIVAL MESSAGE, MEDIA FEED, AND REQUEST FOR AUTHENTICATION CREDENTIAL(S)
28. SEND AUTHENTICATION CREDENTIAL(S) OVER WIDE AREA NETWORK | | |
| | 29. RECEIVE AND FORWARD AUTHENTICATION CREDENTIAL(S) | |
| | | 30. RECEIVE AND VERIFY AUTHENTICATION CREDENTIAL(S)
31. IN RESPONSE TO VERIFYING AUTH CRED(S), UNLOCK DOORS
32. DETERMINE PASSENGER EXITED AV
33. SEND INDICATION THAT SECURE RIDE IS COMPLETE |
| | 34. RECEIVE AND FORWARD INDICATION THAT SECURE RIDE IS COMPLETE | |
| 35. RECEIVE INDICATION THAT SECURE RIDE IS COMPLETE | | |

FIG. 10

| RIDE SERVICE CONTROLLER | FLEET CONTROLLER | AUTONOMOUS VEHICLE |
|---|---|---|
| 1. PRESENT RIDE SELECTION INTERFACE
2. RECEIVE RIDE DESTINATION INFORMATION (E.G., ADDRESS, GPS COORDINATES, ETC)
3. RECEIVE DROP-OFF LOCATION INFORMATION (E.G., LANDMARK, MARKER CODE, OR OTHER INDICIA IDENTIFYING DROP-OFF POINT IN MORE SPECIFICITY THAN DISCERNABLE BY ADDRESS OR GPS COORDINATES)
4. SEND DESTINATION INFORMATION AND DROP-OFF LOCATION INFORMATION
5. PRESENT OPTION TO SAVE TO DROP-OFF LOCATION INFORMATION IN RIDER PROFILE
6. SEND REQUEST STORE DROP-OFF LOCATION INFORMATION WITH THE DESTINATION INFORMATION IN RIDER PROFILE, IF OPTION IS ACCEPTED. | 7. RECEIVE DESTINATION AND DROP-OFF LOCATION INFORMATION
8. SEND DESTINATION AND DROP-OFF LOCATION INFORMATION TO AV
9. RECEIVE REQUEST TO STORE DROP-OFF LOCATION INFORMATION WITH DESTINATION INFORMATION IN RIDER PROFILE, IF OPTION ACCEPTED ON MOBILE DEVICE.
10. IF OPTION ACCEPTED, SAVE DROP-OFF INFORMATION WITH DESTINATION INFORMATION IN RIDER PROFILE. | 11. RECEIVE RIDE DESTINATION INFORMATION AND DROP-OFF LOCATION INFORMATION
12. DRIVE TO RIDE DESTINATION
13. USING DROP-OFF LOCATION INFORMATION, NAVIGATE TO DROP-OFF LOCATION
14. SEND REQUEST FOR CONFIRMATION ABOUT ARRIVAL AT DROP-OFF LOCATION |
| | 15. RECEIVE REQUEST FOR CONFIRMATION ABOUT ARRIVAL AT DROP-OFF LOCATION
16. FORWARD THE REQUEST TO MOBILE DEVICE | |
| 17. RECEIVE CONFIRMATION REQUEST
18. RECEIVE INPUT INDICATIONG CONFIRMATION
19. TRANSMIT CONFIRMATION | 20. RECEIVE AND SEND CONFIRMATION | 21. RECEIVE CONFIRMATION
22. TRANSMIT INFORMATION ABOUT PATH TO DROP-OFF LOCATION FOR STORAGE IN RIDER PROFILE |
| | 23. STORE INFORMATION ABOUT PATH TO DROP-OFF LOCATION IN RIDER PROFILE | |

FIG. 11

| RIDE SERVICE CONTROLLER | FLEET CONTROLLER | AV 1 | AV 2 |
|---|---|---|---|
| 1. SEND RIDE REQUEST | 2. RECEIVE THE RIDE REQUEST<br>3. DETERMINE THAT A PLURALITY OF AVS ARE NEEDED<br>4. DETERMINE RENDEZVOUS POINTS<br>5. PUBLISH RIDE REQUESTS | 6. RECEIVE AND ACCEPT THE RIDE REQUEST<br>7. SEND ACK FOR RIDE REQ | 6. RECEIVE AND ACCEPT THE RIDE REQUEST<br>7. SEND ACK FOR RIDE REQ |
|  | 8. RECEIVE AND FORWARD RIDE REQ ACCEPTANCE |  |  |
| 9. RECEIVE AND PRESENT RIDE REQ ACCEPTANCE IN UI |  | 10. MANEUVER TO PICKUP LOCATION PER RIDE REQUEST<br>11. PICK-UP PASSENGER<br>12. MANEUVER TO THE A RENDEZVOUS POINT<br>13. DROP OFF PASSENGER<br>14. CONFIRM DROP OFF |  |
|  | 15. RECEIVE DROP-OFF CONFIRMATION FROM AV1 |  | 16. MANEUVER TO RENDEZVOUS POINT<br>17. PICK-UP PASSENGER<br>18. MANEUVER TO THE DESTINATION<br>19. DROP OFF PASSENGER<br>20. CONFIRM DROP OFF |
|  | 21. RECEIVE DROP-OFF CONFIRMATION FROM AV2 |  |  |

FIG. 17

| RSC 1 | RSC 2 | FLEET CONTROLLER | AV |
|---|---|---|---|
| 1. SEND RIDE REQUEST | | | |
| | | 2. RECEIVE AND PUBLISH THE RIDE REQUEST | |
| | | | 3. ACCEPT THE RIDE REQUEST AND SEND CONFIRMATION |
| 4. RECEIVE AND PRESENT CONFIRMATION THAT RIDE REQUEST HAS BEEN ACCEPTED | | | |
| | | | 5. GO TO PICK-UP LOCATION AND SEND MESSAGE INDICATING ARRIVAL AT PICK-UP LOCATION |
| 6. RECEIVE AND PRESENT ARRIVAL MESSAGE IN UI | | | |
| 7. PRESENT RIDE INFORMATION INTERFACE IN UI | | | |
| 8. RECEIVE INPUT INDICATING THAT RIDE IS BEING REFUSED | | | |
| 9. SEND RIDE REFUSAL MESSAGE | | | |
| | | 10. RECEIVE RIDE REFUSAL MESSAGE | |
| | | 11. PUBLISH A RIDE REQUEST TO PICK-UP THE PASSENGER (MAY PRIORITIZE ETC) | |
| | | 12. DETERMINE, BASED AT LEAST IN PART ON THE REFUSAL MESSAGE, SERVICE IS NEEDED | |
| | | 13. PUBLISH AV SERVICE REQUEST | |
| | 14. RECEIVE SERVICE REQUEST AND PRESENT IN UI | | |
| | 15. RECEIVE INPUT INDICATING ACCEPTANCE OF THE SERVICE REQUEST | | |
| | 16. SEND MESSAGE INDICATING SERVICE REQUEST IS ACCEPTED | | |
| | | 17. RECEIVE SERVICE REQUEST ACCEPTANCE | |
| | | 18. SEND SERVICE MESSAGE TO AV | |
| | | | 19. RECEIVE SERVICE MESSAGE |
| | | | 20. GO TO SERVICE LOCATION |

FIG. 23

MANAGING AUTONOMOUS VEHICLES

BACKGROUND

Autonomous vehicles are vehicles capable of sensing their environment and navigating without human input. Autonomous vehicles can include terrain-based vehicles (e.g., cars), watercraft, hovercraft, and aircraft. Autonomous vehicles can detect surroundings using a variety of techniques such as radar, lidar, GPS, odometry, and computer vision. Land-based autonomous vehicle guidance systems interpret sensory information to identify appropriate navigation paths, obstacles, and relevant signage. Land-based autonomous vehicles have control systems that can analyze sensory data to distinguish between different cars on the road, and guide themselves to desired destinations.

Among the potential benefits of autonomous vehicles (e.g., autonomous cars) are fewer traffic accidents, increased roadway capacity, reduced traffic congestion, and enhanced mobility for people. Autonomous cars can also relieve travelers from driving and navigation chores, freeing commuting hours with more time for leisure or work.

Autonomous vehicles will facilitate new business models of mobility as a service, including carsharing, e-hailing, ride hailing services, real-time ridesharing, and other services of the sharing economy.

BRIEF DESCRIPTION OF DRAWINGS

FIG. 5 is an operational flow diagram illustrating operations for an autonomous vehicle obtaining services for itself, according to some embodiments of the inventive subject matter.

FIG. 6 is an operational flow diagram indicating operations for obtaining parking space, according to some embodiments the inventive subject matter.

FIG. 7 is an operational flow diagram illustrating operations for enabling a passenger to provide real-time turn-by-turn directions, according to some embodiments.

FIG. 8 is an operational flow diagram illustrating operations for enabling a passenger to provide route information, according to some embodiments.

FIG. 9 is an operational flow diagram illustrating operations for providing secure ride service, according to some embodiments.

FIG. 10 is an operational flow diagram illustrating operations for providing secure ride service, according to some embodiments.

FIG. 11 is an operational flow diagram illustrating operations for specifying a drop-off location, according to some embodiments.

FIG. 17 is an operational flow diagram illustrating operations for servicing a ride request that requires multiple autonomous vehicles, according to some embodiments.

FIG. 23 is an operational flow diagram showing operations for determining an autonomous vehicle needs service, and providing the service, according to some embodiments.

INTRODUCTION

As autonomous vehicle guidance systems evolve, they will guide vehicles without any human input or presence. Embodiments of the inventive subject matter provide control systems that utilize and interact with guidance systems to provide capabilities far beyond merely autonomously guiding vehicles between starting-points and destinations. Some embodiments provide components and functionality that enable autonomous vehicle fleets to provide widespread ride service according to various scheduling and utilization functionalities. Additionally, some embodiments provide components and functionality for enabling autonomous vehicles to request service (e.g., refueling), determine whether the requested service was performed, and notify other entities that service was successfully performed. Such embodiments enable autonomous vehicles to operate with relatively few range limitations and geographic boundaries. Yet other embodiments provide components and functionality that interacts with vehicle guidance systems to specify particular pickup/drop-off locations with more particularity than available via customary address specification or GPS coordinates. Such embodiments may enable a ride passenger to specify a landmark identifier (e.g., driveway, mailbox, mounted fiducial marker, etc.) indicating a pickup/drop-off location. Components can provide the identifier to vehicle guidance systems, which in turn use their native guidance capabilities (e.g., computer vision) to find specified pickup/drop-off locations, and proceed to rendezvous at the specified locations. These and other embodiments are described in greater detail below.

Discussion of Embodiments

Example Components

Figure 1:
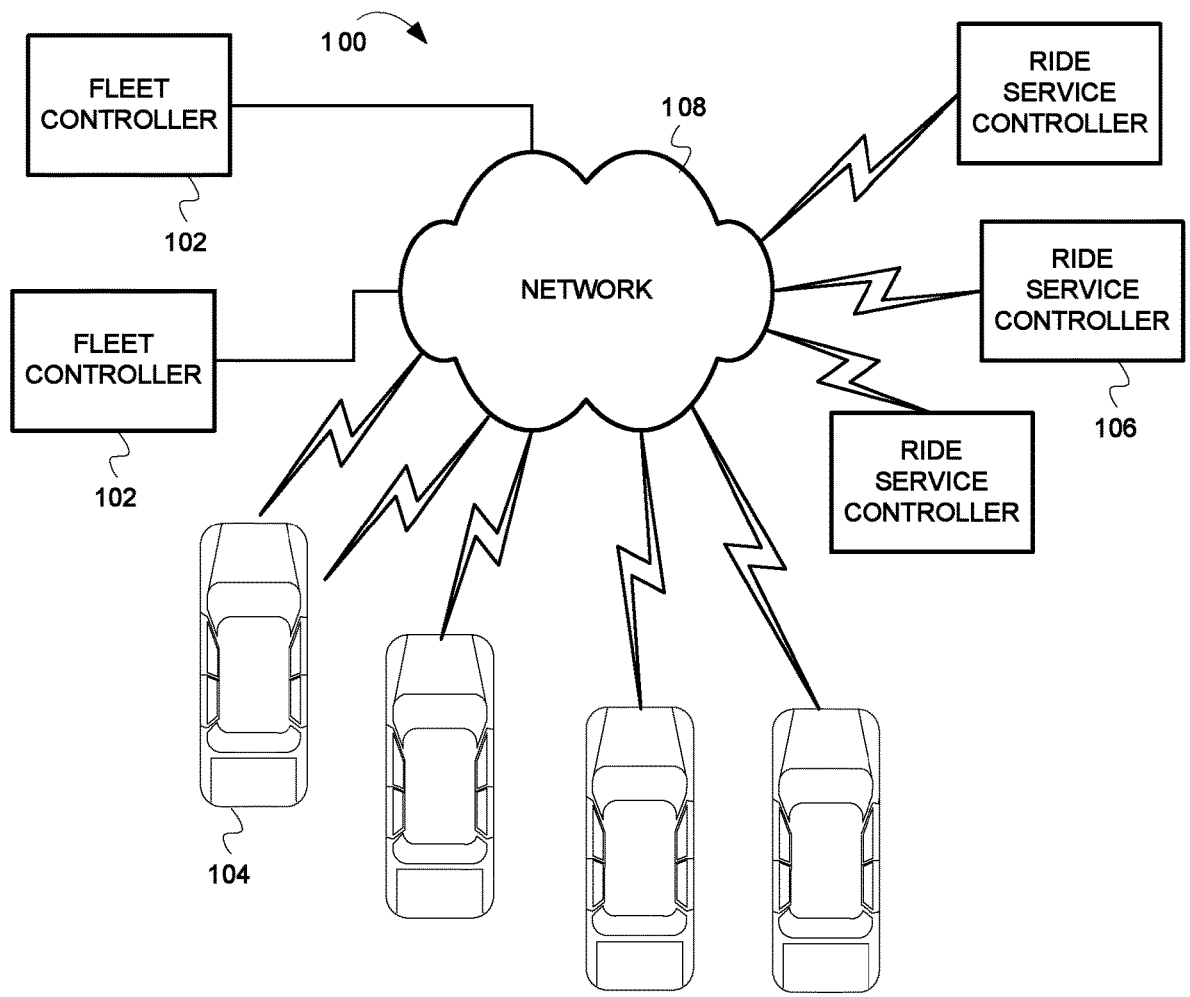
FIG. 1 is a block diagram illustrating components in a system for controlling autonomous vehicles, according to some embodiments of the inventive subject matter.

FIG. 1 is a block diagram illustrating components in a system for controlling autonomous vehicles, according to some embodiments of the inventive subject matter. In FIG. 1, a system 100 includes a network 108 connected to fleet controllers 102, autonomous vehicles 104, and ride service controllers 106. The fleet controllers 102 can reside on any suitable computing device, such as server boxes, rack servers, desktop computers, etc. The autonomous vehicles 104 can include automobiles or any other suitable vehicle. The ride service controllers 106 can reside on any suitable computing device, such as a mobile phone, smart phone, handheld computer, laptop, etc. In some embodiments, at least a portion of any ride service controller 106 can reside on one or more web servers, and can be accessible to users over a network (e.g., the internet).

Additional components and functionality of the fleet controllers 102, autonomous vehicles 104, and ride service controllers 106 will be described in more detail below.

Figure 2A:
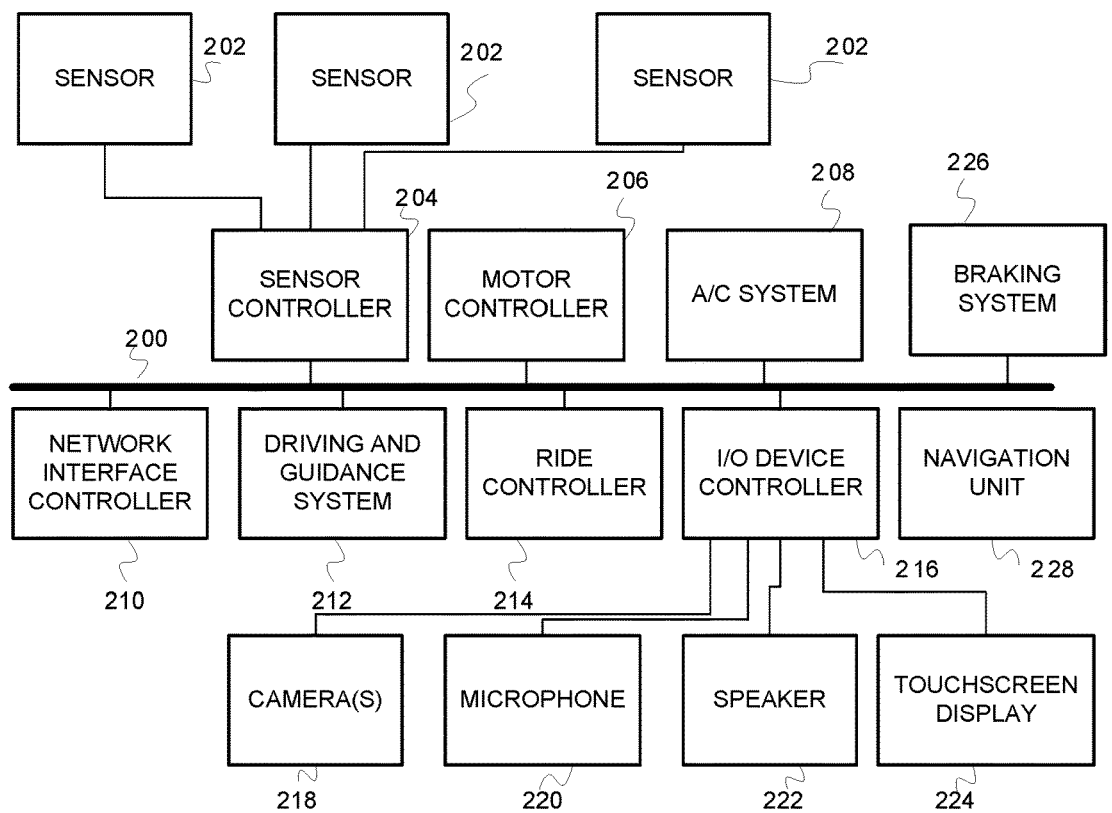
FIG. 2A is a block diagram illustrating control components of an autonomous vehicle, according to some embodiments of the inventive subject matter.

FIG. 2A is a block diagram illustrating control components of an autonomous vehicle, according to some embodiments of the inventive subject matter. One or more of the control components shown in FIG. 2A may be utilized in autonomous vehicles, according to some embodiments. As shown, the components can communicate with each other via the communication pathway 200.

The driving and guidance system 212 can include any components necessary for maneuvering, without human input, the autonomous vehicle from start points to destinations, or as otherwise directed by other components of the autonomous vehicle. The driving and guidance system 212 may control components for steering, braking, and accelerating the autonomous vehicle. In some instances, the driving and guidance system 212 can interact with other controllers that are configured to control steering systems, braking systems, acceleration systems, etc. Although not shown, a propulsion system including one or more motors (e.g., electrical motors, internal combustion engines, etc.) is included in the driving and guidance system. The driving and guidance system 212 can also include guidance components, such as radar components, cameras, lidar components, global positioning satellite components, computer vision components, and any other components necessary for autonomously maneuvering the vehicle without human input.

In some embodiments, the autonomous vehicle is embodied as autonomous automobile including wheels powered by a propulsion system and controlled by (i.e., steered by) a steering unit connected to the wheels. Additionally, the autonomous vehicle may include a one or more cabins for transporting passengers, and one or more cargo bins for transporting cargo. This description makes reference to "ride requests" for passengers. However, ride requests may also relate to cargo, and hence any reference to passengers may be construed to mean cargo and any cargo handlers.

The ride controller 214 is configured to control the autonomous vehicle to perform operations related to passenger ride service, seeking services for itself, and other functions described herein. In performing these operations, the ride controller 214 may interact with any of the components shown in FIG. 2A. For example, in performing ride service operations, the ride controller 214 can interact with a navigation unit 228 to determine navigation information (e.g., maps) for routing the vehicle, and the driving and guidance system 212 to maneuver the autonomous vehicle to desired destinations (e.g., to pickup passengers). In further performing these operations, the ride controller 214 may send and receive information via the network interface controller 210, send or receive input via the sensor controller 204, and exchange information with any I/O device via the I/O device controller 216. In some embodiments, the sensors 202 do not include components of the driving and guidance system 212, but may be utilized by any component in the vehicle. The sensors 202 can include one or more fuel sensors, fluid level sensors, air pressure sensors, ignition timing sensors, temperature sensors (cabin, motor, ambient, etc.), door sensors (sensing whether a door/hood/trunk is open), seat sensors (sensing whether a seat is occupied by passenger), latch sensors, seatbelt sensors, parts sensors (indicating whether a part is present), and airbag sensors. Some of the sensors can be disposed in or about a combustion engine, such as one or more mass air flow sensors, manifold air pressure sensors, oxygen sensors, crankshaft position sensor, camshaft position sensors etc. Some embodiments include sensors particular to electric motors. The sensors can also include tire pressure sensors, throttle position sensors, and wheel speed sensors. The sensors can also include wheel sensors capable of determining wheel rotation for determining movement and orientation of the vehicle. In some embodiments, the ride controller 214 periodically polls the sensor controller 204 to monitor the state of the autonomous vehicle. In some embodiments, the ride controller records the sensor readings for future analysis.

The motor controller 206 is configured to control one or more motors that provide power for propelling the vehicle or for generating electricity used by an electric motor that propels the vehicle. The AC system 208 includes all components necessary to provide air-conditioning and ventilation to passenger compartments of the autonomous vehicle. Network interface controller 210 is configured to control wireless communications over any suitable networks, such as wide area networks (e.g., mobile phone networks), local area networks (e.g., Wi-Fi), and personal area networks (e.g., Bluetooth). The I/O device controller 216 controls input and output between camera(s) 218, microphone(s) 220, speaker(s) 222, and touchscreen display(s) 224. The I/O controller 216 can enable any of the components to utilize the I/O devices 218, 220, 222, and 224.

Figure 2B:
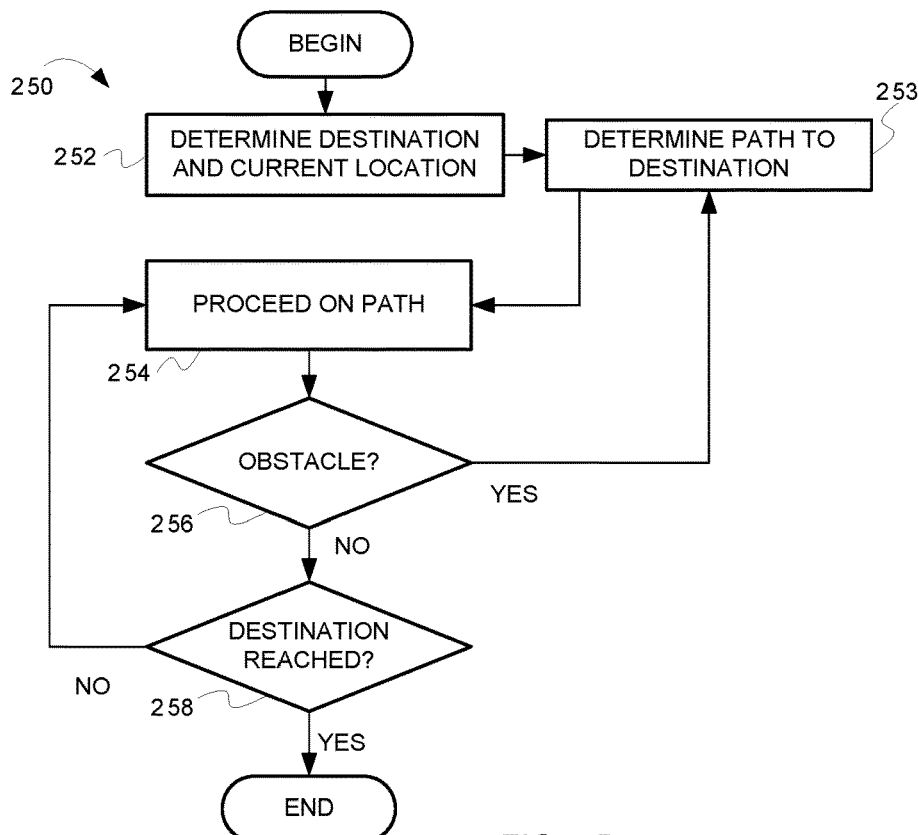
FIG. 2B is a block diagram illustrating operations for driving and guiding an autonomous vehicle, according to some embodiments.

FIG. 2B is a block diagram illustrating operations for driving and guiding an autonomous vehicle, according to some embodiments. In some embodiments, the operations of FIG. 2B are performed by an autonomous vehicle's driving and guidance system (e.g., see FIG. 2A's block 212). Embodiments may use any known or later developed techniques for maneuvering an autonomous vehicle over roads to a destination. In FIG. 2B, the flow diagram 250 begins at block 252.

At block 252, an autonomous vehicle's driving and guidance system determines a destination and current location. In some embodiments, the autonomous vehicle's driving and guidance system receives an indication of the destination from other components of the autonomous vehicle. For example, the vehicle's ride controller may provide the destination to the driving and guidance system. In some embodiments, the driving and guidance system utilizes global positioning satellite data (e.g., provided by navigation unit), map information, inertial navigation information, odometery, etc. to determine a current location and orientation. Additionally, the driving and guidance system may use sensors, such as cameras and lidar to better determine its current location. Any known techniques for computer vision and lidar processing can be used. The flow continues at block 253.

At block 253, the autonomous vehicle's driving and guidance system determines a path to the destination. Embodiments can utilize any suitable path determining algorithm, such as shortest path, fastest path, etc. In some embodiments, the path is provided by a user, external system, or other component. Embodiments can utilize any known or otherwise suitable techniques for path planning to determine a path to the destination. The flow continues at block 254.

At block 254, the autonomous vehicle's driving and guidance system propels the vehicle along the path. As the vehicle proceeds along the path, the driving and guidance system is continuously processing sensor data to recognize objects and obstacles (i.e., impediments to safety and progress). The flow continues at block 256.

At block 256, the autonomous vehicle's driving and guidance system determines whether obstacles encountered. The driving and guidance system can use various sensors to perceive the ambient environment including cameras, lidar, radar, etc. The driving and guidance system can also use any suitable techniques for object detection and recognition (e.g., computer vision object detection) to recognize obstacles. Obstacles can include moving obstacles, stationary obstacles, changes in terrain, traffic rules, etc. Obstacle detection can involve known techniques for determining the vehicle's own motion relative to other objects. Motion determination can include any know techniques for processing steering angular rates, data from inertial sensors, data from speed sensors, data from cameras, lidar, etc. Known video processing techniques can be used when processing camera data and can include known techniques of video-based object recognition and motion estimation. Known uses of Velodyne lidar are suited for detecting and tracking objects in traffic, as such techniques can classify data into passenger cars, trucks, bikes, and pedestrians by having based on motion behavior. In addition to tracking objects, some embodiments perform road shape estimation utilizing any suitable techniques such as clothoidal systems or B-spline models for 3D lane representation. By projecting a 3D lane estimate into images, measurements of directed edges of lane markings can be performed. Lidar can be used to determine curbs. Techniques for road shape estimation can include techniques for modeling. If an obstacle has been encountered, the flow loops back to block 253. Upon loop back to block 253, the driving and guidance system determines a path around the obstacle toward the destination. From block 253, the flow continues at block 254. Referring back to block 256, if an obstacle is not encountered, the flow continues at block 258.

At block 258, the autonomous vehicle determines whether the destination has been reached. The autonomous vehicle's driving and guidance system can make this determination based on GPS data, camera and lidar data (e.g., object recognition such as a landmark), user input, or other suitable information. If the destination has not been reached, the flow continues at block 254. If the destination has been reached the flow ends.

Figure 3:
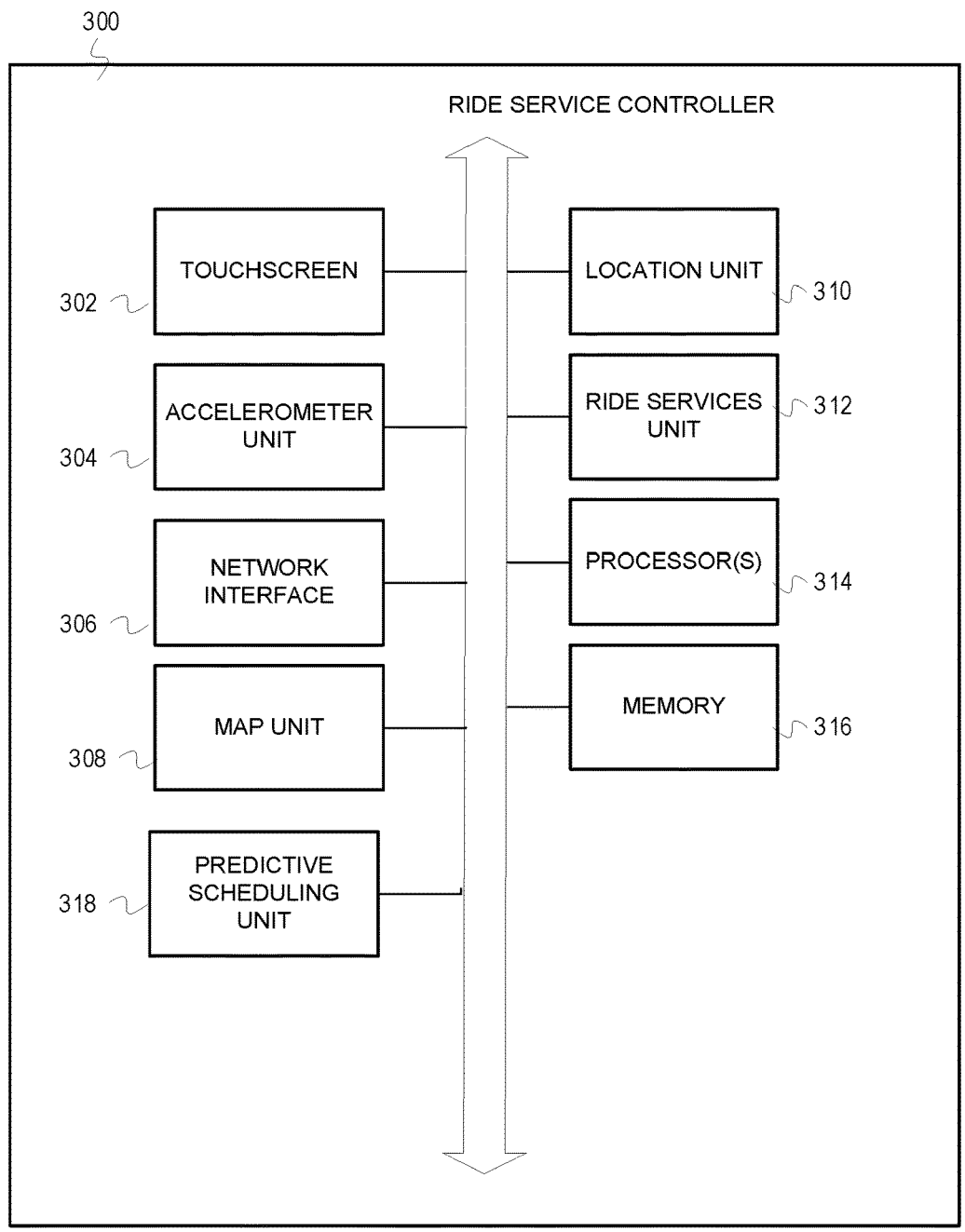
FIG. 3 is a block diagram of a ride service controller, according to some embodiments of the inventive subject matter.

FIG. 3 is a block diagram of a ride service controller, according to some embodiments of the inventive subject matter. In FIG. 3, a ride service controller 300 includes a touchscreen 302, accelerometer unit 304, network interface 306, map unit 308, location unit 310, ride service unit 312, processor(s) 314, memory 316, and predictive schedule unit 318. In some embodiments, the location unit 310, ride services unit 312, map unit 308, and other suitable components (not shown), can wholly or partially reside in the memory 316. In some embodiments, the memory 316 includes semiconductor random access memory, semiconductor persistent memory (e.g., flash memory), magnetic media memory (e.g., hard disk drive), optical memory (e.g., DVD), or any other suitable media for storing machine-executable instructions and information.

The map unit 308 can provide map information (street address information, GPS information, etc.) to any component of the ride service controller 300 or other components external to the ride service controller 300. The location unit 310 can receive and process global positioning satellite (GPS) signals and provide GPS information to components internal or external to the ride service controller 300. The accelerometer unit 304 can detect motion, acceleration, and other movement information. The ride services unit 312 can utilize information from any component internal or external to the ride service controller 300. In some embodiments, the ride services unit 312 performs operations for coordinating customer rides in autonomous vehicles, as described herein. The predicted scheduling unit 318 can predictively request ride service for a user.

In some embodiments, ride service controllers can be included in smart phones and other mobile devices. In some embodiments, ride service controllers are portable devices suitable for carrying by ride customers. In some embodiments, ride service controllers are distributed as software applications for installation on smart phones, which provide hardware functionality for use by the software applications. Therefore, ride service controllers can be embodied as computer-executable instructions residing on tangible machine-readable media.

Figure 4:
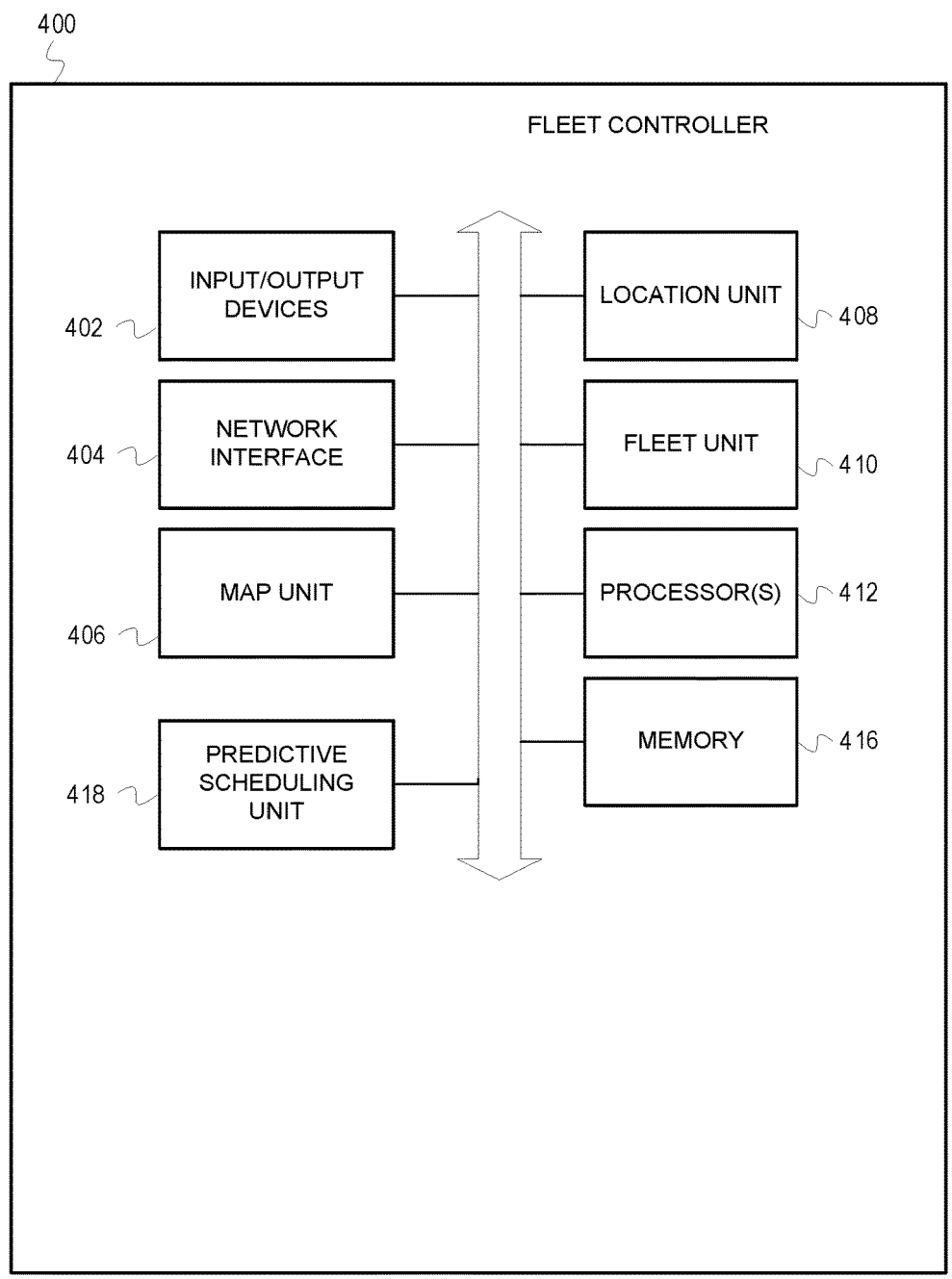
FIG. 4 is a block diagram of a fleet controller, according to some embodiments of the inventive subject matter.

FIG. 4 is a block diagram of a fleet controller, according to some embodiments of the inventive subject matter. In FIG. 4, the fleet controller 400 includes input output devices 402, network interface 404, map unit 406, location unit 408, fleet unit 410, processor 412, memory 416, and predictive schedule unit 418.

In some embodiments, the fleet controller 400 communicates with a plurality of ride service controllers. In some embodiments, the location unit 408 receives location information associated with ride service controllers, and determines locations of those ride service controllers. The map unit 406 can utilize information from the location unit to determine map locations for ride service controllers. The fleet unit 410 can perform operations for coordinating customer rides with autonomous vehicles, as described herein. The components in the fleet controller 400 can share information between themselves and with components external to the fleet controller 400.

In some embodiments, the location unit 408, fleet unit 410, map unit 406, and other suitable components (not shown), can wholly or partially reside in the memory 416. In some embodiments, the memory 316 includes semiconductor random access memory, semiconductor persistent memory (e.g., flash memory), magnetic media memory (e.g., hard disk drive), optical memory (e.g., DVD), or any other suitable media for storing information. The processor (s) 412 can execute instructions contained in the memory 416. The predictive schedule unit 418 can predictively request ride service for particular user accounts.

This description describes capabilities of, and operations performed by, components discussed vis-à-vis the Figures discussed above. However, according to some embodiments, the operations and capabilities can be included in different components. In some embodiments, autonomous vehicles can be implemented as "thick devices", where they are capable of accepting ride requests published by a fleet controller, and they can communicate directly with ride service controllers and other devices. In some implementations, autonomous vehicles may communicate certain messages to fleet controllers, which forward those messages to autonomous vehicles or other components. Therefore, some embodiments support direct communication between autonomous vehicles and ride service controllers, and some embodiments support indirect communication (e.g., message forwarding). In some embodiments, autonomous vehicles are capable of determining ride routes, and may receive user input for selecting between ride routes determined by the autonomous vehicle. In some embodiments, all operations for maneuvering an autonomous vehicle are performed by a driving and guidance system. The driving and guidance system is capable of receiving information and instructions from a ride controller, where the ride controller performs operations for determining rides for the autonomous vehicle. Based on the rides, the ride controller provides instructions and information for enabling the driving and guidance system to maneuver to locations associated with ride requests, and other requests.

In some embodiments, autonomous vehicles may be implemented as "thin devices". Therefore, some embodiments do not receive a stream of published ride requests from which they choose rides, but instead are assigned rides by a fleet controller or other device. That is, a fleet controller may select the ride and assign it directly to a particular autonomous vehicle. In some implementations, autonomous vehicles do not select routes for rides that have been assigned. Instead, the vehicles may receive routes from fleet controllers or other devices. In some implementations, autonomous vehicles may not communicate with ride requesters, but instead receive information from fleet controllers (where the fleet controllers communicate with ride requesters). Furthermore, in some implementations, the autonomous vehicles may not make decisions about rendezvous points, service request, or other operations described herein. Instead, the decisions may be made by fleet controllers or other components. After making such decisions, the fleet controllers provide to vehicles information carrying out assignments.

In some embodiments, autonomous vehicles may be implemented as hybrids between thick and thin devices.

Therefore, some capabilities may be implemented in the autonomous vehicles, while other capabilities may be implemented in the fleet controllers or other devices.

Example Operations

This section describes example operations performed by some embodiments of the inventive subject matter. Some embodiments perform the operations as shown in the drawings. However, in other embodiments, the operations may be performed by different components. That is, for any given operational flow, an autonomous vehicle may perform certain operations in one embodiment, whereas a fleet controller may perform those operations in other embodiments. Some implementations may put more functionality in the autonomous vehicles and ride service controllers, while reducing functionality of the fleet controllers. Conversely, other embodiments may put more functionality in the fleet controller, while implementing the autonomous vehicles and ride service controllers as "thin" devices. Depending on implementation architecture, some communications and operations may be omitted completely. For example, in some embodiments, ride service controllers do not communicate directly with autonomous vehicles. In these embodiments, a fleet controller forwards messages between ride service controllers and autonomous vehicles. Such message forwarding may be omitted for embodiments in which ride service controllers communicate directly with autonomous vehicles. Additionally, certain operations (e.g., confirmations, authentications, acknowledgments, etc.) may be omitted from certain embodiments.

Obtaining Service

Autonomous vehicles that are incapable of easily obtaining necessary services, such as refueling services, are geographically constrained to areas where those services are available. Embodiments of the inventive subject matter enable autonomous vehicles to obtain services virtually anywhere, and without need for specialized service locations. For example, some embodiments enable autonomous vehicles to rendezvous with service providers at conventional gas stations without needing any special equipment or personnel. By enabling autonomous vehicles to leverage the existing service infrastructure, autonomous vehicle fleets can roam virtually anywhere that ride services are needed. The discussion of FIG. 5 explains how some embodiments enable autonomous vehicles to obtain services.

FIG. 5 is an operational flow diagram illustrating operations for an autonomous vehicle obtaining services for itself, according to some embodiments of the inventive subject matter. The operations of FIG. 5 may be performed by an autonomous vehicle, fleet controller, and ride service controller. The operations progress in stages 1-20. At stage 1, and autonomous vehicle's ride controller 214 detects a need for service. The ride controller 214 may receive sensor input from the sensor controller 204 indicating low fuel, low tire pressure, or any other state requiring service. At stage 2, the ride controller 214 sends, over a wireless network, a service request to a fleet controller. For example, the ride controller 214 may send a service request for fuel. In some embodiments, the ride service request indicates what service is needed, and a location of the autonomous vehicle. The ride service request may include additional information, such as a time range and geographic vicinity in which the service is desired, one or more suitable rendezvous points for the service, service information to assist in finding service providers capable of providing service, vehicle make, vehicle model, etc.

At stage 3, the fleet controller receives the service request. At stage 4, the fleet controller publishes the service request to ride service controllers that have subscribed to receive service requests. The service request publication can indicate any information that facilitates service acquisition. A passenger currently riding in the autonomous vehicle may have a ride service controller subscribed to receive service requests. In some embodiments, the fleet controller may initially publish the service request to the passenger before publishing it to other subscribers.

At stage 5, a ride service controller presents the service request in a graphical user interface. For example, the ride service controller may present a service request indicating that an autonomous vehicle needs fuel (e.g., gasoline) and wants to rendezvous at a given location (e.g., a gas station). In some embodiments, the autonomous vehicle determines the service rendezvous locations, whereas in other embodiments the fleet controller determines the service rendezvous location and notifies the autonomous vehicle. At stage 6, the ride service controller receives an indication (e.g., user input into the GUI) of acceptance of the service request. At stage 7, the ride service controller sends the indication of acceptance to the fleet controller.

At stage 8, the fleet controller receives acceptance of the service request. At stage 9, the fleet controller sends an authentication code to the ride service controller. At stage 10, the ride service controller receives the authentication code, which will be used later to access components of the autonomous vehicle.

At stage 11, the autonomous vehicle drives to a service rendezvous point. In some embodiments, the autonomous vehicle's ride controller 214 utilizes the driving and guidance system 212 to maneuver the autonomous vehicle to the rendezvous point. After arriving at the rendezvous point, the ride controller 214 broadcasts, over a personal area network, a request for the authentication code. The ride controller 214 utilizes a personal area network to ensure that the service provider is in near proximity. At stages 12 and 13, the ride service controller sends the authentication code to the ride controller 214, and the ride controller verifies authentication code. At stage 14, the ride controller 214 enables access to components for service. For example, the ride controller may activate a solenoid to open a fuel door. The ride controller 214 can activate motors, solenoids, relays, or any other devices that open doors, covers, or otherwise facilitate access to components of the autonomous vehicle.

After gaining access to the autonomous vehicle's components, a service provider can perform service on the autonomous vehicle. After performing the service, (stage 15) the service provider provides input to the ride service controller indicating service status. The service status indication may include information about services provided, such as completion status, gallons of fuel, volume of fluids added, etc. The ride service controller sends the service status indication to the fleet controller. At stage 16, the fleet controller receives and forwards the service status indicator to the autonomous vehicle.

At stage 17, the vehicle's ride controller receives the service status indicator. As an example, the service status indication may indicate that 10 gallons of gasoline have been added to the gas tank, and service is complete. At stage 18, the ride controller requests a sensor reading from the sensor controller 204. For example, the ride controller 214 may request a fuel sensor reading to verify that the service provider has provided the fuel noted in the service state indication. The service may relate to any component in the autonomous vehicle. Therefore, the ride controller may request sensor readings from any sensor, such as fluid level sensors, temperature sensors, door sensors (indicating whether the doors open or closed), lock sensors (indicating whether a lock is open or closed), tire pressure sensors, etc.

At stage 19, the ride controller 214 determines whether the sensor information is consistent with the indication of service status indication. For example, the ride controller 214 may determine that the fuel gauge indicates that 10 gallons of fuel were added to the fuel tank, and that fuel service is complete. In some embodiments, the ride controller may query sensors before service, and again after receipt of the ride service indicator. The ride controller can compare the sensor data to verify services noted in the ride service indication. At stage 20, the ride controller 214 sends an indication that the service is complete. This indication may include other information, such as changes to vehicle state (e.g., volume of fuel added, change in component functionality, etc.).

At stage 21, the fleet controller receives the indication that service is complete. At stage 21, the fleet controller provides value to the service provider. For example, the fleet provider may electronically transfer funds to the service provider, give ride credits usable for rides booked via the fleet controller, etc.

As noted above, in some embodiments, the operations shown in FIG. 5 may be performed by different components. For example, in some embodiments, the autonomous vehicle and ride service controller operate as peers without any fleet controller. In these embodiments, operations performed by the fleet controller in FIG. 5 are either omitted (e.g., forwarding operations) or performed by the peers. In peer embodiments (described throughout this specification), autonomous vehicles may publish requests directly to ride service controllers that have subscribed to receive such publications. Furthermore, some embodiments may omit certain operations, such as authentication and value provision. However, other embodiments may perform operations, such as operations for obtaining service from passengers of the autonomous vehicle (see discussion above). All components shown in FIG. 5 need not be present to constitute an embodiment of the inventive subject matter. For example, an embodiment may include only the autonomous vehicle without other external components such as the ride service controller and fleet controller.

Obtaining Parking Services

As autonomous vehicles move about performing various services, they may need access to parking spaces. In some instances, autonomous vehicles may be operating far away from their typical parking facilities, so they may need to find parking on an ad hoc basis. Some embodiments enable autonomous vehicles to find parking space virtually anywhere.

FIG. 6 is an operational flow diagram indicating operations for obtaining parking space, according to some embodiments the inventive subject matter. The operations shown in FIG. 6 occur in 18 stages and may be performed by an autonomous vehicle, fleet controller, and ride service controller.

At stage 1, an autonomous vehicle's ride controller detects a need to park. The need to park may arise from various situations, such as the autonomous vehicle has no pending ride service requests, and should park to conserve resources (e.g., fuel). Alternatively, the autonomous vehicle may need to park in a safe place if arriving to a destination very early—such as a long-haul ride that arrives several hours before a business destination is open. At stage 2, the autonomous vehicle's ride controller sends a parking request to the fleet controller. Parking requests may include information such as the vehicle's current location, current time, expected parking time, etc. At stage 3, the fleet controller receives the parking request. At stage 4, the fleet controller publishes the parking request to ride service controllers that have subscribe to receive parking requests. In some instances, all ride service controllers are subscribed to receive parking requests.

At stage 5, a ride service controller receives the parking request, and presents it in a graphical user interface. At stage 6, the ride service controller receives user input indicating acceptance of the parking request. At stage 7, the ride service controller sends an indication that the parking request has been accepted. The indication can identify an available parking spot, and give location information for the parking spot. Parking spots can be in traditional parking garages, or in residential areas. For example, some parking spots may be in residential driveways, residential garages, on residential streets, etc. In some instances, codes for raising gates, doors, and other access barriers may be provided with the indication of stage 7 or at some other stage. In some embodiments, the parking spot location information can indicate a landmark or other identifier useful in navigating the autonomous vehicle to the parking spot.

At stage 8, the fleet controller receives acceptance of the parking request, and forwards the parking spot location to the autonomous vehicle (stage 9). At stage 10, the autonomous vehicle's ride controller receives the parking spot location. At stage 11, the autonomous vehicle maneuvers to the parking spot. At stage 12, the ride controller sends an indication that the autonomous vehicle is parked in the parking spot. Additionally, the ride controller may record the time at which the autonomous vehicle parked. At stage 13, the fleet controller receives the indication that the vehicle is parked in the parking spot.

At stage 14, the autonomous vehicle's ride controller determines to move from the parking spot. In some instances, the ride controller may move from the parking spot because it has received a new ride request. In other instances, it may be moving to drop-off cargo, a passenger, or for any other suitable reason. At stage 15, the autonomous vehicle moves from the parking spot. At stage 16, the ride controller sends an indication that the autonomous vehicle has moved from the parking spot. At stage 17, the fleet controller receives the indication, and determines how long the vehicle was parked in the parking spot. In some instances, the indication includes the time spent in the parking spot. In other embodiments, the indication includes a timestamp, which is used by the fleet controller to determine how long the vehicle was parked in the parking spot. At stage 18, the fleet controller provides value for use of the parking spot. In some embodiments, the fleet controller electronically transfers funds or other value to an account associated with the parking user who accepted the parking request. In some embodiments, the fleet controller can cause provision of value on external financial accounts.

As noted above, in some embodiments, the operations shown in FIG. 6 may be performed by different components. For example, in some embodiments, the autonomous vehicle and ride service controller operate as peers without any fleet controller. In these embodiments, operations performed by the fleet controller in FIG. 5 are either omitted (e.g., forwarding operations) or performed by the peers. Furthermore, some embodiments may omit certain operations, such as authentication and value provision. However, other embodiments may and operations, such as operations for obtaining service from passengers of the autonomous vehicle (see discussion above). Furthermore, all components shown in FIG. 6 need not be present to constitute an embodiment of the inventive subject matter. For example, an embodiment may include only the autonomous vehicle—without other external components such as the ride service controller and fleet controller—that is configured cooperate with other suitable components.

In some embodiments, operations 3-8 are omitted because the fleet controller does not publish parking request. Instead, the fleet controller itself may determine the parking spot based on a database of available parking spots. In such case, the fleet controller determines the available parking spot, and notifies the autonomous vehicle about the available parking spot—see stages 9 and 10. In other embodiments, the fleet controller enables parking providers to register parking space through a separate interface. For such embodiments, the fleet controller determines parking spots, as noted above. In yet other embodiments, the autonomous vehicle and ride service controller operate as peers, whereby operations of the fleet controller are performed by peers. In these embodiments, operations for forwarding communications may be omitted.

Passenger Route Selection and Provision

When providing ride services to passengers, some embodiments automatically select routes between pickup points and destinations. Such automatic selection may be based on communications indicating current traffic conditions, chokepoints to avoid, and other information to optimize transit. However, other embodiments enable passengers to provide routes that will be followed by the autonomous vehicle.

FIG. 7 is an operational flow diagram illustrating operations for enabling a passenger to provide real-time turn-by-turn directions, according to some embodiments. The operations shown in FIG. 7 may be performed by a ride service controller and autonomous vehicle. The operations occur in nine stages.

Before a ride service controller begins the operations shown in FIG. 7, the autonomous vehicle has received a ride service request, and picked up a passenger. In some embodiments, the ride service request indicates a destination. At stage 1, the ride service controller presents a navigation interface with options including turn-by-for navigation. At stage 2, the ride service controller receives user input selecting turn-by-turn navigation. At stage 3, the ride service unit presents a turn-by turn interface including controls for processing input indicating upcoming turns. In some embodiments, the interface can include a left-facing arrow icon, and right-facing arrow icon. At stage 4, the autonomous vehicle begins the ride. In some embodiments, the vehicle's driving and guidance controller maneuvers the vehicle safely forward, while awaiting passenger-provided turn-by-turn route information. Although the passenger-provided in-ride route information determines route, it does not affect how the driving and guidance controller maneuvers the vehicle in traffic (e.g., around obstacles, between cars, etc.) In some embodiments, the turn-by-turn information does not directly maneuver the car, but instead provide a suggested path that will be taken if possible.

At stage 5, the ride service controller receives input in the turn-by-turn interface, or the input indicates a turn. As noted, at this point, the ride is underway. At stage 6, the ride service controller transmits the turn request to the autonomous vehicle. At stage 7, the autonomous vehicle's ride controller receives the turn request, and notifies the driving and guidance controller. At stage 8, the driving and guidance controller turns the vehicle per the turn request. For example, the autonomous vehicle turns right for a right-turn request. The process continues at stage 5, if the vehicle has not arrived at the destination.

Although the embodiments noted above vis-à-vis FIG. 7 describe receiving turn-by-turn input via a ride service controller, other embodiments receive data through other suitable devices. For example, the autonomous vehicle may include a touchscreen on which the turn-by-turn interface appears. Therefore, input received via the touchscreen travels through communication paths local to the autonomous vehicle (e.g., see FIG. 2A). In yet other embodiments, all turn-by-turn input is relayed to the autonomous vehicle via a fleet controller.

FIG. 8 is an operational flow diagram illustrating operations for enabling a passenger to provide route information, according to some embodiments. The operations shown in FIG. 8 may be performed by a ride service controller and autonomous vehicle. The operations occur in five stages.

Before a ride service controller begins the operations shown in FIG. 8, the autonomous vehicle has received a ride service request, and picked up a passenger. In some embodiments, the ride service request indicates a destination. At stage 1, the ride service controller presents a navigation interface through which the passenger can provide route information. The ride service controller presents a map in the navigation interface. At stage 2, the ride service controller receives input selecting a route by tracing a route on the map. At stage 3, the ride service controller sends the route information to the autonomous vehicle. At stage 4, the autonomous vehicle's ride controller receives the passenger-provided route information. At stage 5, the ride controller provides the route information to the autonomous vehicle's drive and guidance controller, which then causes the vehicle to maneuver to the destination according to the passenger-provided route.

Although the embodiments noted above vis-à-vis FIG. 8 describe receiving route information via a ride service controller, other embodiments receive data through other suitable devices. For example, the autonomous vehicle may include a touchscreen on which the map interface appears. Therefore, input received via the touchscreen travels through communication paths local to the autonomous vehicle (e.g., see FIG. 2A). In yet other embodiments, all route information input is relayed to the autonomous vehicle via a fleet controller.

Secure Ride Service

Certain ride customers may have safety concerns about riding in autonomous vehicles. For example, certain ride customers may be concerned about entering vehicles that may be occupied by unauthorized passengers. In other instances, parents may want to send their minor children as autonomous vehicle passengers without worry about unauthorized passengers, and without worry about them deviating from a chosen destination. Embodiments of the inventive subject matter address these and other issues, as described in more detail below.

FIG. 9 is an operational flow diagram illustrating operations for providing secure ride service, according to some embodiments. The operations shown in FIG. 9 may be performed by a ride service controller, autonomous vehicle, and fleet controller. The operation occur in 35 stages.

At stage 1, a ride service controller presents a ride interface. At stage 2, the ride service controller receives a request for a secure ride. The ride request can indicate a pickup location and a destination. At stage 3, the ride service controller sends a secure ride request to a fleet controller.

At stage 4, the fleet controller receives the secure ride request. At stage 5, the fleet controller creates one or more secure ride authentication credentials. In some embodiments, the secure ride credentials include a user identifier and password. The password can include any suitable characters. At stage 5, the fleet controller sends the secure ride request an authentication credentials to an autonomous vehicle. In some embodiments, the secure fleet controller may publish the ride request for acceptance by an autonomous vehicle (these operations are not discussed here).

At stage 6, an autonomous vehicle's ride controller receives the secure ride request and authentication credentials. As noted, the ride request may include a pickup location and destination for the ride. At stage 7, the ride controller verifies that the passenger compartment has no passengers and the doors are locked. In some embodiments, the ride controller may request various sensor information from a sensor controller. For example, the ride controller may evaluate data from seat sensors, microphones, door sensors, lock sensors, cameras, etc. to determine that the car is unoccupied. By evaluating microphone data, the ride controller can detect sounds caused by passengers in a passenger compartment. Similarly, the ride controller can evaluate camera data to confirm that there are no passengers in the passenger compartment. The ride controller may actuate locks into a locked position, and verify that position via lock sensors. At stage 8, the ride controller sends an indication that the autonomous vehicle is unoccupied and secure.

At stage 9, the fleet controller receives the indication that the autonomous vehicle is unoccupied and secure. At stage 10, the fleet controller forwards the indication on to the ride service controller.

At stage 11, the ride service controller receives and presents the indication that the autonomous vehicle is unoccupied and secure.

At stage 12, the autonomous vehicle maneuvers to the pickup location. At stage 13, the autonomous vehicle sends an indication that it has arrived at the pickup location. At stages 14, 15, and 16, the indication is received by the fleet controller, forwarded to the ride service controller, and presented in a user interface shown on the ride service controller.

At stage 17, at the pickup location, the autonomous vehicle requests the authentication credentials from the ride service controller over a personal area network (e.g., Bluetooth). That is, at stage 17, the autonomous vehicle authenticates the passenger over a local network by asking for the credentials (e.g., access code) via the passenger's ride service controller. The autonomous vehicle uses a personal area network to verify that authentication credentials are received from a person in proximity to the vehicle.

At stage 18, the ride service controller receives the request for authentication credentials. At stage 19, the ride service controller receives user input indicating the authentication credentials, and sends them to the autonomous vehicle. In some embodiments, user input is not needed, as the credential may be a digital certificate stored by the ride service controller and provided to the autonomous vehicle.

At stage 20, the autonomous vehicle's ride controller receives and verifies authentication credentials. Upon verifying the authentication credentials, the autonomous vehicle unlocks the door through which a passenger can enter a passenger compartment (see stage 21). At stage 22, the ride controller detects that the passenger is inside the passenger compartment, and at stage 23 locks the doors. The ride controller may detect the passengers inside the passenger compartment by the techniques noted above vis-à-vis stage 7. The operational flow continues on FIG. 10.

In some embodiments, the flow need not progress to FIG. 10. That is, some embodiments may implement a secure ride pickup without further operations for drop-off confirmation, as described in FIG. 10. Some embodiments may utilize a plurality of ride service controllers. More specifically, a first ride service controller may send secure ride request at stages 1-3, whereas a second ride service controller may provide authentication credentials at stage 19. Such embodiments may provide utility to a parent who (inside the house) uses the first ride service controller to request a secure ride for a child. After the autonomous vehicle arrives (outside the house), the child may use the second ride service controller to provide indication to the autonomous vehicle via a personal area network.

FIG. 10 is an operational flow diagram illustrating operations for providing secure ride service, according to some embodiments. At stage 24, the autonomous vehicle's ride controller detects arrival at the destination. At stage 25, the ride controller sends an arrival message, and requests authentication credentials. Additionally, the ride controller may provide a media stream showing audio and video captured from media devices of the autonomous vehicle. For example, a video feed may show area surrounding the autonomous vehicle, so a viewer can verify that the autonomous vehicle has arrived at the specified destination. The ride controller may also provide any other data relevant to showing that the passenger has arrived safely.

At stage 26, the fleet controller receives and forwards the arrival message and media feed to an associated ride service controller. At block 27, the ride service controller receives the arrival message including the media feed and request for authentication credentials. At stage 28, the ride service controller sends credentials over a wide area network. The ride service controller utilizes a wide area network because it may be remote from the autonomous vehicle. For example, a parent may have put their child in the autonomous vehicle at a pickup location across town, and now the parent will remotely provide the authentication code over the wide area network at the drop-off destination. At stage 29, the fleet controller receives and forwards the authentication credentials to the autonomous vehicle.

At stage 30, the autonomous vehicle's ride controller receives and verifies the authentication credentials. At stage 31, in response to verifying the authentication credentials, the ride controller unlocks doors that facilitate egress from the passenger compartment. At stage 32, the ride controller determines the passenger has exited the vehicle. In some embodiments, the ride controller determines the passenger is exited based on query sensor data (e.g., seat sensor data) and media from I/O devices (e.g., microphone, camera, etc.), etc. At stage 33, the ride controller sends an indication that the secure ride is complete. At stages 34, the fleet controller forwards the ride-complete indication. At stage 35, an associated ride service controller receives and presents the indication that the secure ride is complete. In some embodiments, the ride service controller is not associated with the passenger, as noted above in the parent-child example.

In some embodiments, if the drop-off location is unsatisfactory to the passenger or to the user who originally ordered the ride (e.g., based on the video feed or other information about the destination), the autonomous vehicle may transport the passenger to an alternative drop-off location.

Particularized Pickup and Drop-Off Locations

Ride customers may have pickup and drop-off preferences that cannot be specified using traditional addressed dereferencing via GPS mapping systems, GPS coordinates, etc. For example, a ride customer may want to be picked up in his driveway, and dropped off at a particular walkway of a building that has a specified street address. Traditional address dereferencing and GPS-guided navigation techniques may not necessarily lead to the specified pickup or drop-off location. Autonomous vehicle guidance systems can maneuver autonomous vehicles through traffic, around hazards, and though tight spaces. These guidance systems can be used to recognize locations (landmarks, structures, markers, etc.) specified by ride customers. For example, after maneuvering the vehicle to a destination using route information provided by other components (e.g., the ride controller), the driving and guidance system can use its capabilities to identify a specified location, such as landmark, structure, marker etc. By using the driving and guidance system's environment-perception capabilities, the ride controller can navigate the autonomous vehicle to very specific locations. Some embodiments may be equipped with separate components that identify specified drop-off locations (e.g., cameras, computer vision components, etc.).

FIG. 11 is an operational flow diagram illustrating operations for specifying a drop-off location, according to some embodiments. In FIG. 11, the operations occur in 23 stages. At stage 1, a ride service controller presents a ride selection interface. At stage 2, the ride service controller receives ride destination information, such as an address, GPS coordinates, or other information indicating a ride destination. At stage 3, the ride service controller receives drop-off location information that specifies a particular location at or about the destination. The drop-off location information can specify a landmark, marker, structure, or other physical description of a particular location at the destination. In some instances, a marker perceivable by the autonomous vehicle may reside at the drop-off location. In some embodiments, the marker may be a radiofrequency beacon, light beacon, beacon identifiable via computer vision, or any other suitable beacon perceptible to the autonomous vehicle. In some instances, the ride service controller presents a graphical depiction of the destination, and a passenger can select a particular location in the interface. For example, the ride service controller may present video content (still photos, motion video, etc.) recorded in and around the destination. Alternatively, the ride service controller may present animation or other graphical depiction of the destination The user may provide touchscreen input indicating the specific drop-off location. In another example, the ride service controller may present a plurality of predetermined drop-off locations (e.g., video containing graphical overlays representing selectable drop-off locations). In response, a passenger can select a drop-off location. The ride service controller can translate the input indicate a real-world marker, location, landmark, etc. For example, the ride service controller may identify the drop-off location as a mailbox, or a location at 10 feet north of the mailbox on the street. In some instances, content presented to the user has been tagged to facilitate identification of landmarks, locations, markers, etc.

At stage 4, the ride service controller sends the destination information and drop-off location information to the fleet controller. At stage 5, the ride service controller presents an option to save the drop-off location information in a rider profile associated with the passenger. At stage 6, the ride service controller sends the drop-off location information and destination information for storage in a rider profile associated with the passenger.

At stage 7, the fleet controller receives the destination and drop-off location information. In some embodiments, the drop-off location is represented by screen touch information and video frame identifier associated with a video frame depicting the destination. The fleet controller can process the screen touch location and video frame identifier to determine the drop-off location. The video frames may have associated metadata indicating lens parameters and other information that facilitate determining the drop-off location given the frame identifier. In other embodiments, the drop-off location information may include any data that enables the fleet controller to determine the drop-off location based on user input received by a ride service controller. At stage 8, the fleet controller sends the destination drop-off location information to an autonomous vehicle. For some embodiments in which the fleet controller determined a drop-off location based on data received from a ride service controller, the fleet controller may send other parameters more directly identifying the drop-off location. At stage 9, the fleet controller receives the request to store drop-off location information in a rider profile associated with passenger. At stage 10, the fleet controller stores the drop-off location information in the rider profile.

At stage 11, the autonomous vehicle's ride controller receives the ride destination information and drop-off location information. At stage 12, the autonomous vehicle maneuvers to the ride destination. In some embodiments, the autonomous vehicle's ride controller uses GPS-based map navigation to navigate to the ride destination. In some embodiments, the ride controller provides navigation information to the driving and guidance controller. At stage 13, the autonomous vehicle uses the drop-off location information to navigate to the drop-off location. In some embodiments, the ride controller provides drop-off information to the driving and guidance controller. The drop-off information can include information identifying a marker, landmark, structure, etc. Using the drop-off information, the driving and guidance system locates the drop-off location (e.g., locates a landmark using computer vision and video content captured by a camera, maneuvers to a homing signal, etc.). Also during stage 13, the ride controller can record operations for maneuvering and navigating the autonomous vehicle to the drop-off location. That is, the ride controller can measure direction of movement, distance of movement, terrain encountered, obstacles encountered, etc. while moving from the destination to the drop-off location. At stage 14, the ride controller sends a request for confirmation that the autonomous vehicle has arrived at the drop-off location.

At stages 15 and 16, the fleet controller receives and forwards the confirmation request. At stage 17, the ride controller receives the confirmation request and presents it in a user interface. At stage 18, the ride controller receives input indicating confirmation that the autonomous vehicle has arrived at the drop-off location. At stage 19, the ride controller transmits the confirmation.

At stage 20, the fleet controller receives and forwards the confirmation to the autonomous vehicle. At stage 21, the autonomous vehicle receives the confirmation. At stage 22, the ride controller transmits information (captured during stage 13) to the fleet controller, where the information is about navigating and maneuvering the autonomous vehicle from the destination to the drop-off location. At stage 23, the fleet controller stores the information in a rider profile for future use.

Just as some embodiments enable ride customers to specify drop-off location information, some embodiments enable users to specify a rendezvous point at a location. The ride pickup location can be specified by information such as an address, GPS coordinates, etc. A pick-up rendezvous point specifies a particular location at or about the pick-up location. The pick-up rendezvous location can be represented using information specifying a landmark, marker, structure, or other physical description of a particular location in proximity to the pick-up location. The discussion above describes how embodiments may enable users to specify pick-up rendezvous points.

As with all operational flows described here, embodiments can omit any of the operations shown in FIG. 11. That is, some embodiments may include less than all operations shown in FIG. 11. For example, some embodiments may omit operations related to saving drop-off locations for future use. As another example, some embodiments may omit operations for forwarding information because those embodiments may support certain direct communications between ride service controllers and autonomous vehicles. These examples do not make-up an exhaustive list of operations that may be omitted by some embodiments.

Autonomous Vehicle Ride Scheduling

Some embodiments provide an open autonomous vehicle ride scheduling platform that enables independent autonomous vehicle fleets to receive ride publications from ride customers who are using the open platform. FIGS. 12-15 describe operations performed by components of such an open platform.

Figure 12:
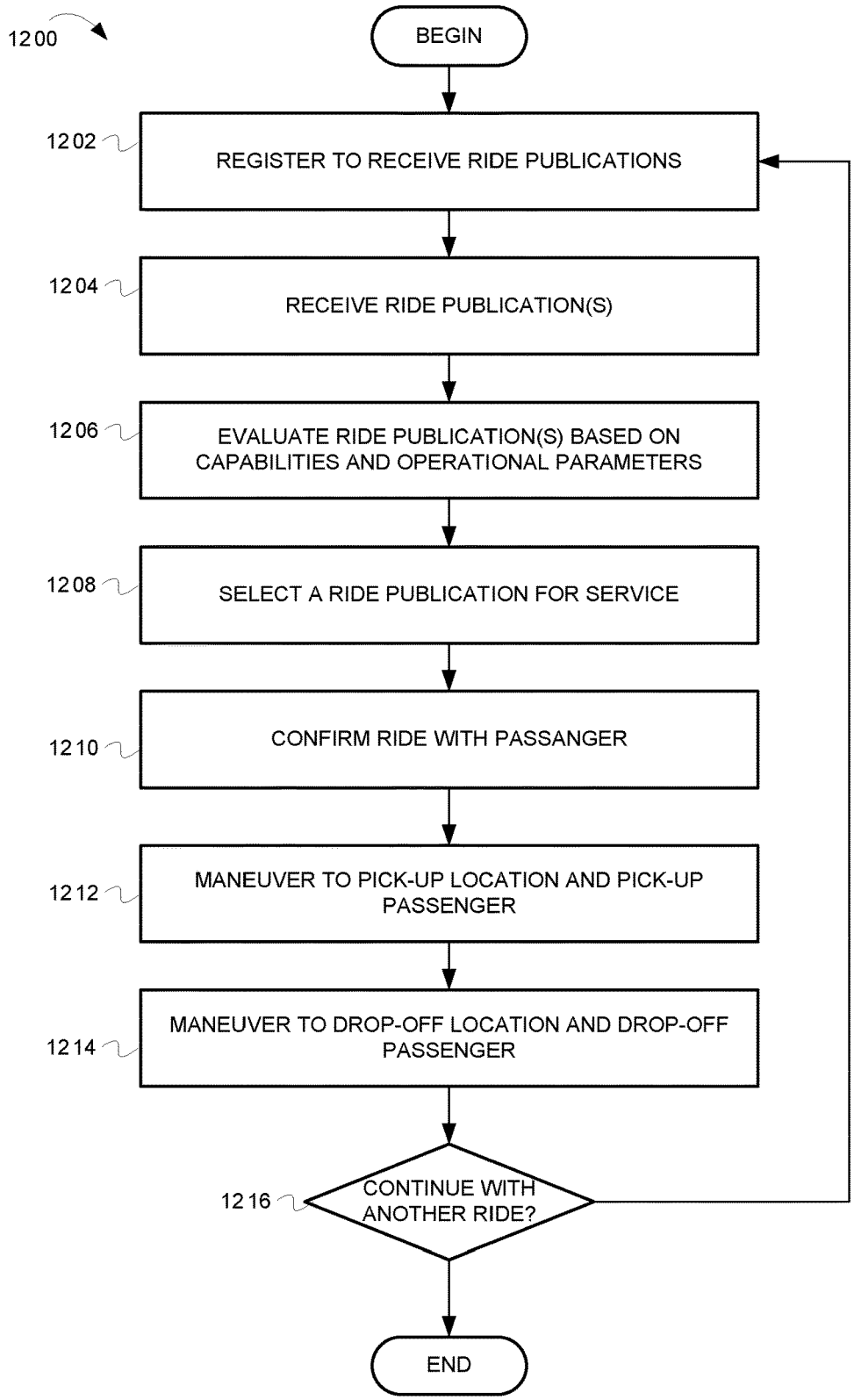
FIG. 12 is a flow diagram illustrating operations for registering an autonomous vehicle to receive ride publications, according to some embodiments of the inventive subject matter.

FIG. 12 is a flow diagram illustrating operations for registering an autonomous vehicle to receive ride publications, according to some embodiments of the inventive subject matter. FIG. 12 includes a flow 1200 which begins at block 1202.

At block 1202, an autonomous vehicle registers to receive ride publications. In some embodiments, the autonomous vehicle may register with a fleet controller or other component. Alternatively, the autonomous vehicle may register to receive ride publications directly from ride service controllers. The ride publications can include on-demand ride requests or predictive ride requests. The ride publications can indicate pickup locations, drop-off locations, passenger ride profiles (indicating ride references as described elsewhere herein), and any other information suitable for facilitating ride service by the autonomous vehicle.

In some embodiments, autonomous vehicles share vehicle profiles. Vehicle profiles can indicate capabilities, characteristics, operating parameters, and other information about an autonomous vehicle. For example, the capabilities can indicate seating capacity, speed ranges, road requirements and constraints (necessary road width, quality, etc.), geographic operating area, fuel range, time/distance until service is needed, component specifications, etc. The characteristics can include vehicle type, seating configuration, amenities (communications, entertainment, sleeping arrangements, food service, cabin space indication, etc.). The operating parameters can indicate times of operation, areas of operation, services needed during operation, etc. In some instances, vehicles may be categorized based on their overall desirability, where ride customers may pay different prices based in part on the vehicle's category.

The flow continues at block 1204.

At block 1204, the autonomous vehicle receives ride publications via a communication network, such as cellular phone network, satellite network, wide area network, or other suitable network. The flow continues at block 1206.

At block 1206, the autonomous vehicle's ride controller can evaluate ride publications based on the autonomous vehicle's capabilities and operational parameters. For example, the autonomous vehicle may be limited to a given geographical area, have a given range (for example, as limited by current fuel level), have a limited seating capacity, limited speed capacity, etc. The flow continues at block 1208.

At block 1208, the autonomous vehicle selects a ride publication for service. That is, the autonomous vehicle determines to provide ride service associated with a ride publication. For example, a ride publication may indicate that a passenger is to be picked up at a given location, and dropped off at a destination. At block 1210, the autonomous vehicle confirms the ride with a passenger associated with the ride publication. Such a confirmation can include exchanging electronic messages over a network to confirm a ride pickup location, and other ride information. Some embodiments may not perform the confirmation operation, such as embodiments that provide unobtrusive predictive ride scheduling (as discussed elsewhere herein). The flow continues at block 1212.

At block 1212, the autonomous vehicle's ride and drive controller maneuvers the autonomous vehicle to the pickup location, and the autonomous vehicle picks up the passenger. In some embodiments, the autonomous vehicle verifies that the passenger has been picked up by evaluating sensor data (e.g., seat sensor data, camera data, audio data, personal area network messaging between the autonomous vehicle and the passenger's ride service controller, etc.). The flow continues at block 1214.

At block 1214, the autonomous vehicle maneuvers to the drop-off location and drops off the passenger. The flow returns back to block 1202, if the autonomous vehicle chooses to continue processing ride publications (see block 1216). Otherwise, the flow ends.

Figure 13:
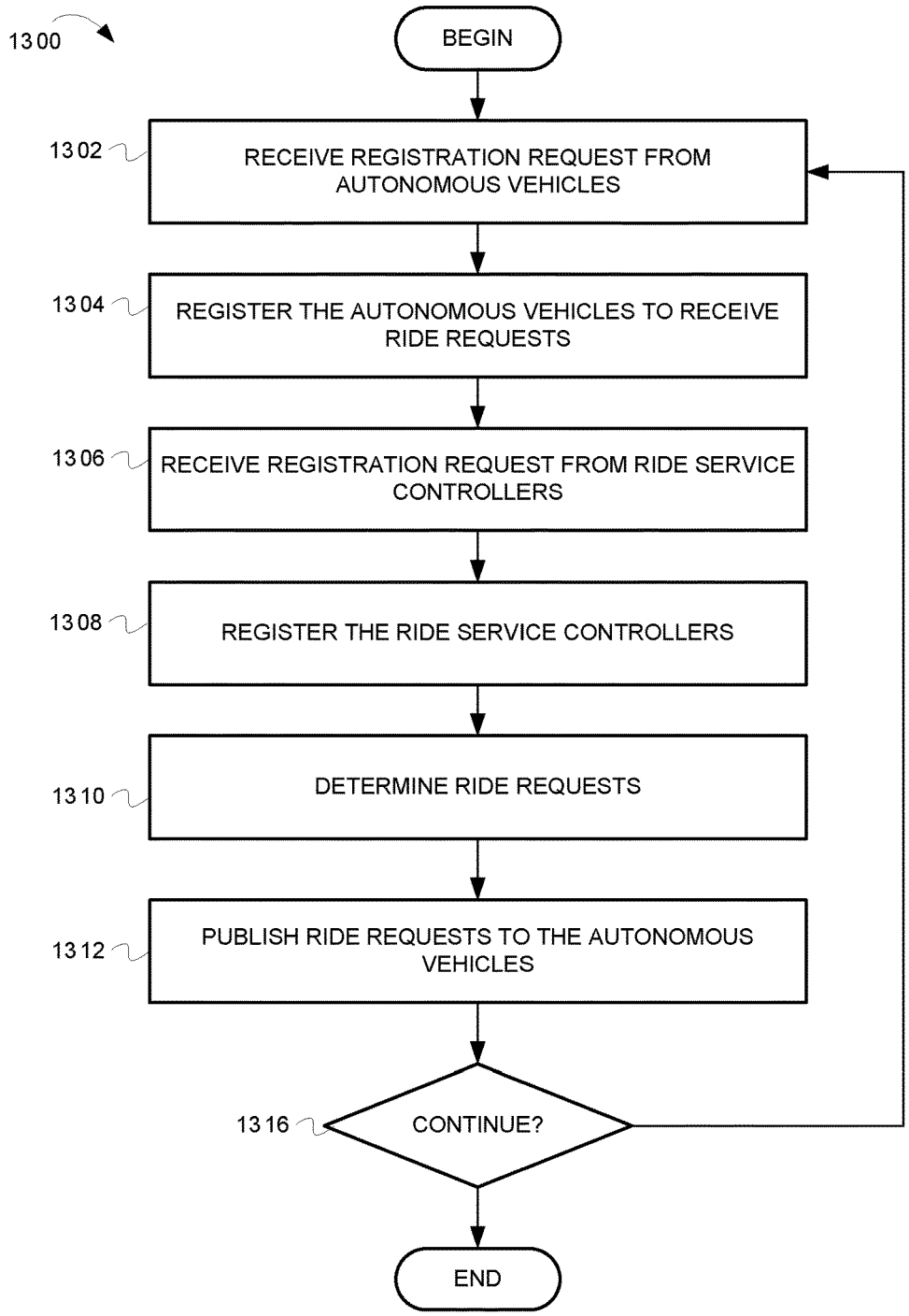
FIG. 13 is a flow diagram illustrating operations for registering autonomous vehicles to receive ride publications, according some embodiment of the inventive subject matter.

FIG. 13 is a flow diagram illustrating operations for registering autonomous vehicles to receive ride publications, according some embodiment of the inventive subject matter. In FIG. 13, a flow 1300 begins at block 1302.

At block 1302, a fleet controller receives registration requests from autonomous vehicles. The registration requests can include autonomous vehicle profiles indicating operational parameters for each autonomous vehicle. The fleet controller may use the vehicle profiles to determine ride publications to be published to any given autonomous vehicle. In some embodiments, the fleet controller publishes ride publications matching a vehicle's vehicle profile. The flow continues at block 1304.

At block 1304, the fleet controller registers the autonomous vehicles from which registration requests were received. The flow continues at block 1306.

At block 1306, the fleet controller receives registration requests from ride service controllers. The ride service controllers may send registration requests when a user opens a new account, newly enters an area serviced by the fleet controller, or in any other suitable situation. At block 1308, the fleet controller registers the ride service controllers. After registration, the fleet controller may receive ride requests from the ride service controllers. In some embodiments, after registration, the fleet controller publish predictive ride request associated with a passenger (predictive ride publication will be described in greater detail elsewhere herein).

At block 1310, the fleet controller determines ride requests. In some embodiments, the fleet controller receives ride request from ride service controllers (e.g., as a result of a user explicitly requesting a ride via the ride service controller). In other embodiments, the fleet controller itself can predict that the user will need a ride. In some embodiments, ride service controllers can productively request rides. The flow continues at block 1312.

At block 1312, the fleet controller publishes ride requests to the autonomous vehicles. If the fleet controller wants to continue, it loops back to 1302. Otherwise, the flow ends (see block 1316).

In some embodiments, the open platform is controlled by a central authority such as a corporation. For some centralized embodiments, fleet controllers can operate as centralized controllers. However, in some embodiments, the open platform is not controlled by any central authority (e.g., a corporate owner). In some decentralized embodiments, fleet controllers operate as peers, each having lists to track: autonomous vehicles that have registered to receive ride requests, ride requests that have been published, ride requests yet-to-be published, completed ride requests, ride requests for which value has been delivered, etc. In some embodiments, the decentralized peers store or otherwise have access to information about each autonomous vehicle such as make, model, range, passenger/cargo capacity, etc. In some embodiments, fleet controllers can store these lists in an open distributed immutable ledger (a.k.a. blockchain), where such a ledger can be implemented using Hyperledger, Ethereum, or any other suitable blockchain platform. Each fleet controller can periodically share these lists to maintain data coherency across the platform. In some embodiments, all components have access to the ledger. For such embodiments, fleet controllers may include open-source components that define rules for adding autonomous vehicles to the fleet, publishing rides, collecting value in exchange for rides provided by autonomous vehicles, providing value for operating fleet controllers and other infrastructure needed to operate the open platform. In some embodiments, these open-source components may be hosted by any suitable computing resources, such as spare computing resources (e.g., a private person may install the open-source components on a personal computing device). In some embodiments, fleet controller operators receive value in return for resources expended in operating fleet controllers. The fleet controller operators may receive value from the platform itself (e.g., value created by the platform itself), or they may receive value from accounts associated with passengers and/or autonomous vehicles. Although some embodiments include fleet controllers, other embodiments do not—as described below.

Figure 14:
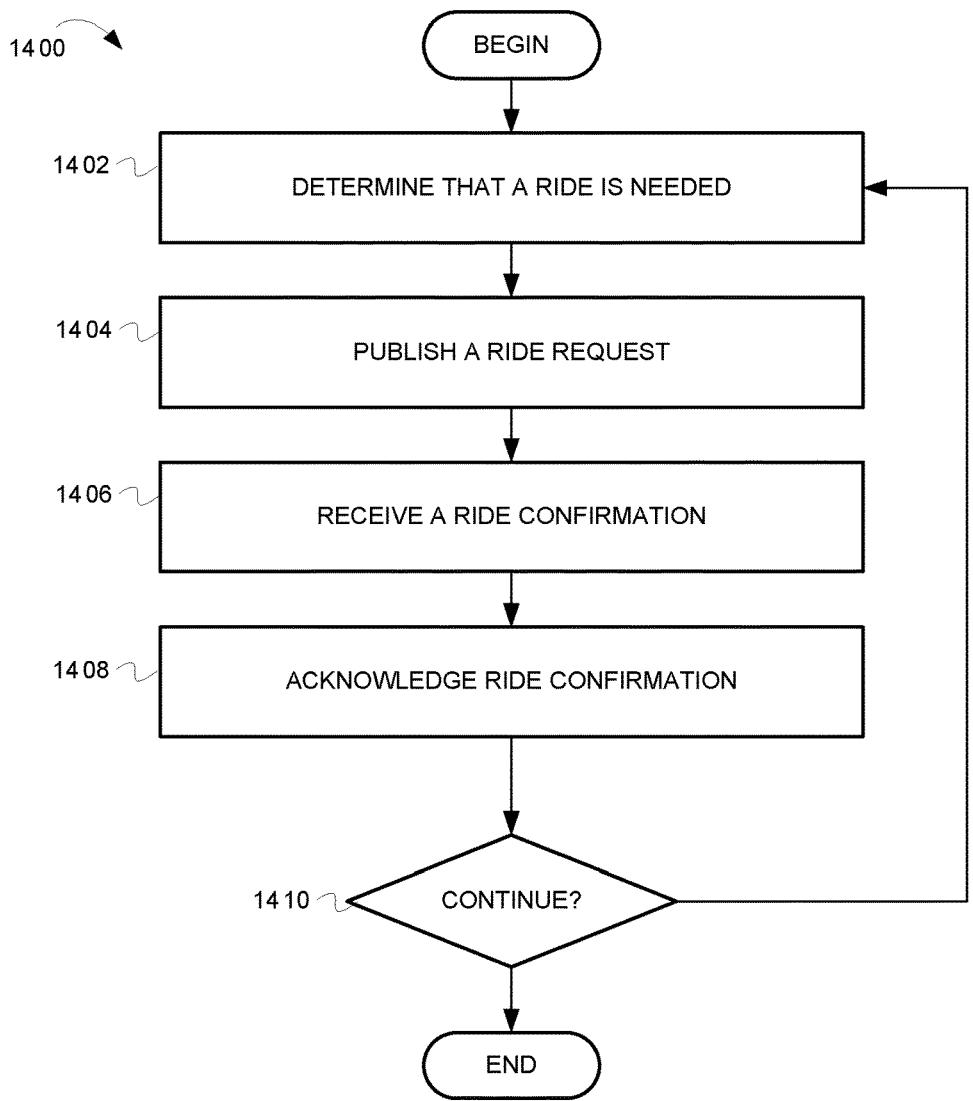
FIG. 14 is a flow diagram illustrating operations for publishing ride request from a ride service controller, according to some embodiments of the inventive subject matter.

FIG. 14 is a flow diagram illustrating operations for publishing ride request from a ride service controller, according to some embodiments of the inventive subject matter. In FIG. 14, a flow 1400 begins at block 1402.

At block 1402, the ride service controller determines that a ride is needed. In some embodiments, the ride service controller receives user input indicating a ride request. As discussed elsewhere herein, the ride request can include any suitable information for facilitating a ride. In some embodiments, the ride service controller predictively determines that a user will need ride service (see discussion about predictive ride scheduling below). The flow continues at block 1404.

At block 1404, the ride service controller publishes the ride request over a network. In some embodiments, the ride service controller publishes the request directly to autonomous vehicles that have subscribed to receive ride requests directly from the ride service controller. In other embodiments, the ride service controller publishes the ride request to a fleet controller. The flow continues at block 1406.

At block 1406, the ride service controller receives a ride confirmation indicating that an autonomous vehicle has accepted the ride request. In some embodiments, the ride confirmation is received directly from the autonomous vehicle, while in other embodiments is received from a fleet controller. The flow continues at block 1408, where the ride service controller acknowledges the ride confirmation. In some embodiments, the ride service controller receives user input acknowledging the confirmation, and it transmits a corresponding acknowledgment message to the autonomous vehicle. If the ride service controller chooses to continue (see block 1410), the flow loops back to 1402. Otherwise, the flow ends.

Figure 15:
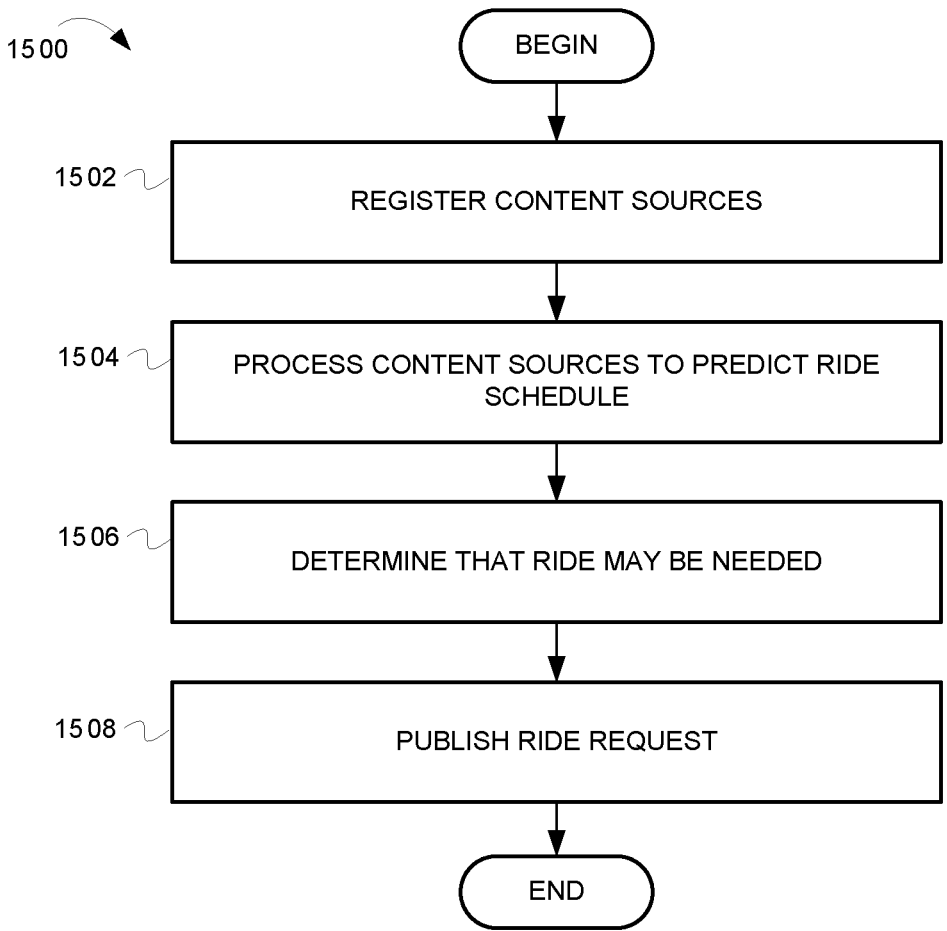
FIG. 15 is a flow diagram illustrating operations for predictively scheduling autonomous vehicle rides, according to some embodiments of the inventive subject matter.

FIG. 15 is a flow diagram illustrating operations for predictively scheduling autonomous vehicle rides, according to some embodiments of the inventive subject matter. FIG. 15 shows a flow 1500. The operations of the flow 1500 may be performed by any suitable component, such as one or more of a fleet controller, ride service controller, and autonomous vehicle. In the discussion of FIG. 15, the operations will be discussed vis-à-vis a fleet controller. However, in some embodiments, the operations are performed exclusively by a ride service controller, or other suitable device.

At block 1502, a fleet controller's predictive scheduling unit 418 registers content sources associated with a user account. The content sources can include remote calendars, social media accounts, passive or active voice monitoring applications, passive or active voice monitoring devices, text messaging applications, etc. In some embodiments, the remote content sources include a ride schedule that indicates times, pick-up locations, and destinations for rides needed by a particular user. In some embodiments, the fleet controller receives information from the content sources (e.g., via push, via pull, via becoming a social contact—a.k.a. friend—of a social media account, or any other suitable method for receiving information from the content sources). In some embodiments, the content sources are not associated with a particular user account. Instead, one or more content sources can indicate events (e.g., sporting events, public movie showings, gatherings, concerts, etc.) at which users may have ride service needs.

At block 1504, the fleet controller's predictive scheduling unit 418 processes information from the content sources. Using information received from these content sources, the fleet controller can predict when one or more users may need ride service. For example, the fleet controller can determine a user will need a ride based on calendar events, social media events, text conversations, voice data captured by passive listening devices, social media posts, etc. Some embodiments of the fleet controller use speech to text technology, natural language recognition technology, and other known techniques for parsing audio and text content. In some embodiments, the fleet controller utilizes remote services that offer such technologies (i.e., these technologies may not be native to the fleet controller).

At block 1506, based on processing the content sources, the fleet controller's predictive scheduling unit 418 determines that a ride may be needed. In some situations, the ride pickup location may be determined by a location of the ride service controller (as indicated by the ride service controller). In other situations, an event may indicate a pickup location. For example, the end of a sporting event at a given location may cause fleet controller to determine that a ride may be needed.

At block 1508, the fleet controller publishes the ride request. In some embodiments, as described above, autonomous vehicles have registered to receive ride publications from the fleet controller. Alternatively, at block 1508, a fleet controller may deploy a particular vehicle to service the ride request. In some embodiments, block 1508 is omitted, such as when an autonomous vehicle performs the flow 1500. Because embodiments may be predicting that one or more rides will be needed, there may be instances where autonomous vehicles accept ride requests, but where no user is at the pick-up location. For these instances, the autonomous vehicles may dismiss the ride requests after a given time, or after other conditions are met. From block 1508, the flow ends.

In some embodiments, the fleet controller (or alternatively autonomous vehicle) may receive content indicating that a ride will be needed at a designated pick-up location during a given time range (the range can be open-ended) (e.g., see blocks 1502 and 1504). Because the ride time is a range (and not a specific time), the fleet controller (or alternatively autonomous vehicle) can monitor location of a ride service controller. After detecting that the ride service controller is within proximity (e.g., as predetermined or dynamically determined) of the pick-up location, the fleet controller publishes the ride request. If an autonomous vehicle performs the operations, the autonomous vehicle can move to the pick-up location after determining that a particular ride service controller is in proximity to the pick-up location.

As noted above, although the operations of the flow 1500 are described vis-à-vis the fleet controller, the operations may be performed exclusively by a ride service controller. Alternatively, these operations may be performed cooperatively by a ride service controller autonomous vehicle, and fleet controller.

Accepting a Ride Request with Conditions

Sometimes autonomous vehicles can accept ride requests under certain conditions that may affect ride service. For example, an autonomous vehicle may have a scheduled pickup for a given time, but may service additional ride requests before the given time. The autonomous vehicle may accept a ride request upon a condition that the ride concludes by specified time, so the autonomous vehicle may arrive at the scheduled pickup. Similarly, users may request rides based on specific conditions such as route, time to destination, vehicle type, etc.

Figure 16:
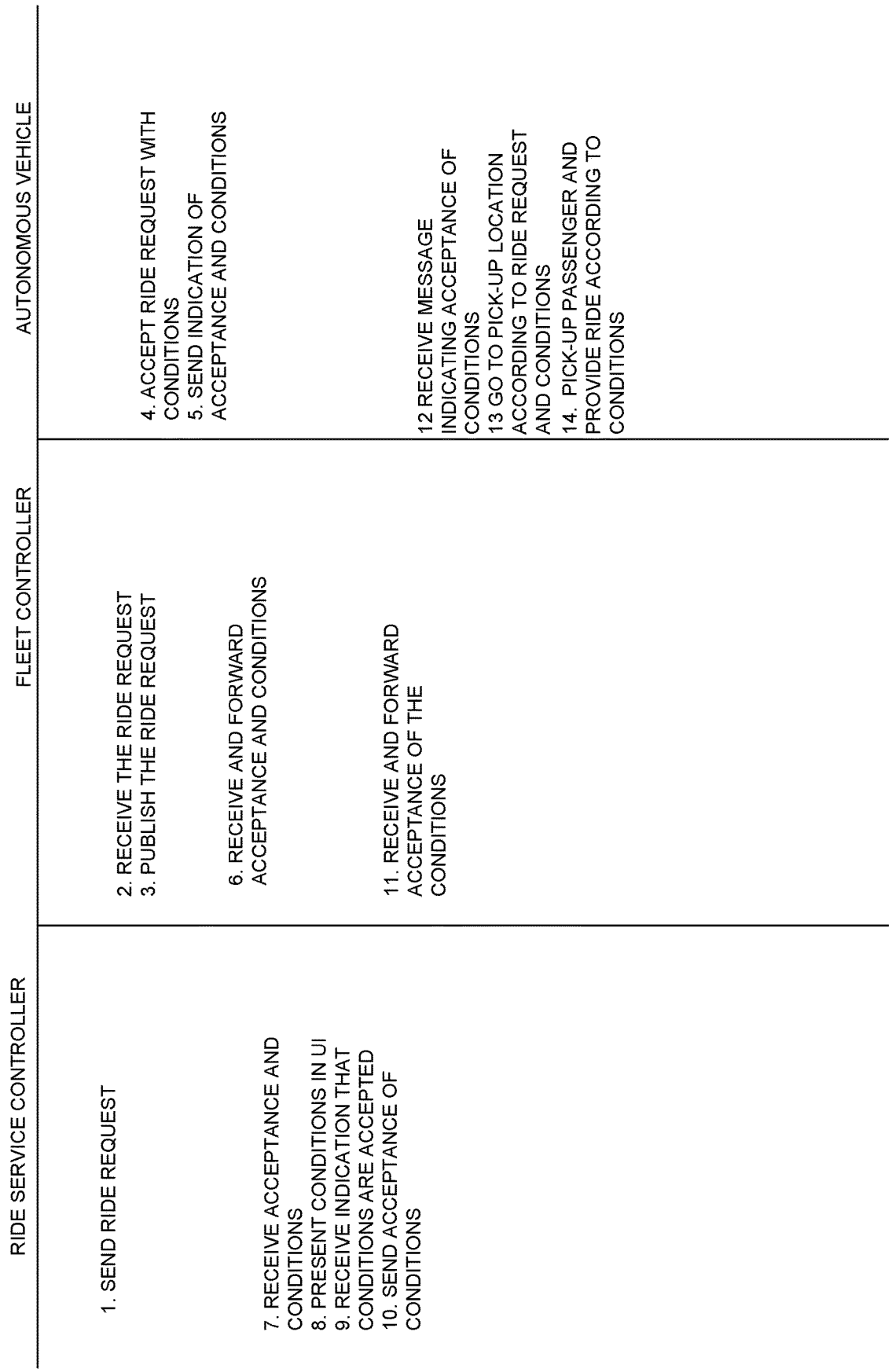
FIG. 16 is an operational flow diagram showing operations for servicing ride requests based on conditions, according to some embodiments.

FIG. 16 is an operational flow diagram showing operations for servicing ride requests based on conditions, according to some embodiments. The operations shown in FIG. 16 are performed by a ride service controller, fleet controller, and autonomous vehicle. The operations occur in 14 stages.

At stage 1, a ride service controller sends a ride request. The ride request is associated with a user account and may indicate a pickup location, destination, and other information for facilitating ride service. The ride request may include conditions specified by user (i.e., potential passenger). At stage 2, the fleet controller receives the ride request.

At stage 3, the fleet controller publishes the ride request to a fleet of autonomous vehicles.

At stage 4, an autonomous vehicle's ride controller accepts the ride request with conditions. As noted above, the autonomous vehicle may have a scheduled ride for which it must be at a given pickup location at a given time. As a result, the autonomous vehicle may accept the ride request, and indicate the condition of the ride—that the ride must conclude by a given time. The autonomous vehicle specifies that the ride must conclude at the given time, so it can service the scheduled ride on time. Other ride conditions may include limited cargo space, limited seating, that the passenger must perform certain services on the autonomous vehicle (e.g., add fuel, clean components, etc.), answer a questionnaire about the autonomous vehicle's cleanliness, etc. As noted, the user (i.e., potential passenger) may have specified conditions for a ride. In some cases, the autonomous vehicle and user may both specify conditions for a ride. At stage 5, the autonomous vehicle's ride controller sends a message indicating acceptance and conditions for the ride. At stage 6, the fleet controller receives and forwards the acceptance and conditions.

At stage 7, the ride service controller receives a message indicating that the ride request has been accepted with conditions. At stage 8 the ride service controller presents the conditions in a user interface for inspection by the user. At stage 9, the ride service controller receives an indication that the conditions are accepted by the user. At stage 10, the ride service controller sends acceptance of the conditions.

At stage 11, the fleet controller receives acceptance of the conditions and forwards a message to the autonomous vehicle. At stage 12, the autonomous vehicle's ride controller receives the message indicating acceptance of the conditions. At stage 13, autonomous vehicle's ride controller instructs the autonomous vehicle to go to the pickup location according to the ride request and conditions. At stage 14, the autonomous vehicle's ride controller instructs the autonomous vehicle to pick-up the passenger and provide the ride according to the ride conditions and ride request.

Although not shown in the flow, if the autonomous vehicle's ride controller determines that ride conditions are not met, it may take remedial action. For example, if a condition indicates a time limit that has been exceeded, the ride controller may instruct the autonomous vehicle to end the ride service by parking at a safe location, and prompting the passenger to exit the vehicle. If the passenger does not exit, the ride controller may record negative feedback to the passenger's account, where the negative feedback will affect future ride service. According to embodiments, autonomous vehicles can take any reasonable measures necessary for ending rides, and providing feedback to passenger accounts.

In some embodiments, the autonomous vehicles themselves do not accept ride requests. In such embodiments, fleet controllers receive ride requests and make ride assignments to the autonomous vehicles. For such embodiments, the fleet controllers can assign ride requests that have conditions which must be accepted by users, as described above.

In some embodiments, components of the open platform utilize blockchain technology (i.e., decentralized embodiments) that supports smart contracts (e.g., Etherium). In one embodiment, the ride conditions may be represented in a smart contract (i.e., immutable code added to the blockchain) between the passenger and vehicle owner. If conditions of the smart contract are met, value is exchanged between accounts associated with the passenger and the autonomous vehicle. In some embodiments, the smart contract may be implemented in Etherium's Solidity programming language.

Multiple Autonomous Vehicles to Service One Ride Request

In certain situations, servicing the ride request may require multiple autonomous vehicles. For example, a ride request may require a small vehicle (e.g., motorized three-wheeled scooter) to fit in narrow pathways around a pickup location, and a high-speed vehicle for traveling over highways en route to a destination. For a ride request that requires multiple autonomous vehicles, embodiments can acquire service by the necessary vehicles, and coordinate rendezvous points at which a passenger can change vehicles.

FIG. 17 is an operational flow diagram illustrating operations for servicing a ride request that requires multiple autonomous vehicles, according to some embodiments. In some embodiments, the flow is performed by a service controller, fleet controller, first autonomous vehicle, and second autonomous vehicle. Although two autonomous vehicles are shown in FIG. 17, embodiments can work with any suitable number of vehicles. The operations occur in 21 stages.

At stage 1, a ride service controller receives a ride request in a user interface and sends the ride request for service. At stage 2, a fleet controller's fleet unit receives the ride request. At stage 3, the fleet unit determines that a plurality of autonomous vehicles are needed to service the ride request. At stage 4, the fleet unit determines rendezvous points at which the autonomous vehicles may meet. At stage 5, the fleet unit publishes a plurality of ride requests. The ride requests may indicate the rendezvous points, and vehicle capabilities needed to service the ride request.

At stage 6, a first autonomous vehicle (shown as AV1 in FIG. 17), and a second autonomous vehicle (shown as AV2 in FIG. 17) receive and accept the ride request. The ride request can indicate that multiple autonomous vehicles will be servicing the request and rendezvous points to enable a passenger to switch vehicles to continue ride service. Additionally, the ride request may include rendezvous locations. In some instances, the rendezvous locations may change based on traffic conditions, time constraints, and other factors. At stage 7, the autonomous vehicles send acknowledgments indicating acceptance of the ride request. At stage 8, the fleet controller's fleet unit receives the acknowledgments indicating the necessary vehicles have accepted the ride request. Additionally, the fleet unit forwards acknowledgment to the ride service controller. At stage 9, the ride service controller receives and presents in a user interface an indication that the ride request has been accepted.

At stage 10, the first autonomous vehicle's ride controller instructs the vehicle's driving and guidance system to maneuver to the pickup location associated with the ride request. At stage 11, the autonomous vehicle picks-up the ride requester. At stage 12, the autonomous vehicle's ride controller instructs the driving and guidance system to maneuver to a rendezvous point. In some embodiments, the rendezvous point indicated in the ride request may be undesirable because of changing conditions, such as traffic, road conditions, events, etc. As a result, some embodiments can dynamically determine a rendezvous point based on factors such as ease of access, convenience related to changing vehicles, an approximate midpoint between two vehicles, a location that will take each vehicle approximately the same time to reach, or any other suitable factor.

At stage 13, the autonomous vehicle drops-off the ride requester. At stage 14, the autonomous vehicle sends an indication confirming the ride requester has been dropped off. At stage 15, the fleet controller's fleet unit receives the confirmation.

At stage 16, the second autonomous vehicle's ride controller instructs the vehicle's driving and guidance system to maneuver to the rendezvous point. In some instances, if a ride requester has been dropped-off, the rendezvous point may change based on the ride requester's geographic location as indicated by the ride service controller. If the rendezvous point changed, the autonomous vehicle proceeds to the new rendezvous location to pick-up the ride requester. At stage 18, the autonomous vehicle picks up the ride requester. At stage 18 autonomous vehicle's ride controller instructs the vehicle's driving and guidance systems to maneuver to a destination. At stage 19, the autonomous vehicle drops-off the ride requester. At stage 20, the autonomous vehicle confirms the drop-off. At stage 21, the fleet controller receives the drop-off confirmation.

Remote Ride Input by Non-Passenger

Figure 18:
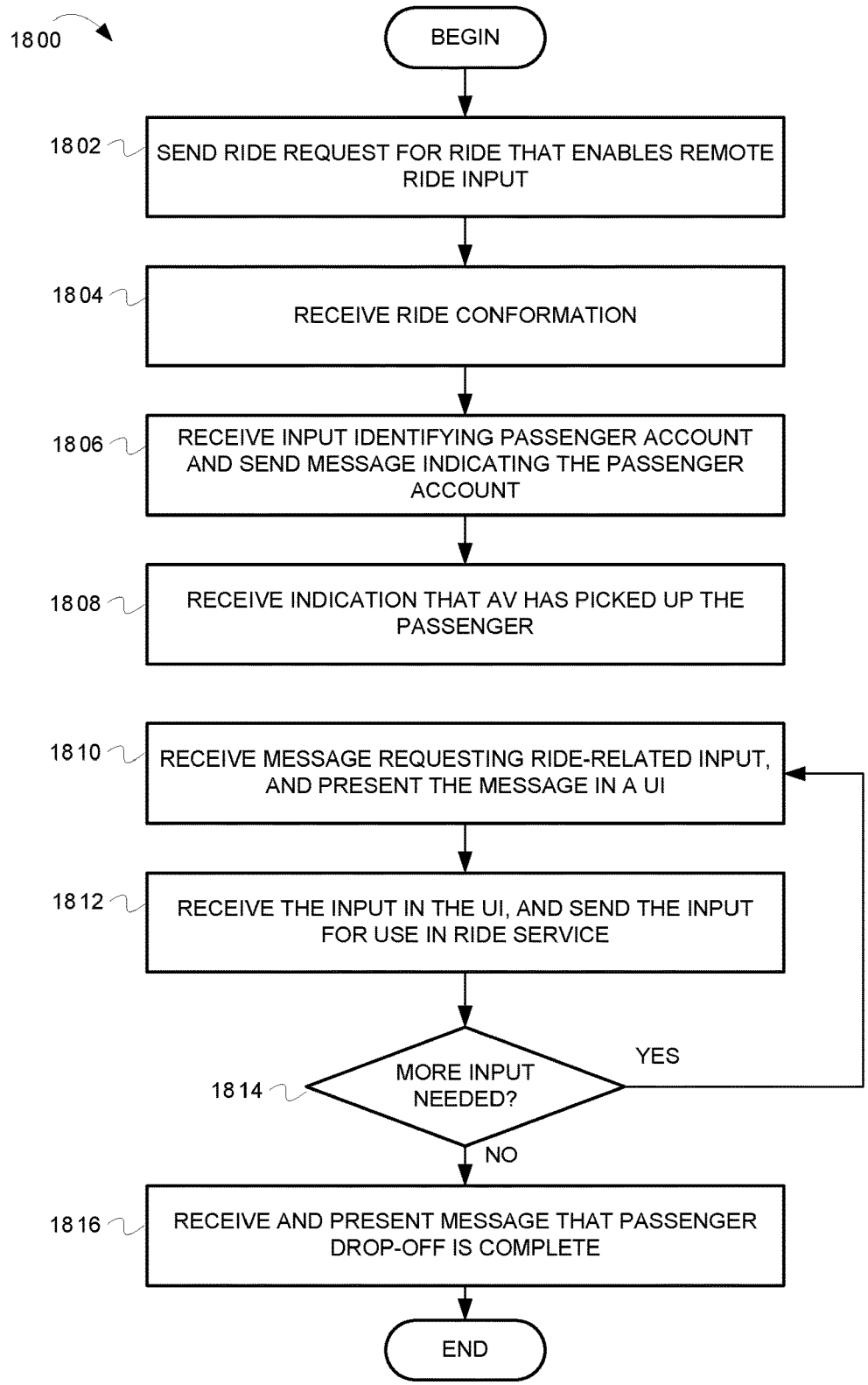
FIG. 18 is a flow diagram illustrating operations that facilitate ride-related input by an non-passenger.
Figure 19:
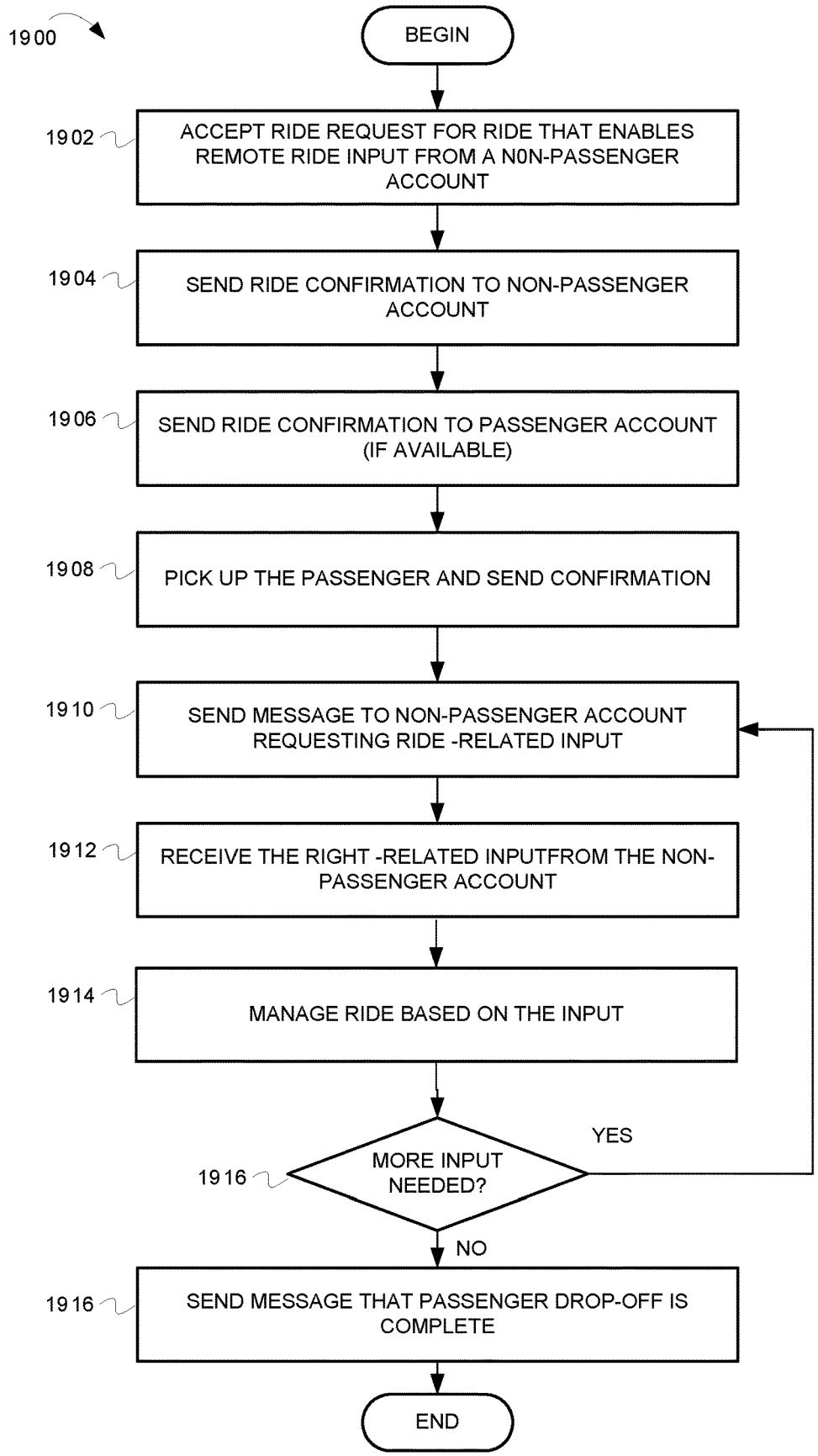
FIG. 19 is a flow diagram illustrating operations for obtaining ride-related input, according to some embodiments of the inventive subject matter.

Some embodiments enable non-passengers to provide input relevant to ride service. These embodiments enable people to assist others in utilizing ride service, such as those not able to operate a ride service controller or those otherwise unable to provide ride-related input necessary for utilizing ride service. FIGS. 18 and 19 describe operations that facilitate remote ride input by non-passengers.

FIG. 18 is a flow diagram illustrating operations that facilitate ride-related input by an non-passenger. In FIG. 18, a flow 1800 begins at block 1802.

At block 1802, a ride service controller sends a ride request for a ride that enables remote ride-related input. In some instances, the ride request originates from a user that will not be a passenger in the ride. In some instances, the ride service controller sends the ride request to a fleet controller, which publishes the ride request for acceptance by any autonomous vehicle in a fleet. In other instances, the ride service controller sends the ride request directly to autonomous vehicles capable of accepting the request. The flow continues at block 1804.

At block 1804, the ride service controller receives the confirmation that the ride request has been accepted. The confirmation may originate from a fleet controller or from an autonomous vehicle.

At block 1806, the ride service controller receives user input (e.g., from non-passenger via a touchscreen) identifying an account for the passenger, and the ride service controller sends a message indicating the passenger account. The ride service controller may send the message to a fleet controller that notifies an autonomous vehicle, or it may send the message directly to the autonomous vehicle. The flow continues at block 1808.

At block 1808, the ride service controller receives an indication that the autonomous vehicle has picked up the passenger.

At block 1810, the ride service controller receives a message requesting ride-related input affecting the passenger's ride, and presents the message in a user interface. The ride-related input may relate to a route for the ride, cabin conditions (temperature, media selection, etc.), particular drop-off location at the destination, or any other relevant information that can be used to facilitate ride service. At block 1812, the ride service controller receives the ride-related input via the user interface (e.g., via touchscreen input), and sends the right-related input for use in a ride service. In some embodiments, the ride service controller sends the ride-related input to the autonomous vehicle, while in other embodiments, it sends the ride-related input to a fleet controller. The fleet controller may forward the ride-related input onto one or more autonomous vehicles. At block 1814, the ride service controller determines whether more ride-related input is needed. If more ride-related input is needed, the flow loops back to block 1810. Otherwise, the flow continues at block 1816.

At block 1816, the ride service controller receives and presents a message indicating that the passenger was dropped-off and the ride is complete. From block 1816, the flow ends.

In some embodiments, the autonomous vehicle and fleet controller can communicate with the passenger's ride service controller. Even though the passenger may not be providing the ride-related input, embodiments may provide the passenger's ride service controller with notifications indicating ride-related inputs received for the ride, and other information about the ride.

In some embodiments, the operations shown in FIG. 18 are performed by a ride service controller. The discussion continues with some embodiments in which the autonomous vehicle performs operations for soliciting ride-related input from a non-passenger.

FIG. 19 is a flow diagram illustrating operations for obtaining ride-related input, according to some embodiments of the inventive subject matter. In FIG. 19, the flow 1900 begins at block 1902. At block 1902, an autonomous vehicle's ride controller accepts a ride request for ride, where the ride request indicates ride-input should be received from an account associated with a non-passenger. The flow continues at block 1904.

At blocks 1904 and 1906, the ride controller sends, to one or more accounts, a confirmation that the ride has been accepted. In some embodiments, the accounts include a non-passenger account from which input will be received, and an account associated with a soon-to-be passenger of the ride. The flow continues at block 1908.

At block 1908, the ride controller instructs the autonomous vehicle's driving and guidance system to maneuver to a pickup location and pick-up a passenger. Additionally, the ride controller sends a confirmation to the non-passenger account that the passenger has been picked up. Flow continues at block 1910.

At block 1910, the ride controller sends a message requesting ride-related input to the non-passenger account. At block 1912, the ride controller receives the ride-related input from the non-passenger account. In some embodiments, the ride-related input can specify selection of available route options, driving style, cabin conditions (e.g., cabin air temperature, cabin air flow, etc.), media presentation, ground speed and acceleration preferences, etc. At block 1914, the autonomous vehicle's ride controller manages the ride based on the ride-related input. For example, after receiving ride-related input related to cabin temperature, the ride controller adjusts cabin temperature according to the input. As another example, the ride controller may instruct the autonomous vehicle's driving and guidance system to navigate according to a route indicated in the ride-related input. Flow continues at block 1916.

At block 1916, the ride controller determines whether more ride-related input will be needed. If more input is needed, the flow loops back to block 1910. Otherwise, the flow continues at block 1916. At block 1916, after the ride controller determines that the ride is complete, the ride controller sends a message indicating that passenger drop-off is complete. From block 1916, the flow ends.

Although the discussion of FIG. 19 describes operations being performed by an autonomous vehicle, some embodiments may and operations by one or more other components (e.g., fleet controller).

Fleet Configuration Based on Ride Information

Some embodiments enable dynamic configuration of autonomous vehicles in the field. In some instances, configuration parameters are selected based on ride information associated with the autonomous vehicles. For example, embodiments may receive ride information indicating traffic conditions, ride directions, and other ride-related information. Based on the ride information, embodiments can reconfigure autonomous vehicles to operate with better utilization and/or efficiency. However, some embodiments can reconfigure autonomous vehicles to operate with reduced utilization and/or efficiency, where changes in utilization and/or efficiency improve passenger experiences, ride quality, or other ride-related characteristics.

Figure 20:
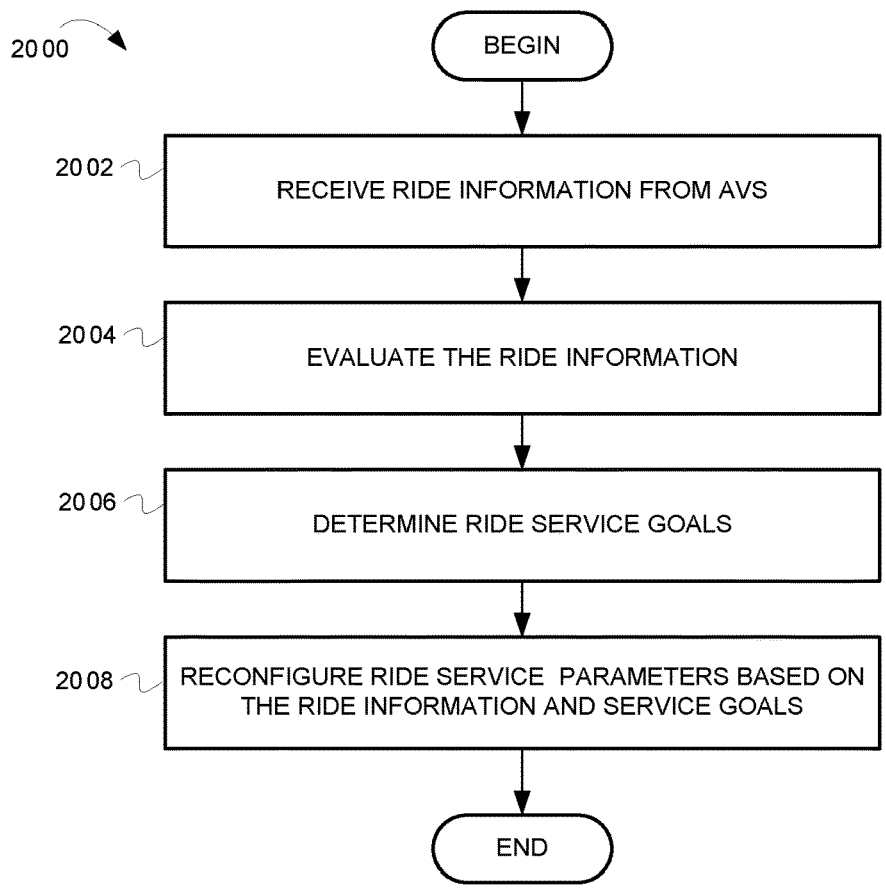
FIG. 20 is a flow diagram illustrating operations for fleet configuration, according to some embodiments.

FIG. 20 is a flow diagram illustrating operations for fleet configuration, according to some embodiments. FIG. 20 includes a flow 2000, which begins at block 2002. At block 2002, the fleet controller receives ride information from one or more autonomous vehicles. The ride information can include information about traffic information, pick-up and drop-off times, ride durations, fuel consumption, differences between estimated ride time and actual ride time, cabin conditions, media presentation selections, speed information, acceleration information, route information, pick-up locations, destinations, geographic locales in which vehicles operate, etc. In some embodiments, the ride information includes any suitable information collected by one or more sensors of an autonomous vehicle. Additionally, the ride information can include preferences, selections, and any other information received by (or otherwise determined by) one or more ride service controllers. The flow continues at block 2004.

At block 2004, the fleet controller evaluates the ride information. At block 2006, the fleet controller determines ride service calls. In some embodiments, the fleet controller evaluates the ride information to achieve goals including fleet utilization, fleet efficiency, fleet quality, etc. To increase utilization, the fleet controller may reconfigure ride parameters that affect utilization. For example, the fleet controller may reconfigure the following parameters to increase utilization:

Pick-up and/or location parameters that cause autonomous vehicles to pick-up passengers in easily accessible locations, to pick-up passengers in locations that require less waiting for autonomous vehicles.

Geographic locale parameters that cause autonomous vehicles to operate in geographic locales that typically have acceptable numbers of ride request.

Ride prioritization parameters that cause autonomous vehicles to more readily accept rides that meet designated criteria, such as estimated distance, estimated duration, etc., while accepting fewer rights that do not meet the designated criteria.

The fleet controller may reconfigure the following parameters to increase efficiency.

Route selection parameters to cause selection of more efficient routes that enable autonomous vehicles to move from pick-up locations to destinations more quickly.

Speed and/or acceleration parameters to cause the autonomous vehicle to carry-out rides more quickly, with less fuel consumption, or with less wear on certain vehicle components.

Ride prioritization parameters that cause autonomous vehicles to more readily accept rides that meet designated criteria, such as estimated distance, estimated duration, etc., while accepting fewer rights that do not meet the designated criteria.

In some embodiments, the ride parameters noted above can be reconfigured to increase ride quality. For example, route selection parameters may cause selection of less efficient routes that are more comfortable for passengers. As another example, ride prioritization may cause longer waiting for pickup but less ride time. Additional ride quality examples are: reconfiguration of speed and/or acceleration parameters for comfort, reconfiguration of geographic locale parameters to extend ride service to more locations, reconfiguration of fuel consumption parameters to maintain more desirable speeds, etc.

At block 2008, the fleet controller reconfigures ride service parameters based on the ride information and ride service goals. As part of the reconfiguration, the fleet controller may send the ride service parameters to autonomous vehicles over a wireless network. From block 2008, the flow ends.

Figure 21:
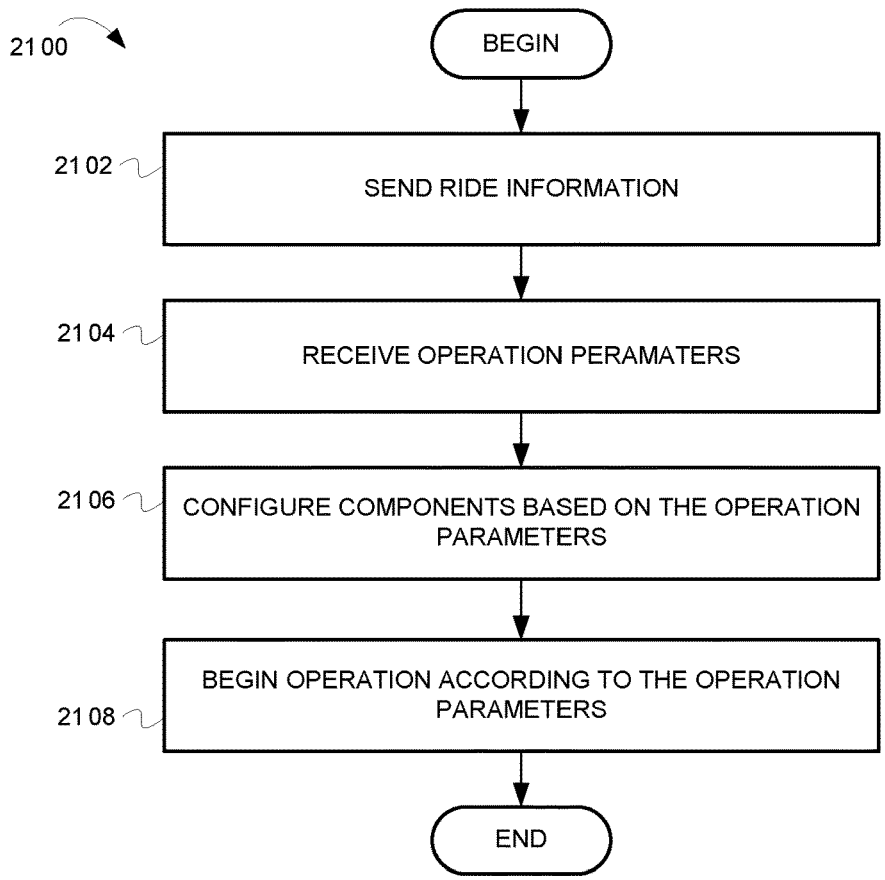
FIG. 21 is a flow diagram illustrating operations for receiving ride parameters, and providing ride service based on the ride parameters.

FIG. 21 is a flow diagram illustrating operations for receiving ride parameters, and providing ride service based on the ride parameters. In FIG. 21, a flow 2100 begins at block 2102. At block 2102, an autonomous vehicle sends ride information to the fleet controller over wireless network. The ride information can include information about traffic information, pick-up and drop-off times, ride durations, fuel consumption, differences between estimated ride time and actual ride time, cabin conditions, media presentation selections, speed information, acceleration information, route information, pick-up locations, destinations, geographic locales in which vehicles operate, etc. In some embodiments, the ride information includes any suitable information collected by one or more sensors of the autonomous vehicle. Additionally, the ride information can include preferences, selections, and any other information received by autonomous vehicle from one or more ride service controllers. The flow continues at block 2104.

At block 2104, the autonomous vehicle receives ride parameters from a fleet controller. The ride parameters can relate to: geographic locale of operation, ride prioritization, prioritized pick-up locations, prioritized drop-off locations, available routes types, speed range, acceleration range, hours of operation, etc. the ride parameters can include any parameters that facilitate efficiency, comfort, or utilization. The flow continues at block 2106.

At block 2106, the autonomous vehicle's ride controller configures components based on the ride parameters. At block 2108, the autonomous vehicle's ride controller begins operation according to the ride parameters. For example, the ride controller begins accepting rides according to ride priorities indicated in the ride parameters. As another example, the ride controller offers certain route options to passengers, as indicated by the ride parameters. From block 2108, the flow ends.

In some embodiments, the fleet controllers can optimize traffic flow by reconfiguring ride parameters for large fleets. For example, a road may become overcrowded with autonomous vehicles, thereby causing stop and go conditions. To reduce congestion, and fleet controller can reconfigure operational parameters to eliminate the congested road as an acceptable route option. If overall conditions in a locale are congested, the fleet controller can redeploy one or more autonomous vehicles to another geographic locale by reconfiguring those vehicles' ride parameters. Alternatively, the fleet controller can delay pickups and until congestion eases, thereby increasing pick-up weight time, but decreasing ride time and congestion. Although ride parameters can be used to affect any particular autonomous vehicle, embodiments can utilize ride parameter reconfiguration to address overall fleet utilization, efficiency, or comfort.

Figure 22:
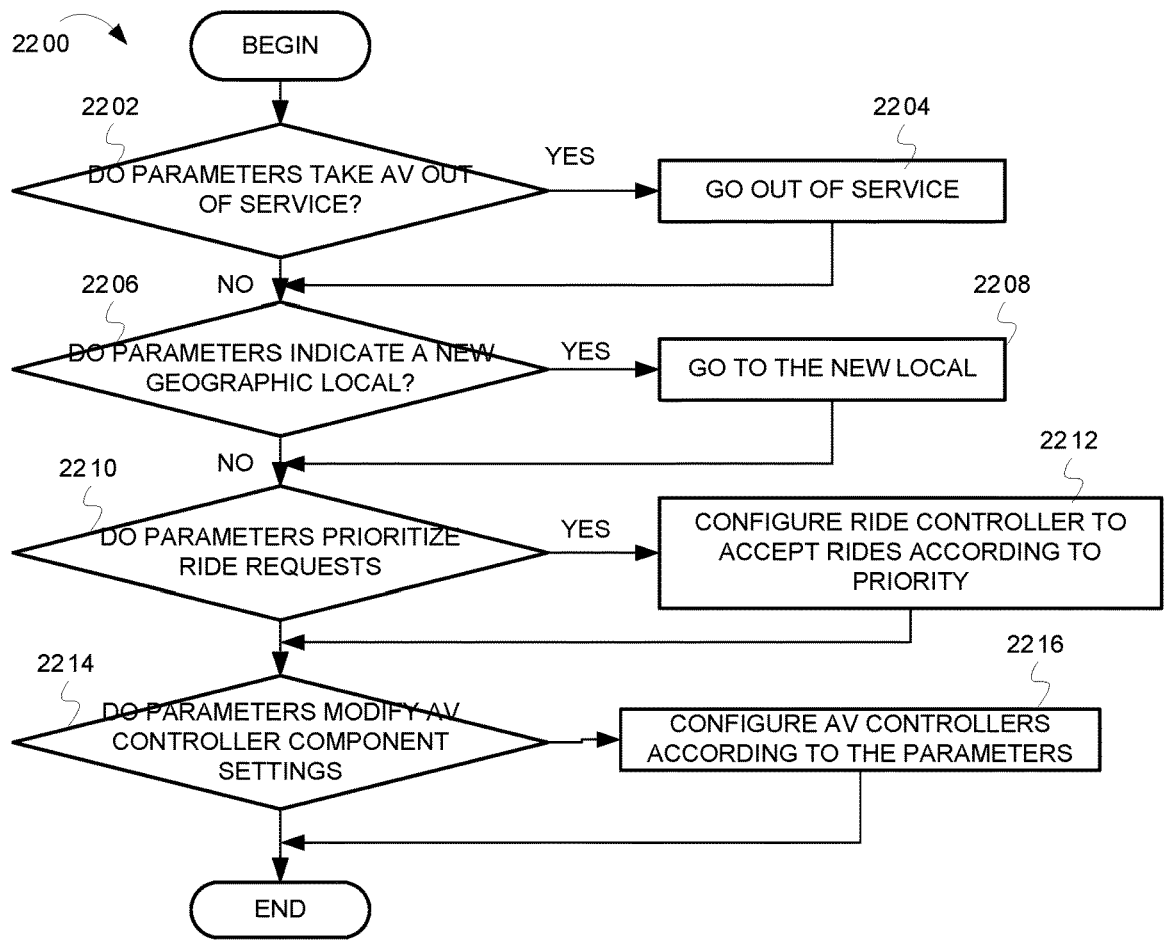
FIG. 22 is a flow diagram illustrating operations for operating autonomous vehicle according to ride parameters, according to some embodiments of the inventive subject matter.

FIG. 22 is a flow diagram illustrating operations for operating autonomous vehicle according to ride parameters, according to some embodiments of the inventive subject matter. In FIG. 22, a flow 2200 begins at block 2202. At block 2202, an autonomous vehicle's ride controller determines whether ride parameters take the vehicle out of service. Ride parameters that may cause the ride controller to take the autonomous vehicle out of service may include traffic-related parameters that take the autonomous vehicle out of service to reduce congestion and a geographic locale or on a particular roadway. Additionally, parameters related to resource conservation (e.g., fuel, tires, general wear, etc.) may cause the vehicle to go out of service when utilization is under given threshold, or any other suitable circumstances. If the parameters do not take the autonomous vehicle out of service, the flow continues at block 2208.

At block 2206, the ride controller determines whether ride parameters indicate a new geographic locale in which to operate. Parameters may cause the vehicle to go to new locale to increase utilization, reduce congestion, increase ride comfort, etc. If the parameters cause the vehicle to go to a new locale, the ride controller instructs (at block 2208) the vehicle's driving and guidance unit to the specified geographic locale. In some instances, the ride controller may dynamically determine the new locale. The flow continues at block 2210.

At block 2210, the ride controller determines whether the ride parameters prioritize ride requests. At block 2212, the ride controller reconfigures its parameters to accept rides according to the priority. The flow continues at block 2214.

At block 2214, the ride controller determines whether parameters modify various components settings of the autonomous vehicle. For example, the ride parameters may modify settings utilized by the driving and guidance system, such as acceleration, braking, etc. The ride parameters can be used to modify settings for any component in the autonomous vehicle. At block 2216, the ride controller configures the autonomous vehicle's components according to the parameters. From block 2216, the flow ends.

In some embodiments, some ride parameters are shared with the autonomous vehicle, while others are utilized by components in the fleet controller. For example, for embodiments in which ride assignments are made by the fleet controller (i.e., ride assignments are not selected by the autonomous vehicles), certain ride parameters are utilized by the fleet controller to affect utilization, efficiency, comfort, etc. However, certain ride parameters are sent to the autonomous vehicles to cause reconfiguration of autonomous vehicle components.

In some embodiments, the ride parameters do not affect how autonomous vehicle's driving and guidance system's ability to maneuver safely on the road. In some embodiments, ride parameters that affect drivability may be overridden by the driving and guidance system when needed.

Ride Information that Provokes a Service Request
(Ride Refusal)

In some instances, ride information unrelated to components of an autonomous vehicle can give rise to service requests. For example, although ride information does not indicate faults with autonomous vehicle components, utilization of a vehicle has fallen below an acceptable threshold. In some instances, low utilization may arise from ride refusals related to conditions of the autonomous vehicle, such as a foul odor in the cabin, badly worn cabin components, damaged components for which there is no sensor, etc. Some embodiments of the inventive subject matter utilize ride-related information from sources other than an autonomous vehicle to determine the autonomous vehicle needs service. Some of these embodiments are described in the discussion of FIG. 23.

FIG. 23 is an operational flow diagram showing operations for determining an autonomous vehicle needs service, and providing the service, according to some embodiments. In FIG. 23, the operations occur in 20 stages. At stage 1, a ride service controller (shown as RSC 1) receives user input indicating a desired ride, and sends an associated ride request. At stage 2, the fleet controller receives the associated ride request, and publishes it to a fleet of autonomous vehicles. At stage 3, an autonomous vehicle accepts the ride request and sends a confirmation of acceptance. At stage 4, the ride service controller receives the ride service request confirmation and presents the confirmation in a user interface.

At stage 5, the autonomous vehicle maneuvers to a pick-up location, and sends a message indicating arrival at the pickup location. At stage 6, the ride service controller receives the pickup message, and presents the message in a user interface. At stage 7, the ride service controller presents a ride information interface. The ride information interface may include user controls that enable a user to accept or refuse the ride. Additionally, the ride information interface may include user controls that enable users to enter text, audio, or other information indicating reasons for refusing the ride. At stage 8, the ride service controller receives information, in the ride information interface, indicating that the ride is refused. At stage 9, the ride service controller sends a ride refusal message to the fleet controller.

At stage 10, the fleet controller receives the ride refusal message. At stage 11, in response to determining that the ride was refused, the fleet controller publishes a ride request to pickup the passenger who refused the ride. In some instances, the fleet controller prioritizes this ride request to expedite pickup of the passenger. At stage 12, the fleet controller determines, based at least in part on the refusal message, that service is needed for the autonomous vehicle. In some instances, after one or more rides are refused, the fleet controller orders a service inspection for the autonomous vehicle. In other instances, the fleet controller orders service after certain information is received, such as information indicating damage components, foul odor, cabin spill, etc. At stage 13, the fleet controller publishes an autonomous vehicle service request to ride service controllers. In some instances service publication is published to all ride service controllers, while in other instances, it is published to those that have subscribed to receive such service requests.

At stage 14, a second ride service controller (shown as RSC 2) receives the service request and presents it in a user interface. At stage 15, the second ride service controller receives user input indicating acceptance of the service request. At stage 16, the second ride service controller sends a message indicating that service request has been accepted. At stage 17, the fleet controller receives the message accepting the service request. At stage 18, the fleet controller sends a service message to the autonomous vehicle. The service message can indicate that the autonomous vehicle will receive service, and may indicate a service location to which the autonomous vehicle should go. At stage 19, the autonomous vehicle's ride controller receives the service message. At stage 20 the autonomous vehicle's ride controller causes the vehicle to go to the service location to receive service.

Automatically Sending Ride Request when Conditions Met

Figure 24:
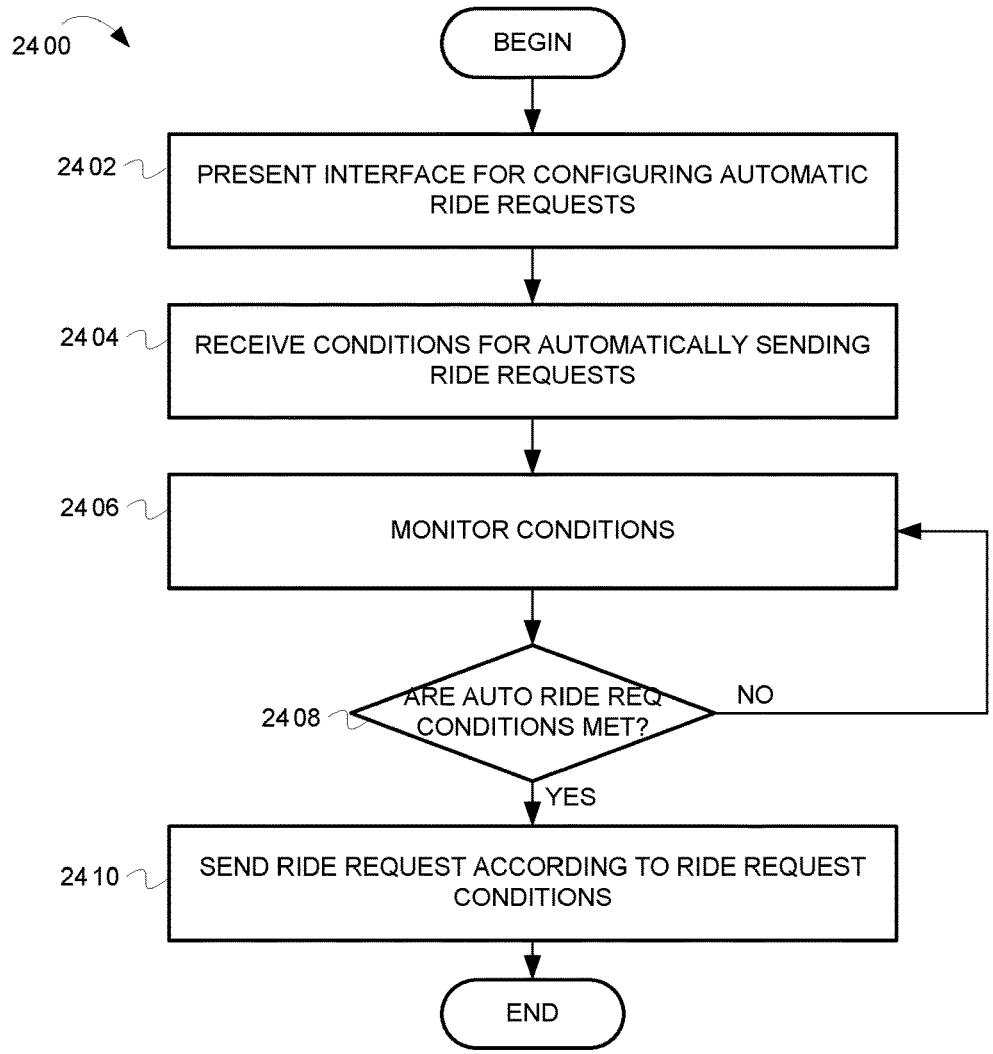
FIG. 24 is a flow diagram illustrating operations for automatically sending ride requests, according to some embodiments of the inventive subject matter.

Some embodiments enable ride service controllers to automatically send a ride request after certain conditions are met. For example, if an account user is walking a path to a particular street corner, the user's ride service controller can automatically request to ride for which the pick-up location is the street corner. FIG. 24 describes embodiments in greater detail.

FIG. 24 is a flow diagram illustrating operations for automatically sending ride requests, according to some embodiments of the inventive subject matter. In FIG. 24, a flow 2400 begins at block 2402. At block 2402, a ride service controller presents an interface for configuring automatic ride requests. The interface can include controls that enable the user to enter conditions for automatically sending ride requests. Conditions can include:

Geographic location of the ride service controller—For example, a ride service controller will automatically send a ride request when it's location unit determines it is at a specified location.

Path of the ride service controller for a given distance—For example, if the ride service controller's location unit determines that it has moved along a specific path (e.g., along a particular sidewalk), the controller automatically sends a ride request.

Time of day, day of week, etc. —For example, the ride service controller may periodically transmits the ride request requesting a ride from a particular location at a specified time (e.g., time of day, or time of day and date).

A preplanned ride schedule—For example, the ride service controller may receive a preplanned ride schedule. The ride service controller can request rides according to the schedule.

Input from social media—For example, the ride service controller may receive social media content that indicates the ride is needed. In some instances, the ride service controller uses natural language recognition to analyze content and make a determination that the ride is needed.

Input from specified account customers—For example, the ride service controller may receive information that other specified account customers have requested rides to a particular location. In response, the ride service controller may automatically request to ride to the particular location.

The flow continues at block 2406. At block 2406, the ride service controller monitors the conditions. At block 2408, the ride service controller determines whether automatic ride request conditions are met. If so, the flow continues at block 2410, where the ride service controller sends a ride request according to the ride request conditions. If the conditions are not met, the flow loops back to 2406.

In some instances, the automatic ride requests indicate pick-up locations. In other instances, pick-applications are dynamically determined, such as by using the ride service controller's position as a beacon for the autonomous vehicle to find. In some instances, the autonomous vehicle or other component suggests a pickup location.

Promotional Offers that Alter Drop-Off Location

Figure 25:
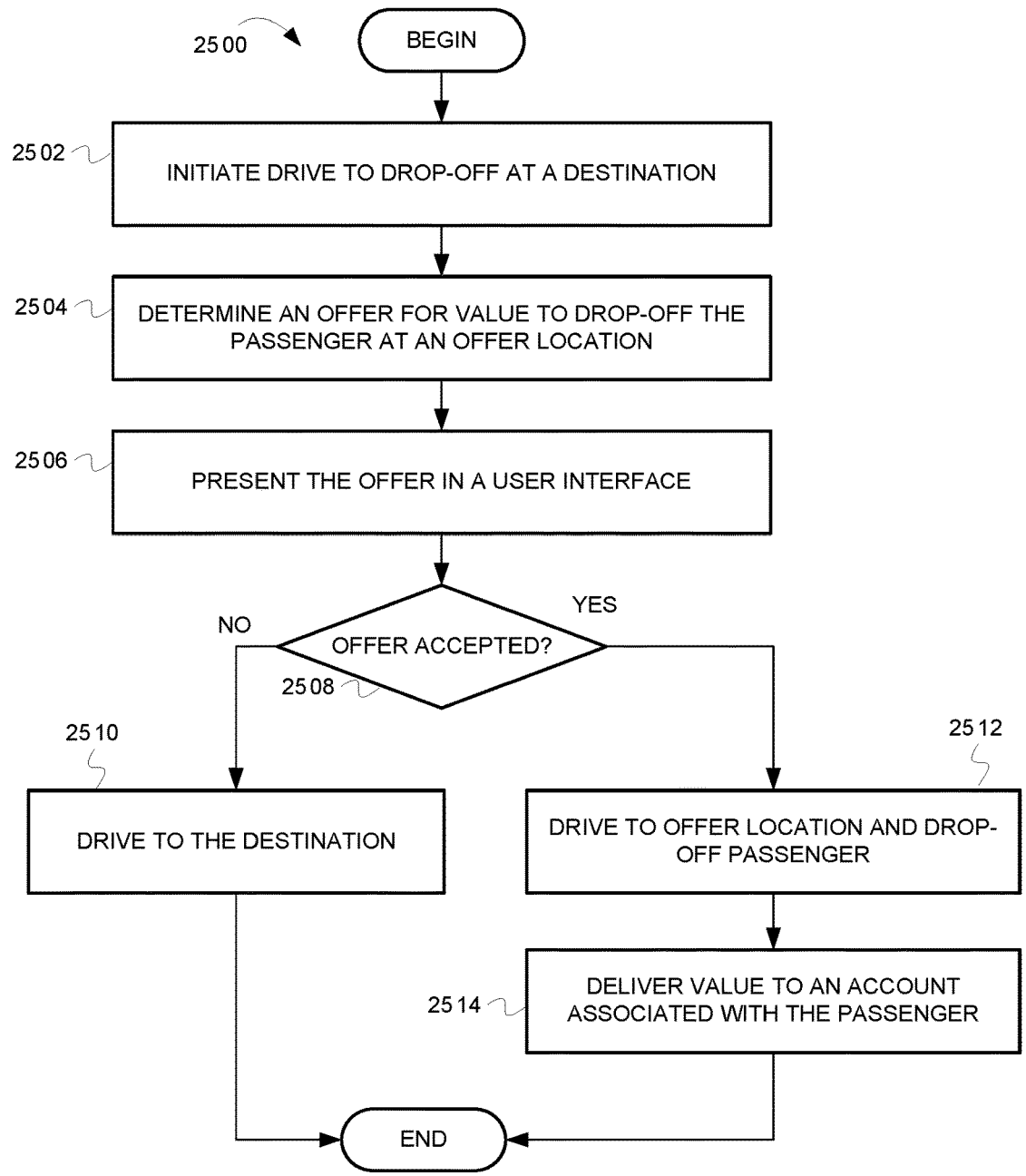
FIG. 25 is a flow diagram illustrating operations for modifying a ride destination based on an offer for value, according to some embodiments.
Figure 26:
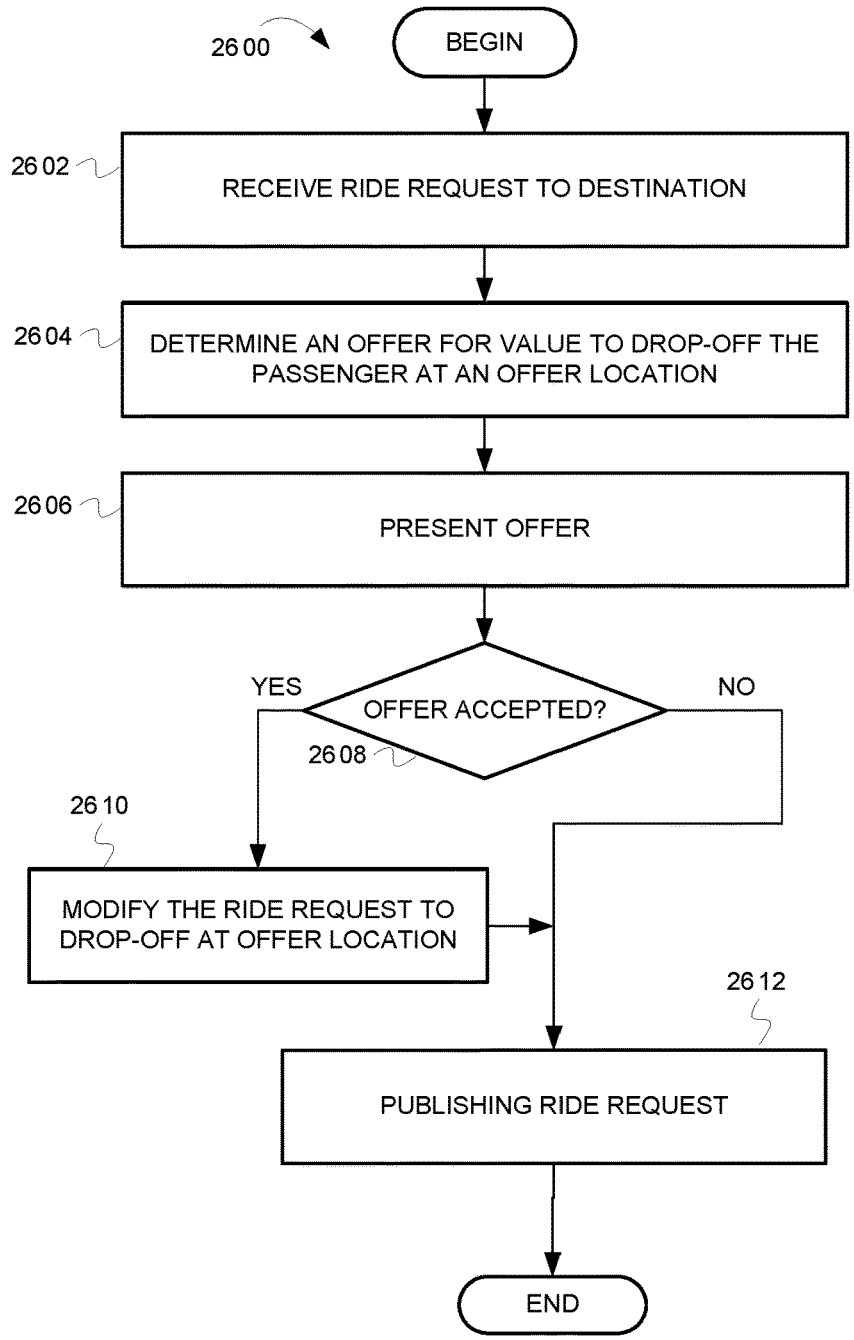
FIG. 26 is a flow diagram illustrating operations for modifying a ride destination based on an offer, according to some embodiments.

Some embodiments enable presentation of destination-related offers that provide value to passengers for modifying their selected destination to a offer-related location specified in the offer. For example, according to some embodiments, an account user may request a ride to a street address, such as 1234 Main Street. Some embodiments may present an offer to provide value in exchange for modifying the destination address (1234 Main St.) to an offer-related drop-off location, such as a retail store, event location, or other suitable drop-off location or street address. These embodiments enable offerors to incentivize account users to arrive in-person to specified drop-off locations. In some instances, offers may require account users to move from an offer-related drop-off location to a final offer-related destination. In such instances, embodiments can track the account users' movements (e.g., on foot) to the final offer-related destination. FIGS. 25 and 26 describe some embodiments related to the above-noted concepts.

FIG. 25 is a flow diagram illustrating operations for modifying a ride destination based on an offer for value, according to some embodiments. In FIG. 25, a flow 2500 begins at block 2502. At block 2502, an autonomous vehicle initiates a drive to a drop-off destination associated with a ride request. The flow continues at block 2504.

At block 2504, the autonomous vehicle determines an offer for value, where the offer provides value to the passenger if the ride drops-off the passenger at an offer-related drop-off location. In some embodiments, the autonomous vehicle's ride controller determines the offer based on information received from an offeror. In other embodiments, components other than the autonomous vehicle determine the offer (e.g., components controlled by the offeror). In some embodiments, the autonomous vehicle determines the offer based on information associated with one or more of the ride, ride request, passenger's user account, or other suitable information. For example, if the destination indicated in the ride request is in proximity to an offer-related drop-off point, the autonomous vehicle selects the offer related to the offer-related drop-off point. As another example, the offer may be selected because the offer-related drop-off point is in proximity to a path between the ride request's pickup location and destination. As yet another example, the offer may be selected because the passenger's user account indicates affinity for a particular offer (e.g., product, event, etc.), particular destination related to the offer, etc. In some embodiments, the value may include a free ride, a discounted ride, a discount at a retail location in proximity to the offer-related drop-off point, free or discounted future rides, or any other suitable value to incentivize acceptance of the offer. The flow continues at block 2506.

At block 2506, the autonomous vehicle's ride controller presents the offer. In some embodiments, the offer is presented on an input output device native to the autonomous vehicle. In other embodiments, the autonomous vehicle transmits the offer for presentation on a ride service controller for presentation. In such case, the offer may be transmitted over a wide area network or a personal area network. The flow continues at block 2508.

At block 2508, the autonomous vehicle determines whether the offer has been accepted. The autonomous vehicle's ride controller may make this determination based on user input received via a native input output device, or based on input received from a ride service controller or other suitable device. If the offer is accepted, flow continues at block 2512. At block 2512, the autonomous vehicle drives to the offer-related location and drops-off the passenger. The flow continues at block 2514.

At block 2514, the autonomous vehicle provides value to an account associated with the passenger. As noted above, the value may be a retail discount, ride discount, or other suitable value. In some embodiments, the autonomous vehicle does not itself provide such value, but instead indicates that drop-off at the offer-related location is complete. In turn, any other suitable component may provide the value to the passenger's user account. In some embodiments, values not delivered directly to passenger accounts, but to other destinations, such as email addresses, text addresses, etc.

Referring back to block 2508, if the offer is not accepted, the flow continues at block 2510. At block 2510, the autonomous vehicle drives to the destination indicated in the ride request.

From blocks 2510 and 2514, the flow ends.

Although the above description of certain embodiments refers to the autonomous vehicle performing the operations (e.g., 2504, 2506, and 2514), some embodiments may utilize other components to perform these operations. For example, a ride service controller or other device may determine offers related to rides that are underway (i.e., rides for which an autonomous vehicle has picked up a passenger, and the passenger is in the vehicle). Additionally, the ride service controller or other device may present offers, and determine whether they have been accepted. For offers that have been accepted, the ride service controller (or other device) instructs the autonomous vehicle to modify the ride request's destination to the offer-related drop-off location.

While some embodiments make offers during rides underway, other embodiments determine offers a priori. FIG. 26 describes operations of some of these embodiments.

FIG. 26 is a flow diagram illustrating operations for modifying a ride destination based on an offer, according to some embodiments. In FIG. 26, a flow 2600 begins at block 2602. At block 2602, a fleet controller receives a ride request to a specified destination. The flow continues at block 2604.

At block 2604, the fleet controller determines an offer that when accepted will drop-off the passenger at an offer-related location. The offer-related location is different than the destination associated with the ride request. If the offer is accepted, value is provided to the passenger. Selection of the offer may be based on information associated with one or more of the ride, ride request, passenger's user account, or other suitable information. For example, if the destination indicated in the ride request is in proximity to an offer-related drop-off point, the autonomous vehicle selects the offer related to the offer-related drop-off point. As another example, the offer may be selected because the offer-related drop-off point is in proximity to a path between the ride request's pickup location and destination. As yet another example, the offer may be selected because the passenger's user account indicates affinity for a particular offer, particular destination related to the offer, etc. In some embodiments, the value may include a free ride, a discounted ride, a discount at a retail location in proximity to the offer-related drop-off point, free or discounted future rides, or any other suitable value to incentivize acceptance of the offer.

At block 2606, the fleet controller presents the offer. In some embodiments, the fleet controller transmits an offer message for presentation by a ride service controller or other device. The flow continues at block 2608.

At block 2608, the fleet controller determines whether the offer has been accepted. In some embodiments, the fleet controller receives a message from a remote service controller or other device, where the message indicates whether the offer has been accepted. If the offer has been accepted, (see block 2610) the fleet controller modifies the ride request to drop-off the passenger at an offer-related location (i.e., the ride request's new destination is the offer-related location). From block 2610, the flow continues at block 2612. If the offer is not accepted (2608), the flow continues at block 2612.

At block 2612, the fleet controller publishes the ride request. In some embodiments, the fleet controller publishes the ride request to a fleet of autonomous vehicles, one or more of which can accept and service the ride request. From block 2612, the flow ends.

Although FIG. 26 describes the fleet controller modifying the ride request's destination based on acceptance of the offer, other embodiments can work differently. In some embodiments, an autonomous vehicle can make an offer during a ride. If the passenger accepts the offer (e.g., via an I/O device native to the vehicle, via the passenger's ride service controller, etc.), the vehicle can itself modify the destination per the offer.

Coordinated Event Drop-Off

Some embodiments of the inventive subject matter reduce traffic congestion arising from numerous autonomous vehicles arriving in a locale at approximately the same time. Large events (e.g., spectator sporting events, theater events, concerts, etc.) may cause numerous vehicles to arrive at a stadium in a narrow time window. Such relatively simultaneous arrival may cause traffic congestion and delays. Some embodiments coordinate event drop-offs by assigning drop-off times and locations that avoid traffic congestion, and enable vehicles to drop-off passengers in a relatively narrow time window.

Figure 27:
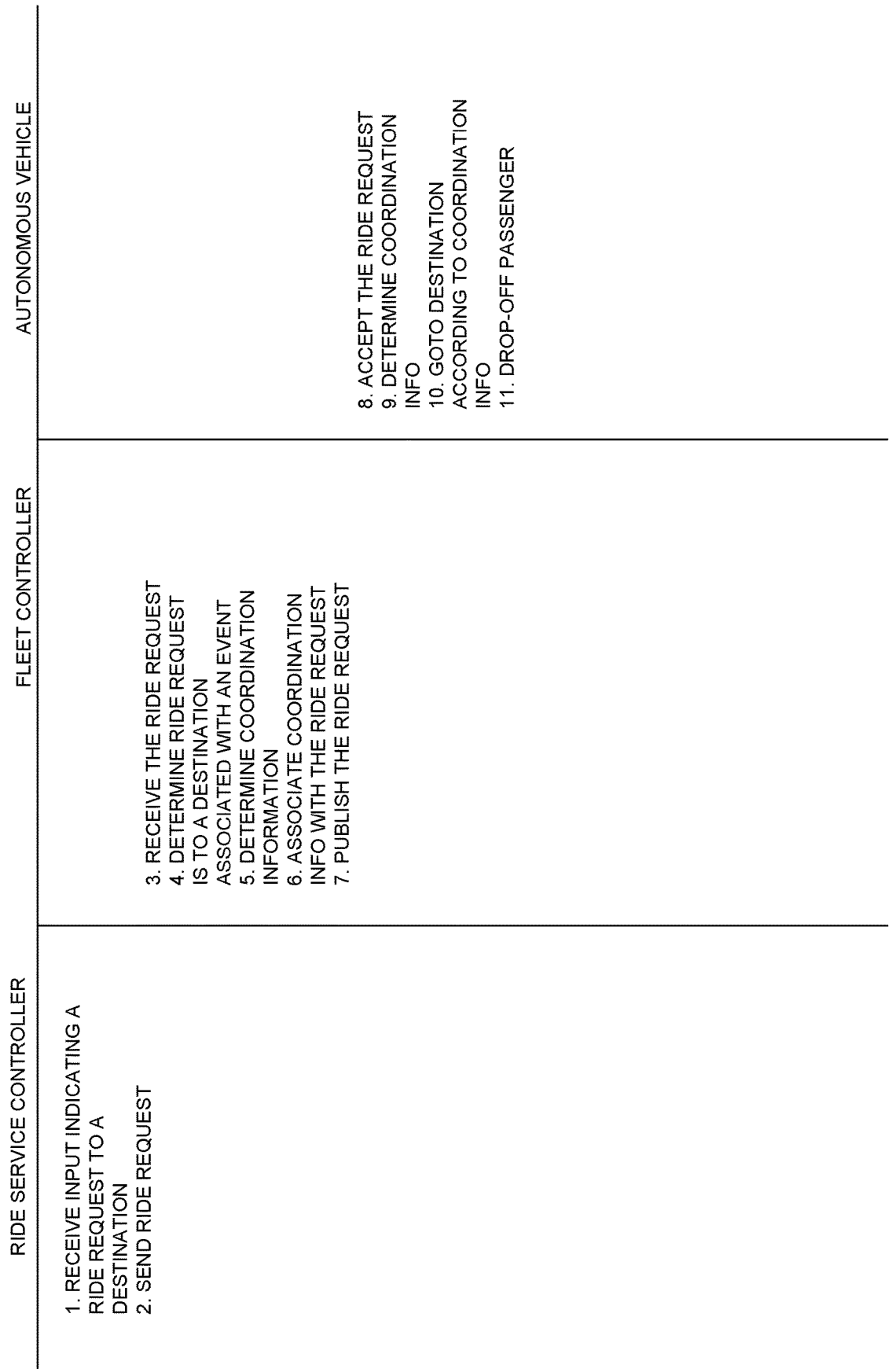
FIG. 27 is an operational flow diagram showing operations for coordinating passenger drop-off for a given event, according to some embodiments.

FIG. 27 is an operational flow diagram showing operations for coordinating passenger drop-off for a given event, according to some embodiments. The operations of FIG. 27 may be performed by a ride service controller, fleet controller, and autonomous vehicle. The operations occur in 11 stages.

At stage 1, a ride service controller receives user input indicating a ride request to a destination. At stage 2, the ride service controller sends the ride request to a fleet controller.

At stage 3, the fleet controller receives the ride request. At stage 4, the fleet controller determines that the ride request is to a destination associated with an event. The event may be a large-scale event for which numerous autonomous vehicles will arrive relatively contemporaneously converge on an area. In other instances, the event may be relatively small-scale (in number of autonomous vehicles arriving), and the area in which vehicles will drop off passengers is relatively small. In some embodiments, the fleet controller includes a database associating locations and events for which coordinated drop-off may be utilized. In other embodiments, such a database may be remotely available as a service to the fleet controller, ride service controller, or autonomous vehicle.

At stage 5, the fleet controller determines coordination information for the ride request. The coordination information can include a drop-off time, path information, marker information, landmark information, and any other information necessary for directing an autonomous vehicle to a particular drop-off point at the event. As noted, the event is associated with a destination. The drop-off point is a specific location at the destination, and accessible using the given path information, marker information, landmark information, or other information needed to navigate the autonomous vehicle to the drop-off point (see discussion below). At stage 6, the fleet controller associates the coordination information with the ride request. For example, the fleet controller may store the coordination information in a database along with the ride request. At stage 7, the fleet controller publishes the ride request. In some instances, the coordination information is included with the ride request. In other instances, the coordination information is accessible to an autonomous vehicle that has accepted the ride request.

At stage 8, the autonomous vehicle accepts the ride request. At stage 9, the autonomous vehicle determines the coordination information. For example, the coordination information may be included in the ride request itself, accessible via a link in the ride request, or may be accessible via any other suitable method. At stage 10, the autonomous vehicle drives to the destination according to the coordination information. As noted, the coordination information can include path information, time information, marker information, landmark information, etc. The autonomous vehicle can select a path that will result in an arrival at the designated time (or time window). As the ride progresses, the autonomous vehicle may alter the path to ensure arrival at the designated time. At some point during the ride, the autonomous vehicle may utilize marker information, such as information identifying signage that provides additional path information to the drop-off point. For example, the marker information may identify a particular gate into which the autonomous vehicle will drive to reach the drop-off point. On the way to the event, the autonomous vehicle's driving and guidance system (or other components) may perceive a marker (e.g., signage) indicating the specified gate, and then proceed in the gate. The marker information may also indicate that markers will direct the autonomous vehicle to the drop-off point, after entering the gate. After the autonomous vehicle enters the gate, markers may direct the autonomous vehicle to make turns along a roadway leading to the drop-off point. In some instances, instead of using markers to determine a path, autonomous vehicles can use landmark information to determine paths. Landmark information may indicate navigational maneuvers (e.g., turns) to be made in proximity to specific landmarks that are recognizable to autonomous vehicle components. At stage 11, the autonomous vehicle drops-off the passenger.

Although the embodiments shown in FIG. 27 call for a fleet controller to perform operations at stages 3, 4, 5 and 6. The ride service controller can perform one or more of these operations. In some embodiments, one or more of these operations may be performed by other components not shown herein. Further, as discussed elsewhere herein, the ride service controller may also perform stage 7 (publication of the ride request). All embodiments herein that describe the fleet controller publishing ride requests may be modified so ride requests are published by ride controllers or other components.

Figure 28:
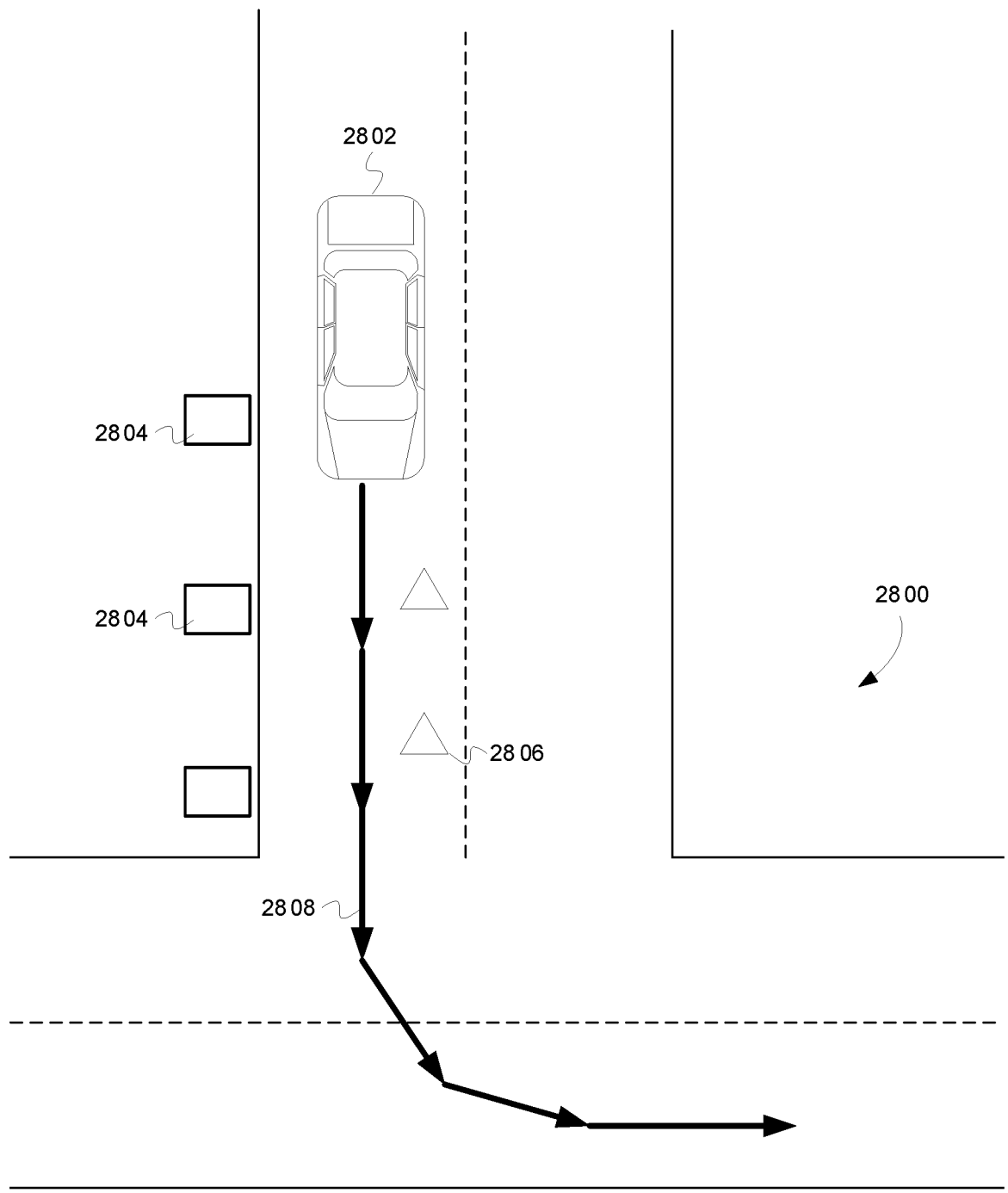
FIG. 28 is a diagrammatic representation of an autonomous vehicle modifying its path based on markers, according to some embodiments.

FIG. 28 is a diagrammatic representation of an autonomous vehicle modifying its path based on markers, according to some embodiments. Markers include any suitable device that presents indicia to an autonomous vehicle. Markers can include road signs, programmable video displays (e.g., LED displays), paint on any suitable surface (e.g., road paint), radiofrequency signals, light signals, audible signals, etc. FIG. 28 shows a street intersection 2800, and an autonomous vehicle 2802. The autonomous vehicle 2802 is traveling on path 2808. Markers 2804 (shown as squares) and 2806 (shown as triangles) reside on and by the road 2800. As the autonomous vehicle 2802 travels along the path 2808, it may perceive a marker 2804 (e.g., via know techniques of computer vision such as object recognition), where the marker includes indicia instructing the autonomous vehicle to turn left at the intersection. In response to the marker 2804, the autonomous vehicle may modify its path and turn left at the intersection. As the autonomous vehicle proceeds, it may encounter additional markers that cause further path modification.

As noted above, coordination information can include marker information. Therefore, an autonomous vehicle may navigate to an event drop-off point by first following a path generated by a mapping component (e.g., a navigation unit 228), and then begin a series of path modifications based on markers encountered en route to the event. Using the markers, the autonomous vehicle ultimately arrives at the drop-off point. Some embodiments may use markers to navigate to specific locations unrelated to event coordinated drop-offs (e.g., see discussion of embodiments that utilize specific drop-off locations, such as the discussion related to FIG. 11).

In some embodiments, markers indicate changes to paths. In other embodiments, markers can indicate other information, such as any information commonly included in road signs.

Figure 29:
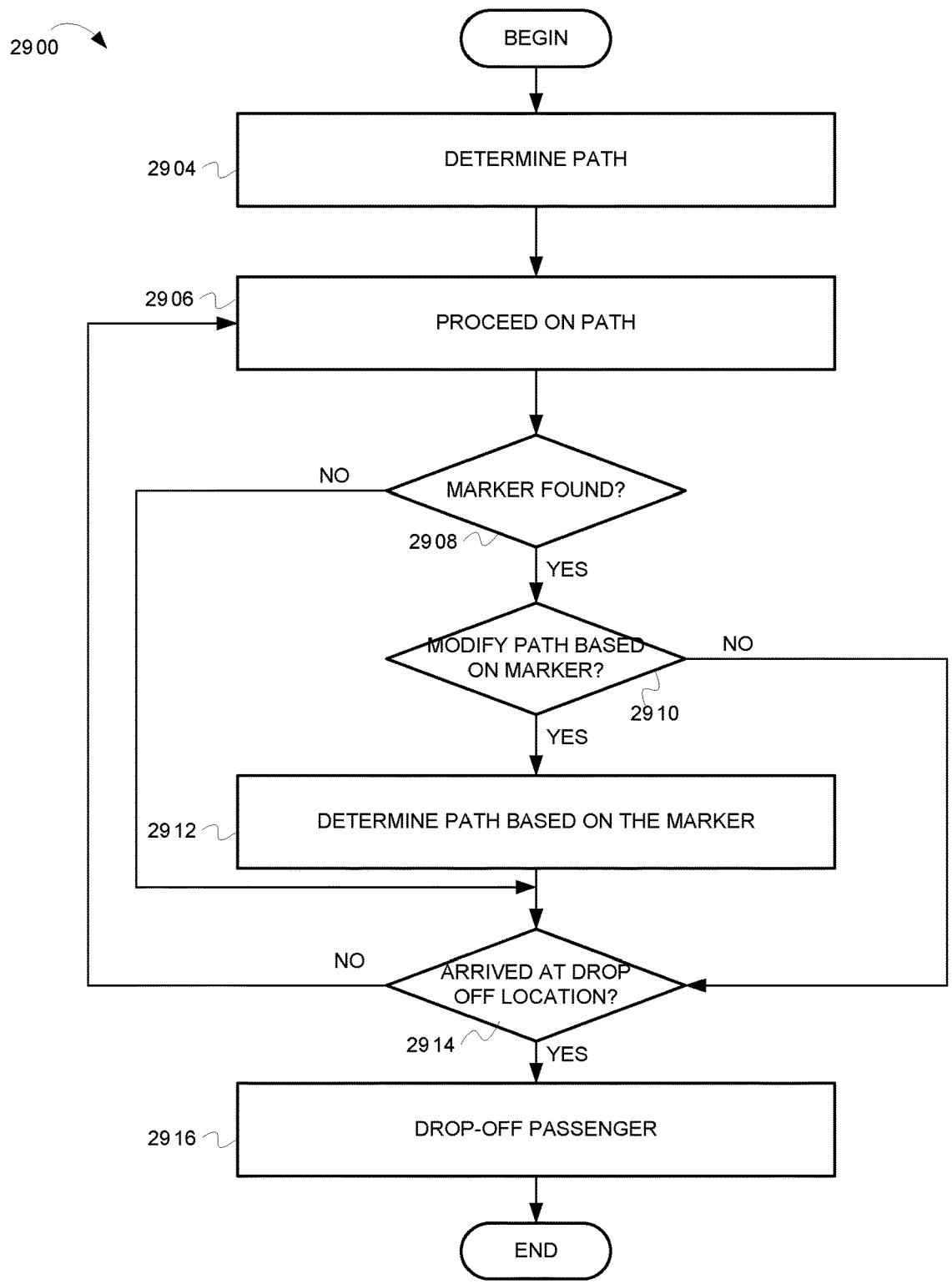
FIG. 29 is a flow diagram illustrating operations for modifying an autonomous vehicle path based on markers, according to some embodiments.

FIG. 29 is a flow diagram illustrating operations for modifying an autonomous vehicle path based on markers, according to some embodiments. In FIG. 29, a flow 2900 begins at block 2904.

At block 2904, an autonomous vehicle's navigation unit determines a path for the autonomous vehicle. In some embodiments, the navigation system utilizes electronic maps to determine a path for the autonomous vehicle (e.g., a path leading to a destination). At block 2906, the autonomous vehicle's driving and guidance system maneuvers on the path. At block 2908, the autonomous vehicle's driving and guidance system determines whether it has found a marker. In some embodiments, markers are implemented as conventional road signs including indicia perceptible by the driving and guidance system. In other embodiments, the markers may be video displays, radiofrequency signals, or other means for presenting indicia to autonomous vehicles. The radiofrequency signal can include indicia perceptible by autonomous vehicles, such as data included in Wi-Fi packets.

If a marker is found, the flow continues at block 2910. Otherwise, the flow continues at block 2914.

At block 2910, the autonomous vehicle's driving and guidance system determines whether to modify its path based on the marker. If the marker includes path information relevant to the autonomous vehicle, the driving and guidance system will modify the path (at block 2912). Otherwise, it will not modify the path (proceed to block 2914).

At block 2912, the autonomous vehicle's driving and guidance system modifies its path based on the marker. In some embodiments, the autonomous vehicle modifies its current path by adding turns or other navigational maneuvers indicated by the marker. Flow continues at block 2914.

At block 2914, the autonomous vehicle's driving and guidance system determines whether it has arrived at a drop-off location. If so, the flow continues at block 2916, where the autonomous vehicle drops off its passenger(s). If the autonomous vehicle has not arrived at its drop-off location, the flow continues at block 2906.

Autonomous vehicles or other components can utilize the operations shown in FIG. 29 in a situation that calls for navigating based on a path, and based on markers encountered while on the path. Therefore, some embodiments may utilize the operations of FIG. 29 in concert with other operational flows described herein. The utilization of operations shown in one Figure with those of one or more other Figures is not unique to the concepts of FIG. 29. Embodiments contemplate mixing and matching between all Figures and embodiments.

Safe Drop-Off

Figure 30A:
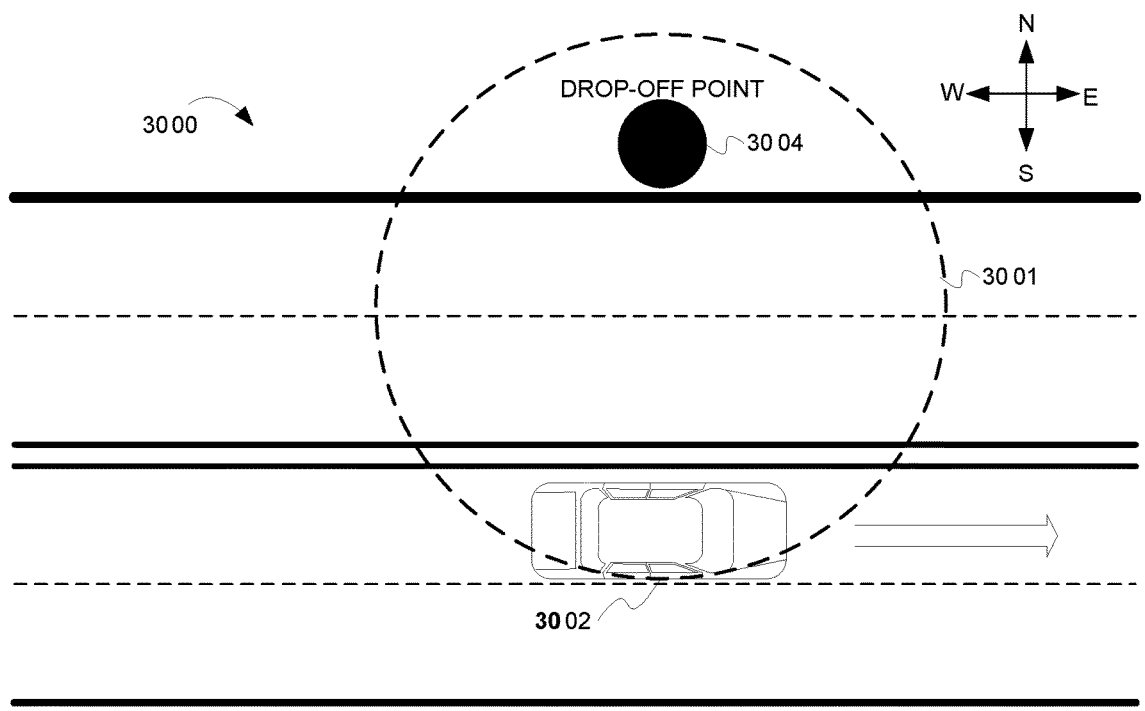
FIG. 30A is a diagrammatic illustration of an autonomous vehicle arriving at a destination at a potentially unsafe location.

Some embodiments enable autonomous vehicles to avoid potentially dangerous conditions when dropping-off passengers. For example, some autonomous vehicles may use map-based GPS navigation systems to navigate to destinations. GPS and other systems may successfully guide autonomous vehicles to specified destinations, but may arrive at locations that may be unsafe for drop off. FIG. 30A shows on such example.

FIG. 30A is a diagrammatic illustration of an autonomous vehicle arriving at a destination at a potentially unsafe location. In FIG. 30A, an autonomous vehicle 3002 arrives at a destination on a four-lane street 3000. The autonomous vehicle's guidance system may determine that the vehicle has reached a destination based on GPS location information. GPS-based navigation systems may determine that a vehicle has arrived at a destination if the vehicle is anywhere in an area. In other words, some GPS systems may move with an area, but still continue to read coordinates for a point on the earth (the point coinciding with the destination). Other navigation systems may also exhibit similar behavior.

Figure 30B:
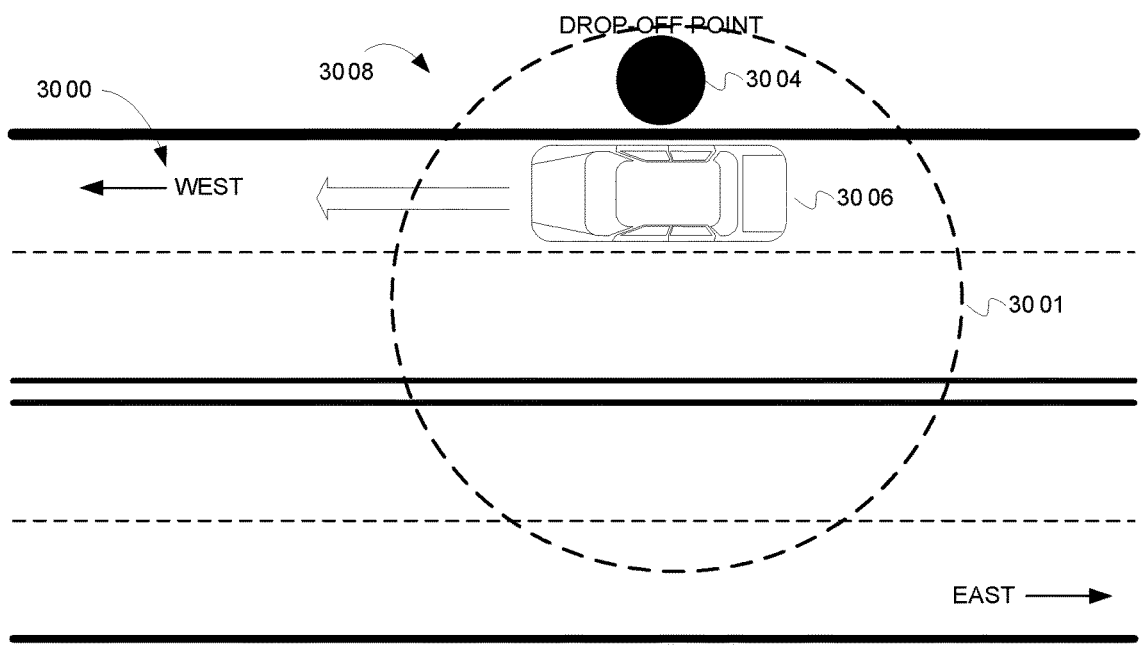
FIG. 30B is a diagrammatic illustration of an autonomous vehicle at a safe drop-off point, according to some embodiments.

In FIG. 30B, the vehicle 3002 may determine it has arrived at a destination when it is anywhere within area 3001. As shown, the vehicle 3002 is in the north-most lane of the east-bound lanes of a four-lane road a location that is potentially unsafe to drop-off passengers. The vehicle 3002 may stop, and attempt to drop-off passengers at this location. Embodiments of the invention avoid some potentially dangerous drop-off locations. FIG. 30B shows an autonomous vehicle at a safer drop-off point 3004.

FIG. 30B is a diagrammatic illustration of an autonomous vehicle at a safe drop-off point, according to some embodiments. In FIG. 30B, an autonomous vehicle 3006 has arrived at a destination 3001 in a curbside orientation that avoids dropping-off passengers in potentially unsafe traffic conditions. Some embodiments may identify a drop-off point 3004 at a destination (e.g., area 3001), and select a path that causes the vehicle to arrive with the vehicle's passenger side closest to the drop-off point. In FIG. 30B, the drop-off point 3004 is on a sidewalk 3008. In some embodiments, the autonomous vehicle may select a drop-off point upon arrival at a destination. That is, the vehicle may utilize sensors (e.g., camera) to identify a curb at the destination, and drop-off a passenger at the curb.

Figure 31:
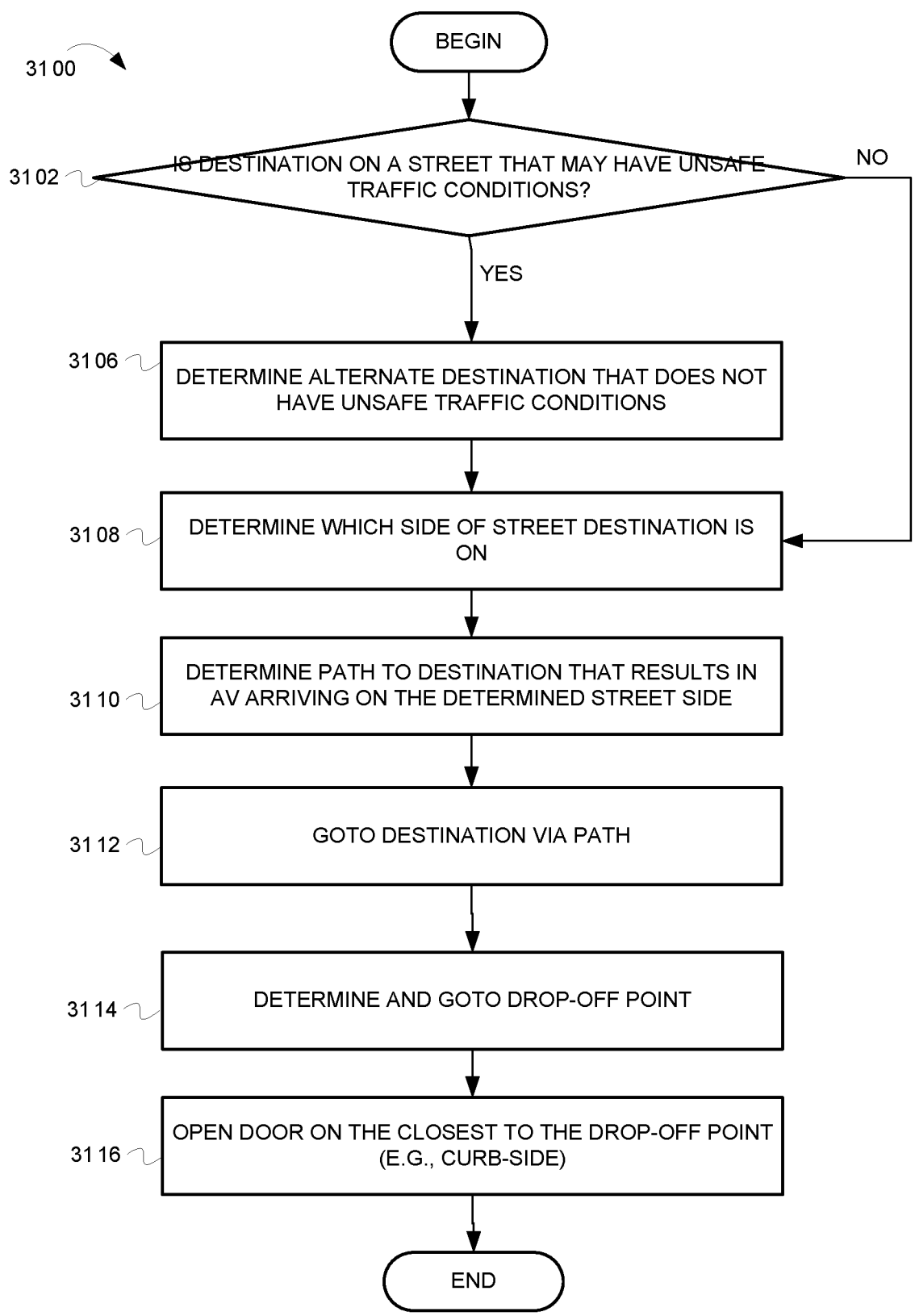
FIG. 31 is a flow diagram illustrating operations for safe drop-off, according to some embodiments of the inventive subject matter.

FIG. 31 is a flow diagram illustrating operations for safe drop-off, according to some embodiments of the inventive subject matter. As shown, FIG. 31 includes a flow 3100 that begins at block 3102. At block 3102, an autonomous vehicle's navigation unit determines whether a ride destination is on a street where there may be unsafe traffic conditions. Some embodiments analyze historical traffic data, real-time traffic data, or other information indicating traffic conditions at the destination. If there may be unsafe traffic conditions, the flow continues at block 3106. Otherwise, the flow continues at block 3108.

At block 3106, the navigation unit determines an alternative destination that does not have unsafe traffic conditions. For example, if the original destination is on a busy road, navigation unit may modify the destination to be on a side street nearby the original destination. In some embodiments, the autonomous vehicle determines the alternate location based at least in part on input from a passenger. The flow continues at block 3108.

At block 3108, the navigation unit determines which side of a street the destination is on. The navigation unit may make this determination based on a map analysis, database lookup, or any other suitable technique. As an example of this operation, the navigation unit may determine that the destination is on the north side of a street that runs east and west. The flow continues at block 3110.

At block 3110, the navigation unit determines a path to the destination that results in the vehicle arriving on the determined street side at the destination. For example, the navigation unit may determine a path that arrives at the destination on the north street side of an east-west running street. Such a path will result in the vehicle being oriented with its passenger doors closest to a curb. The flow continues at block 3112.

At block 3112, the autonomous vehicle's driving and guidance system maneuvers the vehicle to the destination via the path. The flow continues at block 3114.

At block 3114, the autonomous vehicle determines a drop-off point at which to drop off passengers. The autonomous vehicle can employ any of its components to determine the drop-off point, such as cameras, radar, etc. Because the path has resulted in the autonomous vehicle being oriented with its passenger doors curbside, the vehicle may choose any accessible curbside location as a drop-off point. If no curbside drop-off points are accessible, the autonomous vehicle may choose a curbside drop-off point nearby the destination. The flow continues at block 3116.

At block 3116, the autonomous vehicle opens one or more curbside doors to drop off passengers. In some embodiments, the autonomous vehicle will not open street-side doors. From block 316, the flow ends.

Autonomous Vehicle Registering for and Receiving Ride Requests

Figure 32:
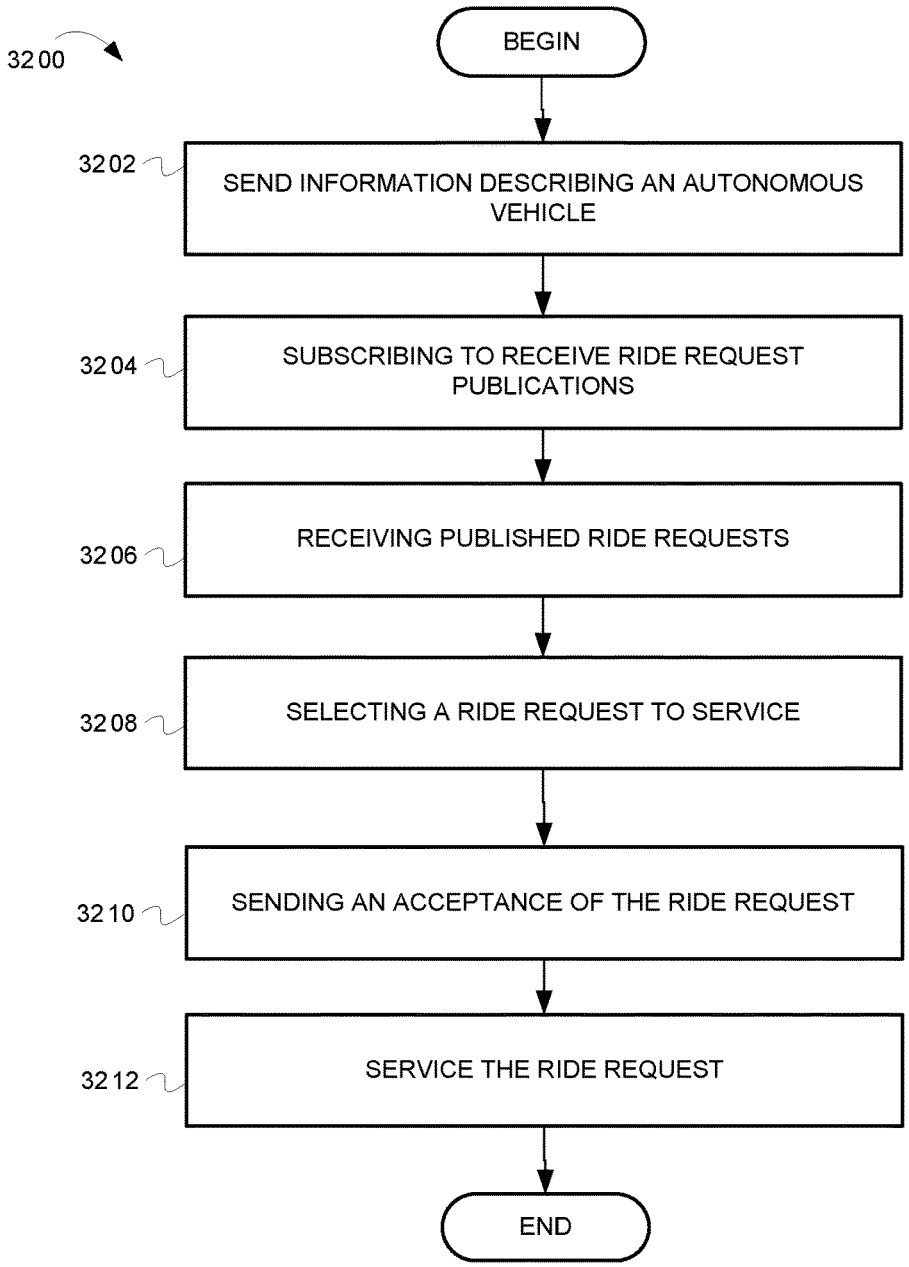
FIG. 32 is a flow diagram illustrating operations for registering an autonomous vehicle to receive published ride requests, according to some embodiments.

Some embodiments enable autonomous vehicles to register with fleet controllers or other devices to receive published ride requests. By enabling autonomous vehicles to receive published ride requests, individuals or large-scale operators can add vehicles to an overall service fleet that provides ride service. FIG. 32 describes how some embodiments operate.

FIG. 32 is a flow diagram illustrating operations for registering an autonomous vehicle to receive published ride requests, according to some embodiments. In FIG. 32, a flow 3200 begins at block 3202. At block 3202, an autonomous vehicle's ride controller sends information describing the autonomous vehicle. In some embodiments, the operations shown at block 3202 is not performed by an autonomous vehicle. Instead, an operator may provide information via any suitable electronic device, such as a mobile computer. The information can include information that uniquely identifies the autonomous vehicle, communication information (e.g., communication protocols, addresses, equipment, etc. supported by the autonomous vehicle), operating parameters (e.g., see discussion above) (e.g., information indicating operational range, seating capacity, preferred geographic regions, etc.), preferred ride requests (e.g., rides shorter than a specified distance, longer than a specified distance, ride requesters of a certain status, etc.), etc. The flow continues at block 3204.

At block 3204, the autonomous vehicle's ride controller subscribed to receive published ride requests. In some embodiments, the autonomous vehicle subscribes to receive ride requests from a fleet controller. For example, a fleet controller or other component may receive ride requests (e.g., from ride service controllers), and publish the ride requests to autonomous vehicles that have subscribed to receive the ride requests. In some embodiments, autonomous vehicles subscribe to receive ride requests directly from ride service controllers or other devices. In some instances, the autonomous vehicle does not perform the operations shown at block 3204. Instead, an operator may provide input (e.g., via a mobile computer) subscribing the autonomous vehicle to receive published ride requests. The flow continues at block 3206.

At block 3206, the autonomous vehicle receives published ride requests. In some embodiments, ride requests are filtered by the publisher (e.g., fleet controller), so the autonomous vehicle receives only ride requests meeting its preferences. However, in some embodiments, the autonomous vehicle's ride controller may perform filtering to identify ride requests meeting preferences associated with the autonomous vehicle. The flow continues at block 3208.

At block 3208, the autonomous vehicle's ride service controller selects a ride request to service. Ride requests may indicate a pickup location, destination, ride preferences, and other information that facilitates ride service (e.g., see discussion of ride requests herein). The flow continues at block 3210.

At block 3210, the autonomous vehicle's ride service controller sends a message indicating acceptance of the ride request. In some embodiments, the ride controller sends the message to a fleet controller. In other embodiments, the ride controller sends the message to a ride service controller or other device. In addition to accepting the ride request, the autonomous vehicle may receive other information confirming the ride (e.g., passenger acknowledgment message, etc.). The flow continues at block 3212.

At block 3212, the autonomous vehicle services the ride request. In some embodiments, the vehicle's ride service controller determines path information (e.g., using a navigation unit) to the ride request's pick-up location. In turn, the vehicle picks-up a passenger, and transports the passenger to a destination. In servicing the ride request, the autonomous vehicle may utilize any operations described herein. From block 3212, the flow ends.

Location-Based and Path-Based Ride Acceptance

Some embodiments enable autonomous vehicles to accept new rides by waiting at various locations, and detecting ride customers without receiving electronic ride request messages over a network, such as from a fleet controller as described herein. Some of these embodiments are described with respect to FIG. 33.

Figure 33:
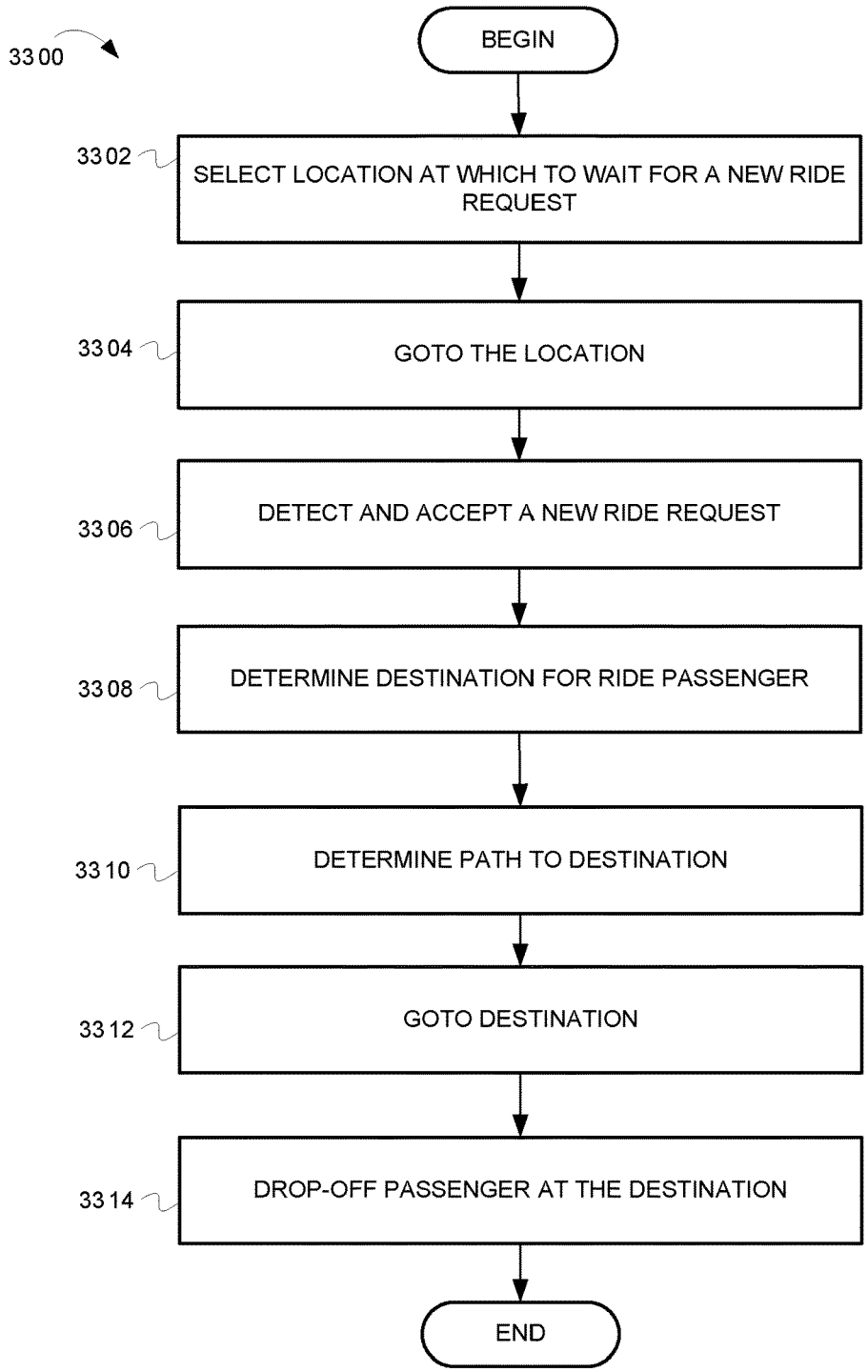
FIG. 33 is a flow diagram illustrating operations for location-based ride acceptance for an autonomous vehicle, according to some embodiments.

FIG. 33 is a flow diagram illustrating operations for location-based ride acceptance for an autonomous vehicle, according to some embodiments. In FIG. 33, a flow 3300 begins at block 3302. At block 3302, an autonomous vehicle selects a location at which to wait for a new ride request. Some embodiments may the select location based on information collected from other autonomous vehicles, where the information indicates heavy ride request activity. Some embodiments may select location based on its own previous history at one or more location (e.g., selecting the location producing the most ride requests, producing ride requests from certain customer types, producing ride requests for certain ride types, etc.). Embodiments may use any suitable methodology for selecting a location. In some embodiments, location information is received from a fleet controller or other component. The flow continues at block 3304.

At block 3304, the autonomous vehicle maneuvers to the selected location. As may be noted elsewhere herein, operations for maneuvering to locations may not be performed by some embodiments. That is, in some embodiments, the maneuvering is performed by components not included in those embodiments. Hence, for those embodiments, discussion of operations for maneuvering an autonomous vehicles are merely to provide context. The flow continues at block 3306.

At block 3306, the autonomous vehicle detects and accepts a new ride request. For example, the autonomous vehicle may detect a passenger entering the vehicle, and indicate the vehicle will give a ride to the passenger. The indication may be audible, presented on a display device, or otherwise communicated to the passenger. The flow continues at block 3308.

At block 3308, the autonomous vehicle determines a destination for the ride request. The passenger may indicate the destination via speech, input on a passenger terminal mounted in the autonomous vehicle, or any other suitable method of input. Flow continues at block 3310.

At block 3310, the autonomous vehicle determines a path to the destination. The vehicle can use any suitable mapping technology, such as Google Maps®, OpenStreetMap, etc. The flow continues at block 3312.

At block 3312, the autonomous vehicle maneuvers to the destination via the path. The flow continues at block 3314.

At block 3314, the autonomous vehicle drops off the passenger at the destination. In some embodiments, the flow loops back to 3302, and a new location is selected. However, in other embodiments, the flow may loop back to 3304, skipping location selection and reusing the originally selected location. From block 3314, the flow may end.

Figure 34:
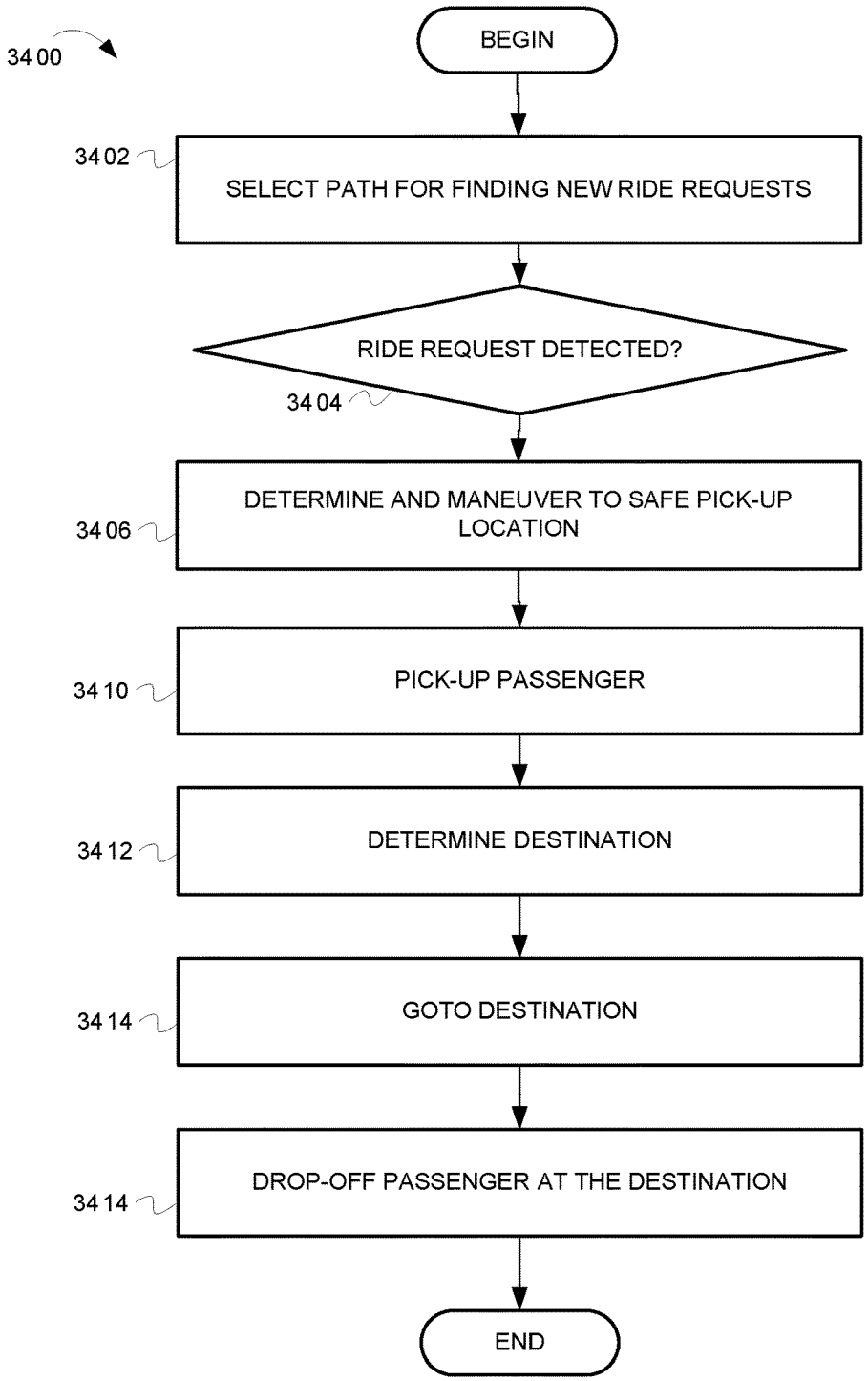
FIG. 34 is a flow diagram describing a path-based technique for finding new ride requests, according to some embodiments.

FIG. 34 is a flow diagram describing a path-based technique for finding new ride requests, according to some embodiments. In the FIG. 34, a flow 3400 begins at block 3402. At block 3402, an autonomous vehicle selects a path for finding the ride passengers. That is, the autonomous vehicle selects a path along which it will drive, searching for new ride request. In contrast to FIG. 33, where the vehicle looks a ride request at a location, this flow calls for moving along the path. The autonomous vehicle may select a path based on information collected from other vehicles, its own history, or any other information. The path may be selected based on utilization associated with path, passenger type associated with path, ride type associated with path, or any other suitable information associated with path. In some embodiments the autonomous vehicle receives path information from a fleet controller, which has access to information collected from other autonomous vehicles, information about the autonomous vehicle, and any other information for informing a path selection. The flow continues at block 3404.

At block 3404, the autonomous vehicle determines whether a ride request is detected. In some embodiments, the ride request may be a pedestrian hailing (i.e., a person raising an arm, audibly calling, or otherwise communicating with the autonomous vehicle). The autonomous vehicle may detect the hailing via a camera, microphone, or other sensor. In some embodiments, the ride request is received directly from a mobile device via a low-power network, such as Wi-Fi, Bluetooth, etc. the flow continues at block 3406.

At block 3406, the autonomous vehicle determines a safe pickup location. Because the autonomous vehicle is moving along the path, it must stop at a safe location to pickup the passenger. In some embodiments, the autonomous vehicle maneuvers to a curb as soon as safely possible. In some instances, the autonomous vehicle locates (e.g., based on input provided by the ride requester) the ride requester, and its driving and guidance system maneuvers to a curb nearby the ride requester. The flow continues at block 3410.

At blocks 3410-3414, the autonomous vehicle picks up the passenger, determines a destination, proceeds to the destination, and drops off the passenger at the destination. From block 3414, the flow ends.

Tractor Utilizing Trailer-Mounted Guidance Components

Some embodiments enable autonomous tractors (or other suitable vehicles) to utilize guidance information received from trailers to determine a path taken by the autonomous tractor.

Figure 35:
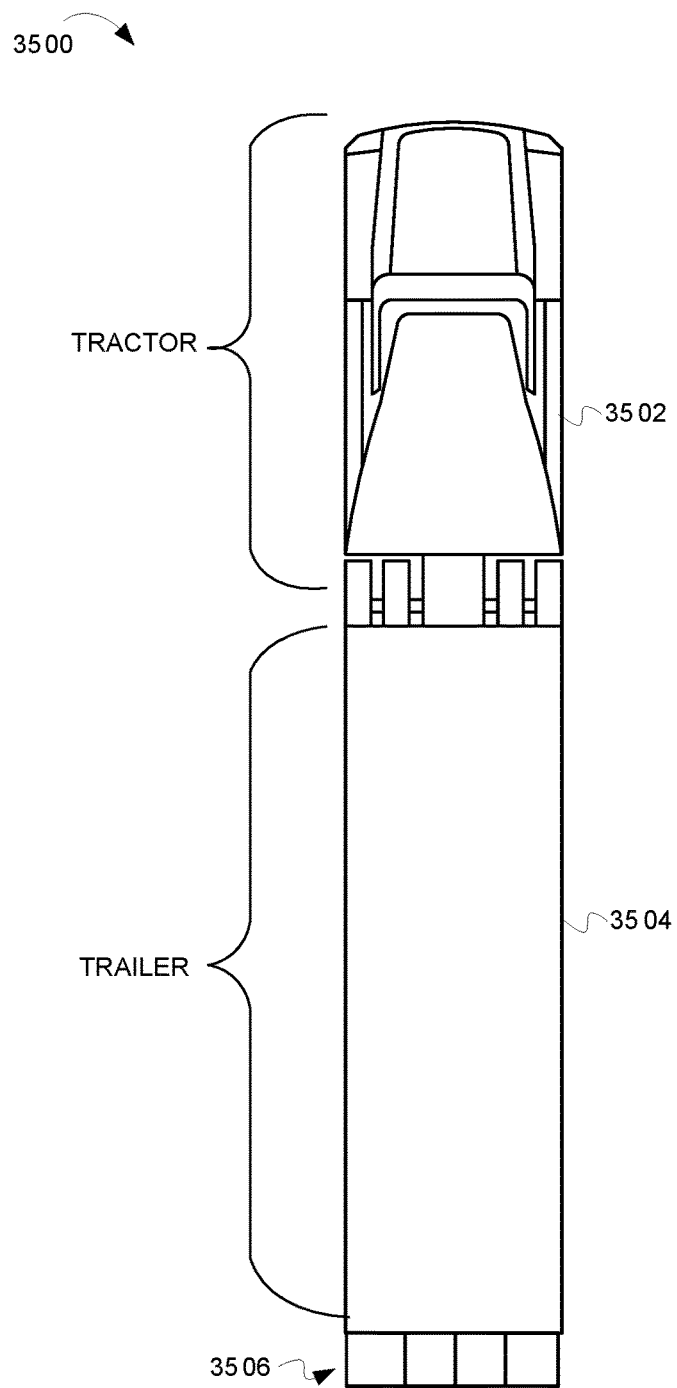
FIG. 35 is a perspective view of a trailer equipped with guidance components configured to provide guidance information to an autonomous tractor, according to some embodiments.

FIG. 35 is a perspective view of a trailer equipped with guidance components configured to provide guidance information to an autonomous tractor, according to some embodiments. As shown, an autonomous tractor 3502 is connected to a trailer 3504 including guidance components 3506. The guidance components 3506 can include lidar components, radar components, one or more cameras, and any other components suitable for providing guidance information to a tractor.

Figure 36:
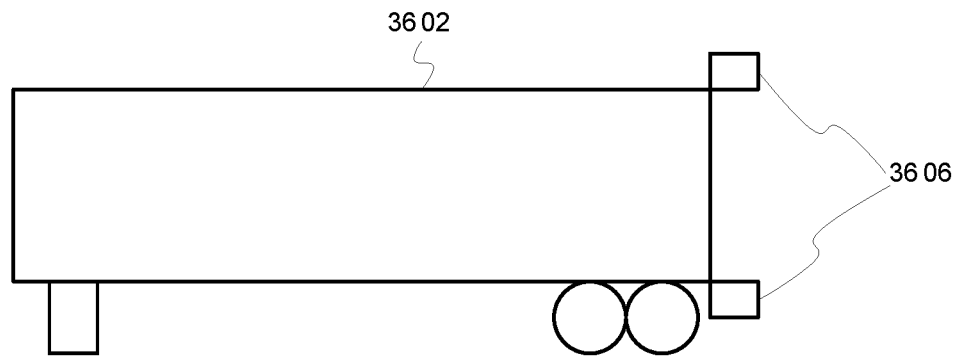
FIG. 36 is a side view of a trailer equipped with guidance components configured to provide guidance information to an autonomous tractor, according to some embodiments.

FIG. 36 is a side view of a trailer equipped with guidance components configured to provide guidance information to an autonomous tractor, according to some embodiments. As shown, a trailer 3602 includes guidance components 3606. As shown, the guidance components can be mounted on a rear-facing side of the trailer 3602. The guidance components 3606 may be mounted atop the trailer, on or below a bottom platform of the trailer, or any other suitable location. The guidance components 3606 can be mounted to face rearward and collect information that facilitates backup maneuvering.

Figure 37:
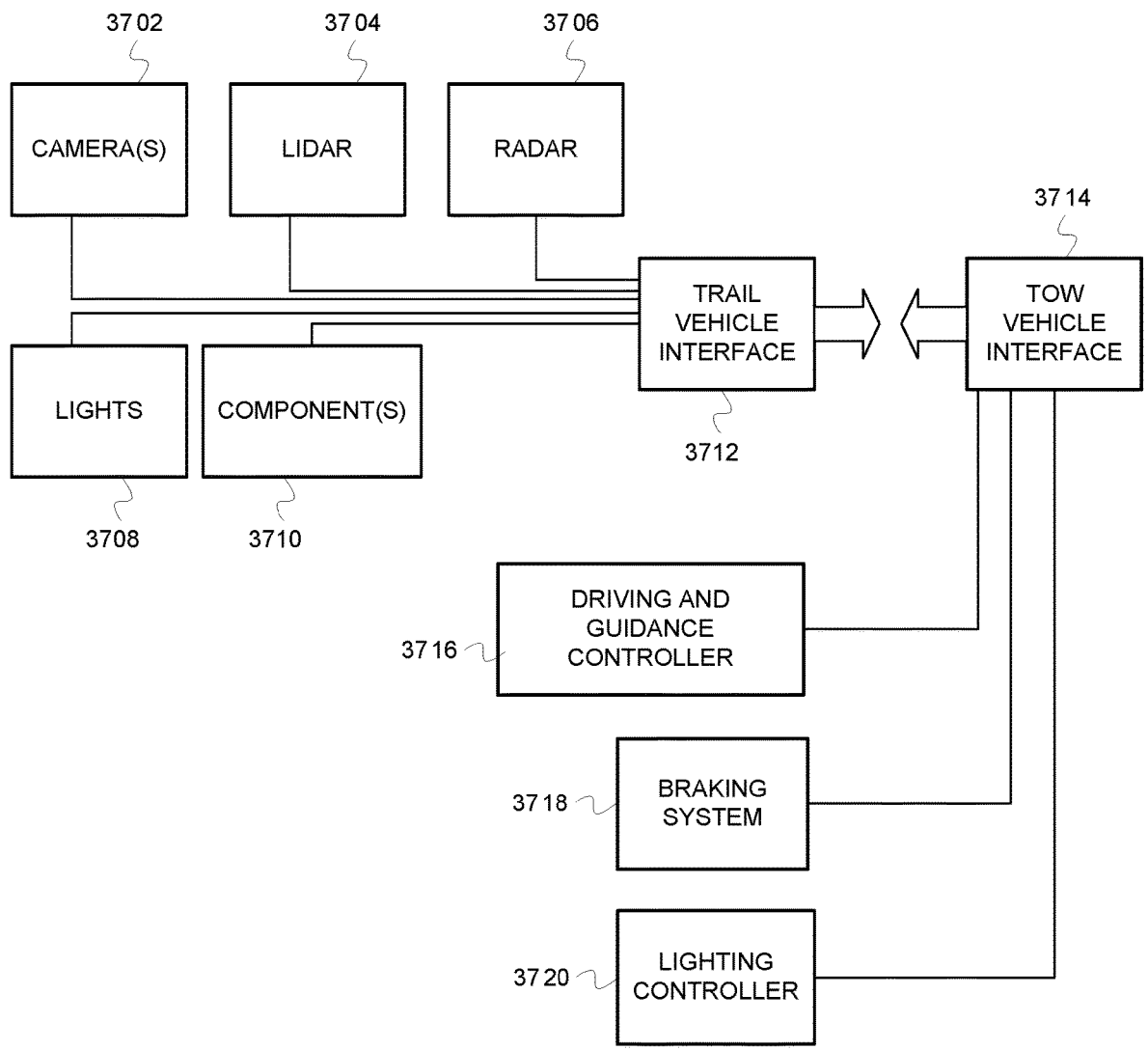
FIG. 37 is a block diagram illustrating guidance components of a trailer interfacing with components of an autonomous tractor, according to some embodiments.

FIG. 37 is a block diagram illustrating guidance components of a trailer interfacing with components of an autonomous tractor, according to some embodiments. A trailer can include one or more cameras 3702, lidar components 3704, radar components 3706, various lights 3708 (e.g., running lights, parking lights, brake lights, etc.), and other various components 3710 (e.g., breaking controllers, hydraulic controllers, refrigeration controllers, etc.). These components are connected to a trail vehicle interface 3712 that is configured to connect with a toe vehicle interface 3714. In some embodiments, the trailer components are connected to a wiring harness that terminates in the trail vehicle interface 3712. In some embodiments, the lights 3708 and components 3710 are not connected to the trail vehicle interface 3712. In some embodiments, the trailer guidance components may not include all of the camera(s) 3702, lidar 3704, and radar 3706. For example, the trailer guidance components may only include lidar 3704 or only a camera.

A tow vehicle (e.g., tractor) can include a tow vehicle interface 3714, which may be connected to a driving and guidance controller 3716, braking system 3718, and lighting controller 3720. The driving and guidance controller 3716 can receive information from the trailer guidance components (i.e., camera 3702, lidar 3704, and radar 3706) via the tow vehicle interface 3714.

In some embodiments, the trail vehicle interface 3712 can plug into the tow vehicle interface 3714, such as when a tractor hitches with a trailer. Some embodiments integrate wires for the trailer guidance components into standard wiring harnesses used for connecting trailers to tractors.

Although not shown, in some embodiments the trailer's camera 3702, lidar 3704, and radar 3706 are connected to a wireless transmitter that wirelessly transmits guidance information to a driving and guidance controller that is part of an autonomous tow vehicle.

In some embodiments, during a back-up maneuver a driving and guidance controller makes maneuvering decisions based on information received from the trailer guidance components instead of information received from guidance components included in the tow vehicle itself. Hence, some embodiments provide additional guidance components for use in maneuvering a tractor or other tow vehicle.

Figure 38:
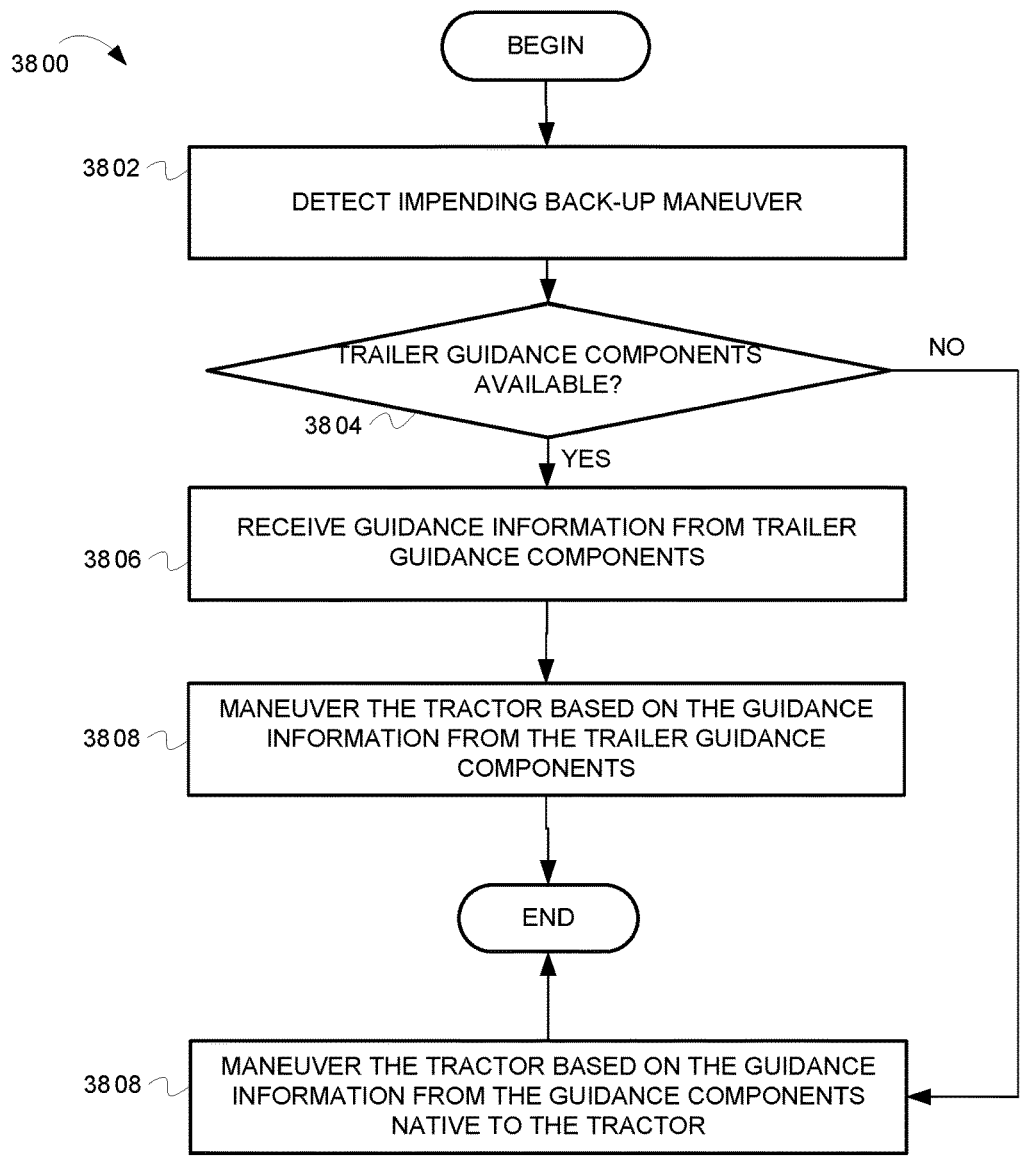
FIG. 38 is a flow diagram illustrating operations for a tractor processing guidance information received from guidance components mounted on a trailer, according to some embodiments.

FIG. 38 is a flow diagram illustrating operations for a tractor processing guidance information received from guidance components mounted on a trailer, according to some embodiments. As shown, FIG. 38 includes a flow 3800, which begins at block 3802.

At block 3802, a tractor's driving and guidance controller detects an impending backup maneuver. For example, the driving and guidance controller determines that it must propel the tractor backward (i.e., a direction which the trailer is the leading vehicle) based on a preprogrammed destination, dynamically determined destination, operator command, or any other suitable stimulus for the backup maneuver. Although FIG. 37 shows only the driving and guidance controller 3716, braking system 3718, and lighting controller 3720, some embodiments of the tractor can include one or more of the components shown in FIG. 2A. The flow continues at block 3804.

At block 3804, the tractor's driving and guidance controller determines whether trailer guidance components are available. In some embodiments, the driving and guidance controller can consult a device database to determine whether such devices are available. If trailer guidance components are available, the flow continues at block 3806. Otherwise, the flow continues at block 3810.

At block 3806, the tractor's driving and guidance controller receives guidance information from trailer guidance components. The trailer guidance information can include data from lidar sensors, cameras, radar, or other guidance components. In some embodiments, the guidance information is preprocessed by trailer components, and includes normalized guidance data on attributable to a particular guidance sensor. For example, the guidance information may indicate distance to an object, velocity of the object, or other suitable guidance information. The flow continues at block 3808.

At block 3808, the tractor's driving and guidance system maneuvers the tractor based on the guidance information from the trailer guidance components. From block 3808, the flow ends.

At block 3810, the tractor maneuvers based on guidance information from components native to the tractor. From block 3810, the flow ends.

Figure 39:
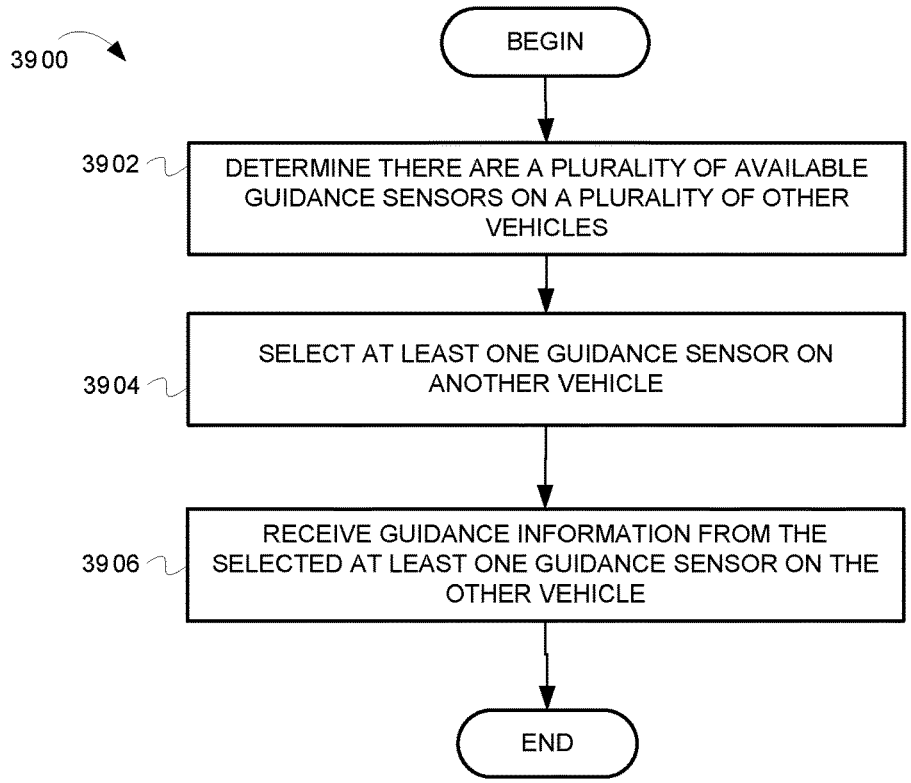
FIG. 39 is a flow diagram illustrating operations for selecting between guidance sensors on multiple vehicles, according to some embodiments.

FIG. 39 is a flow diagram illustrating operations for selecting between guidance sensors on multiple vehicles, according to some embodiments. In some embodiments, the vehicles include a tractor and trailer. In other embodiments, the vehicles include other remote vehicles. In FIG. 39, a flow 3900 begins at block 3902.

At block 3902, an autonomous vehicle's ride controller determines there are a plurality of available guidance system components from which to receive information. For example, a tractor may determine that there are guidance components on a connected trailer. Alternatively, any vehicle may determine that it can receive data from one or more other near-by vehicles. The flow continues at block 3904.

At block 3904, the ride controller selects one or more guidance sensors from which to receive guidance information. In some embodiments, a tractor selects guidance components of a trailer. In other embodiments, a vehicle selects another nearby vehicle. The flow continues at block 3906.

At block 3906, the autonomous vehicle's driving and guidance controller receives guidance information from the selected guidance sensors. The guidance information can include data from lidar sensors, cameras, radar, or other guidance components. In some embodiments, the guidance information is preprocessed by trailer components, and includes normalized guidance data on attributable to a particular guidance sensor. For example, the guidance information may indicate distance to an object, velocity of the object, or other suitable guidance information. From block 3906, the flow ends.

Drop-Off at Dynamically Updating Destination

Some embodiments enable autonomous vehicles to deliver cargo or passengers to a dynamically updating destination. For example, if a passenger wants to meet a friend whose location is changing, embodiments enable an autonomous vehicle to rendezvous with the friend. In some embodiments, the friend's mobile device indicates a location, and the autonomous vehicle maneuvers to the location. Similarly, some embodiments enable customers to receive delivery of items at dynamically changing locations.

Figure 40:
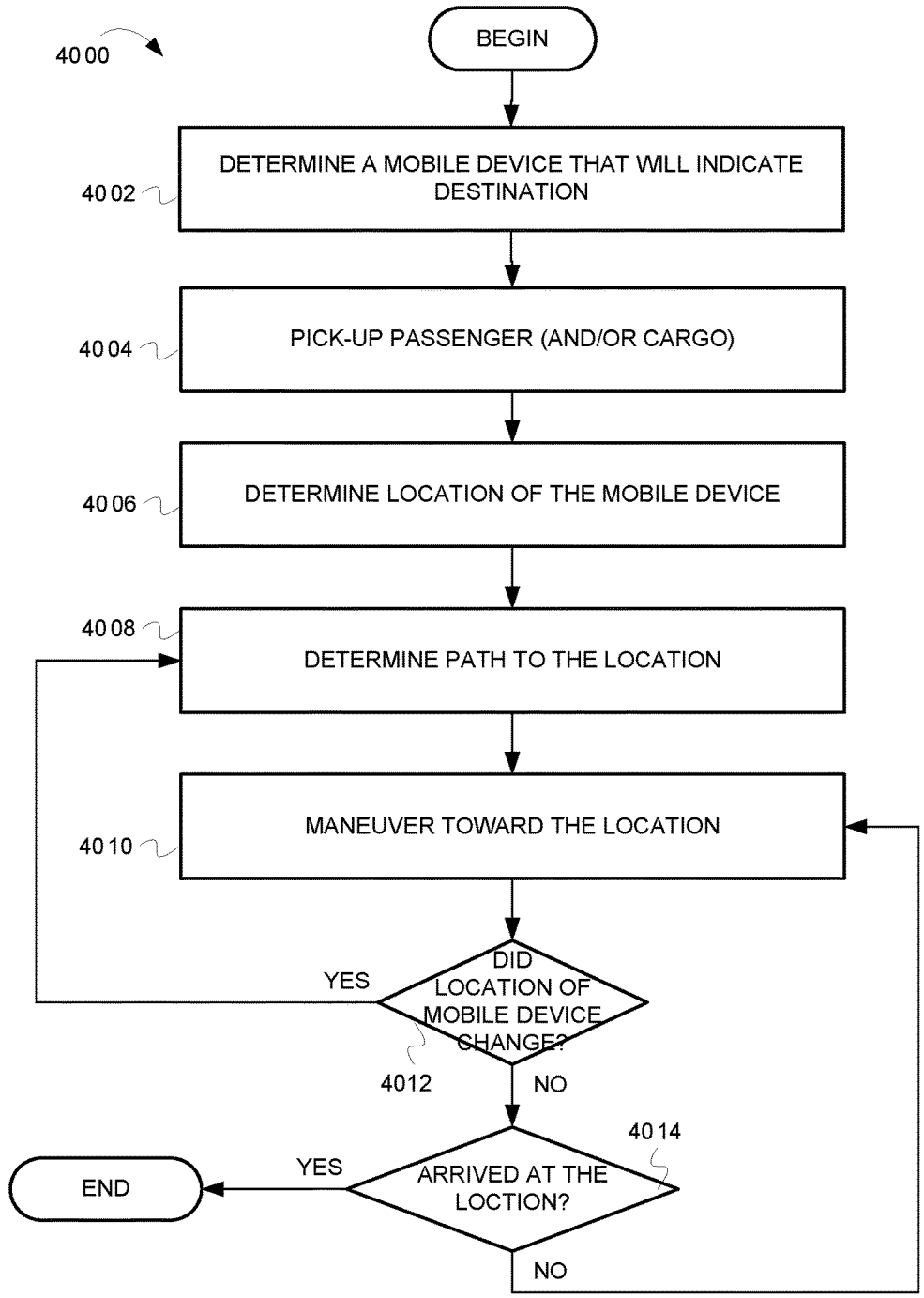
FIG. 40 is a flow diagram illustrating operations for delivering passengers (or cargo) to a dynamically changing location, according to some embodiments.

FIG. 40 is a flow diagram illustrating operations for delivering passengers (or cargo) to a dynamically changing location, according to some embodiments. In FIG. 40, a flow diagram 4000 begins at block 4002. At block 4002, an autonomous vehicle's ride controller determines a mobile device that will indicate a dynamically changing destination. As described above, a passenger of the vehicle may want to rendezvous with a friend. The friend's mobile device will provide location information to the autonomous vehicle. Hence, at 4002, the autonomous vehicle identifies the friend's mobile device as a source of location information. In some embodiments, the ride controller receives an address for the mobile device from a fleet controller, a ride service controller associated with the passenger, or other suitable remote component. In other embodiments, the ride controller need not identify a mobile device. Instead, the ride controller may dynamically receive a location without any knowledge of how it was determined or of the device from which it came. In such embodiments, the ride controller skips the operation at block 4002. The flow continues at block 4004.

At block 4004, the autonomous vehicle's ride controller causes the vehicle to pickup a passenger (or cargo). In some instances, the vehicle goes to a pickup location designated in a ride request. In other instances, the vehicle picks up a passenger (or cargo) by any other suitable method. The flow continues at block 4006.

At block 4006, the autonomous vehicle's ride controller determines a location of the mobile device identified during the operation of block 4002. The location may be indicated as latitude and longitude coordinates, a street address, or any other suitable method for indicating a location. In some embodiments, the ride controller receives a location indicating a destination for one or more passengers (or cargo) without communicating with any mobile device (e.g., received from a fleet controller). The flow continues at block 4008.

At block 4008, the ride controller determines a path to the location. In some embodiments, the ride controller utilizes the autonomous vehicle's navigation unit to determine a path from the vehicle's current location to the location indicated at block 4006. The navigation unit may employ any suitable path creation techniques that utilize predetermined roadmaps and GPS technology. The flow continues at block 4010.

At block 4010, the autonomous vehicle's driving and guidance system maneuvers the vehicle toward the location. The flow continues at block 4012.

At block 4012, the autonomous vehicle's ride controller determines whether the location has changed. That is, the ride controller determines whether the drop-off location (indicated at block 4006) has changed. If the drop-off location has not changed, the flow continues at block 4014. Otherwise, the flow continues at block 4008.

At block 4014, the ride controller determines whether the vehicle has arrived at the location. If the vehicle has arrived at the location, the flow ends. Otherwise, the flow continues at block 4010.

Autonomous Trailer

Some embodiments enable trailers to autonomously couple with tractors. For example, an autonomous tractor may autonomously backup to an autonomous trailer that is capable of automatically connecting to the tractor. FIGS. 35 and 36 show tractors and trailers that may be included in some embodiments.

Figure 41A:
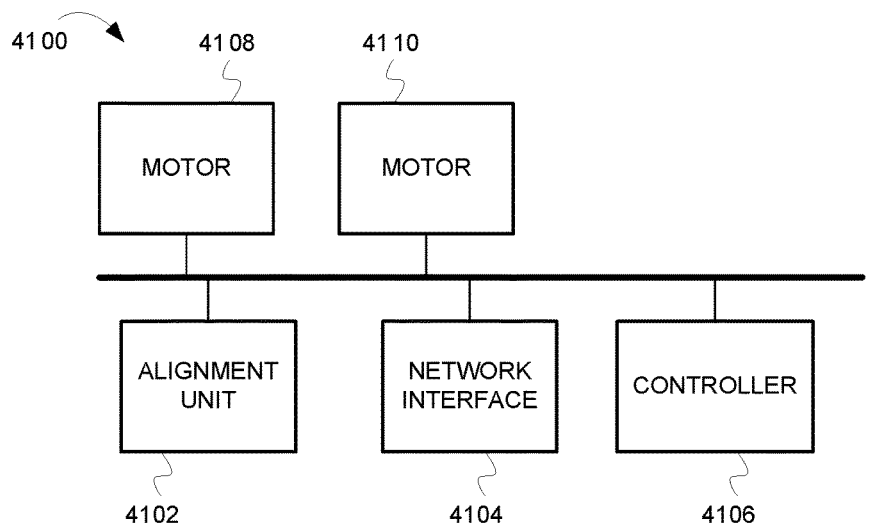
FIG. 41A is a block diagram depicting components of an autonomous trailer, according to some embodiments.

FIG. 41A is a block diagram depicting components of an autonomous trailer, according to some embodiments. As shown, an autonomous trailer 4100 includes a controller 4106, network interface 4104, alignment unit 4102, and motors 4108 & 4110. The controller 4106 can communicate with autonomous tractors and other remote components via the network interface 4104. Network interface 4104 can support any suitable wireless protocol, such as Wi-Fi, Bluetooth, 4G, LTE, etc. The alignment unit 4102 can include one or more cameras, lasers, sonar components, or lidar components. The alignment unit 4102 can be mounted on an autonomous trailer and determine whether the trailer is properly aligned to couple with a tractor. That is, the alignment unit 4102 can determine whether the trailer is in position to properly connect to a tractor. In some embodiments, the alignment unit 4102 utilizes one or more cameras and computer vision techniques to identify a tractor's trailer connection components. Upon identifying the trailer connection components and verifying proper alignment, the alignment unit 4102 can notify the controller 4106. The motors 4108 & 4110 can operate jacks that raise and lower the trailer onto a tractor. In some embodiments, only one motor is needed, while in other embodiments more than two motors are needed. The controller 4106 controls the motors 4108 & 4110. The controller 4106 also controls the alignment unit 4102.

Figure 41B:
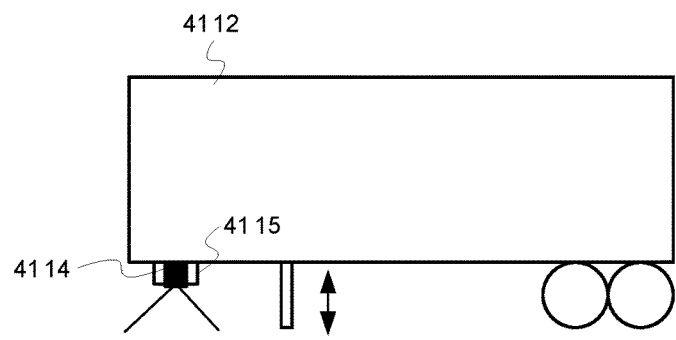
FIG. 41B is a block diagram illustrating an autonomous trailer, according to some embodiments.

FIG. 41B is a block diagram illustrating an autonomous trailer, according to some embodiments. In FIG. 41B, an autonomous trailer 4112 includes an alignment unit 4114 capable of determining whether a tractor is properly positioned to connect to the trailer. As shown, the alignment unit 4114 is disposed within a connector 4115 configured to couple the trailer 4112 with a tractor. In some embodiments, the alignment unit 4114 is not disposed within the connector.

Figure 41C:
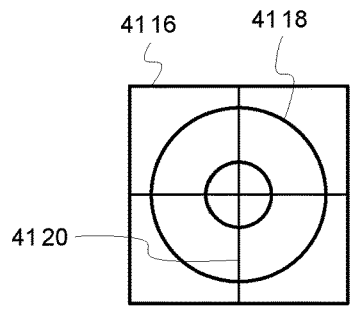
FIG. 41C is a block diagram illustrating a video frame captured by an alignment unit, according to some embodiments.

FIG. 41C is a block diagram illustrating a video frame captured by an alignment unit, according to some embodiments. As shown, a video frame 4116 includes a view from a tractor's connector 4118. The video frame 4116 also includes guidelines 4120 that indicate whether the tractor's connector 4118 is in position to connect with a trailer. The alignment unit can analyze the video frame to identify the tractor's connector 4118. After identifying the connector 4118, the alignment unit can determine the connector's position relative to the guidelines 4120. If the connector 4118 is within the frame 4116, and relatively close to centered on the guidelines 4120, the connector 4118 is in proper position for a connection. The connector 4118 can be any suitable shape and the positioning need not be center-frame. Irrespective of the connector shape, the alignment unit can recognize the connector and whether it is properly positioned within the fame.

Figure 42:
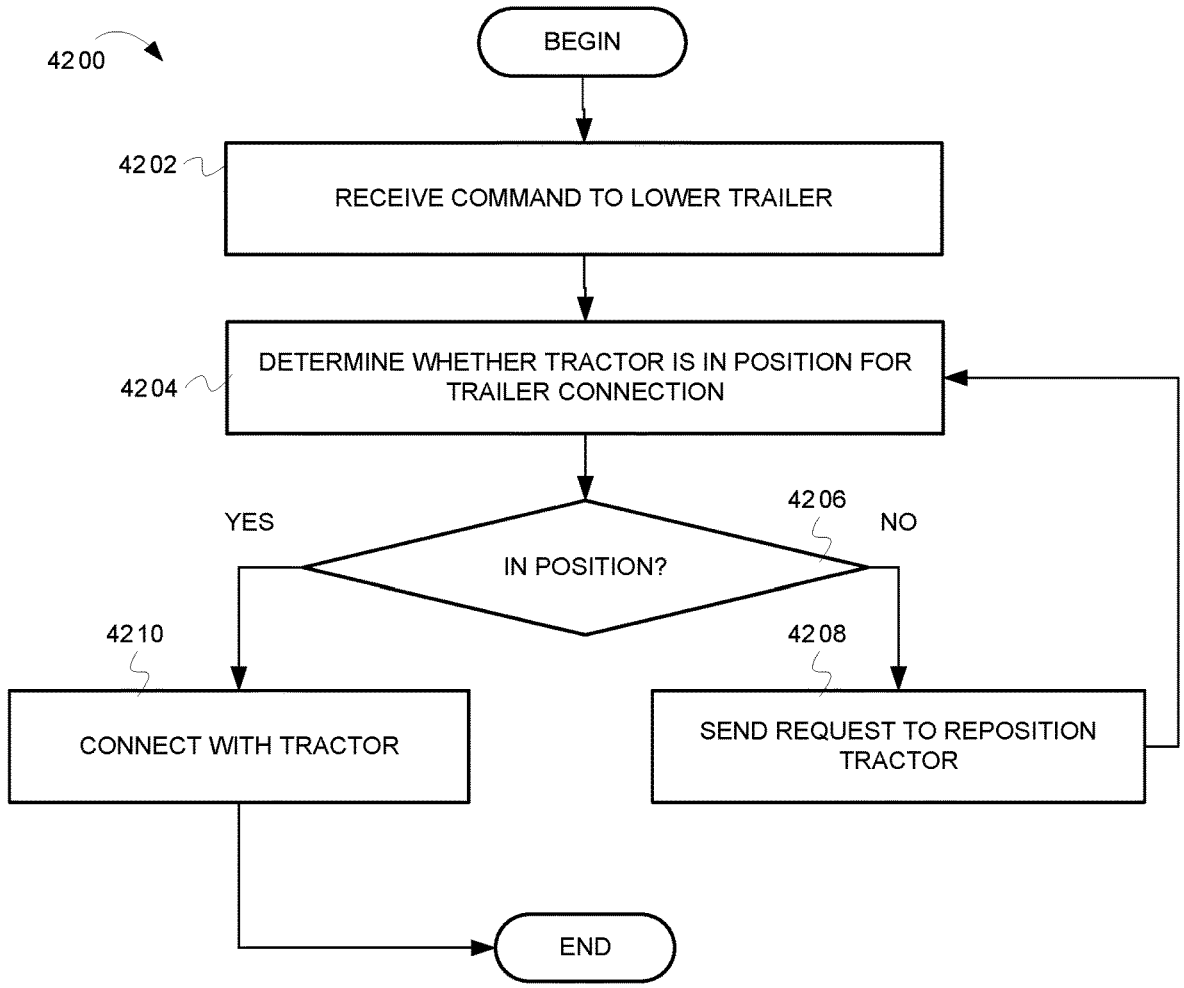
FIG. 42 is a flow diagram illustrating operations for connecting an autonomous trailer to a tractor, according to some embodiments.

FIG. 42 is a flow diagram illustrating operations for connecting an autonomous trailer to a tractor, according to some embodiments. In some instances, a tractor is an autonomous vehicle that automatically backs-up to an autonomous trailer. After positioning itself to connect with the trailer, the autonomous tractor sends to the trailer a command to connect to the tractor. At block 4202, an autonomous trailer's controller receives a command to lower the trailer onto the tractor. The flow continues at block 4204.

At block 4204, the trailer's alignment unit determines whether the tractor is in position to connect with the trailer. After receiving the command to lower the trailer (at block 4202), the trailer's controller employs the alignment unit to determine whether the tractor is in position for a proper connection. In some instances, the alignment unit utilizes a camera and image analysis components to identify the tractor's connection components. The alignment unit also determines whether the tractor's connection components are properly positioned for a connection (e.g., see discussion of FIG. 41C). If the tractor is in position, the flow continues at block 4210. If the trailer is not in position, the flow continues at 4208.

At block 4210, the trailer connects to the tractor. In some embodiments, to connect with the tractor, the trailer's controller controls one or more motors to lower the trailer onto the tractor's connection components. In some embodiments, the tractor and/or trailer include components that automatically secure the connection (e.g., latches, linchpins, safety chains, etc). From block 4210, the flow ends.

At block 4208, the trailer's controller sends a message to reposition the tractor. In some embodiments, the controller sends the message over a network interface. In some instances, the message indicates how the tractor should reposition itself, so its connector will be in proper position. For example, if the tractor's connector is left of center in a video frame analyzed by the trailer's alignment unit, the trailer's controller may notify the tractor to move its connector a given distance to the right. In some embodiments, the tractor is capable of determining maneuvers that will result in its connector being properly positioned. In some embodiments, the tractor repositions itself according to information received from the trailer.

Tractor Autonomously Backing-Up to Trailer

Some embodiments enable an autonomous vehicle to automatically back-up to a trailer. Some embodiments utilize a camera and image processing to position a tractor for connection to a trailer.

Figure 43A:
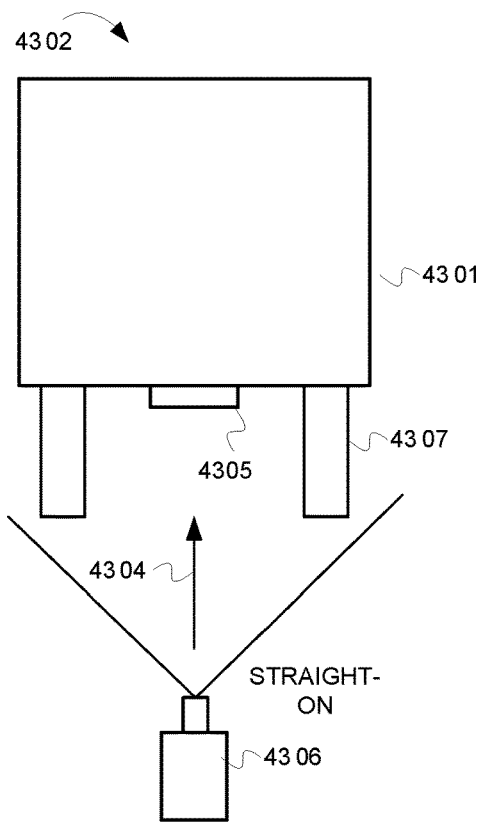
FIG. 43A is a diagrammatic illustration of a tractor-mounted alignment unit configured to guide back-up of a tractor, according to some embodiments.

FIG. 43A is a diagrammatic illustration of a tractor-mounted alignment unit configured to guide back-up of a tractor, according to some embodiments. As shown, an alignment unit 4306 is configured to guide back-up of a tractor (not shown) to a trailer 4302. Although not shown, the alignment unit 4306 is configured for mounting (in rearward-facing position) on an autonomous tractor and can include image processing components that facilitate autonomous back-up. The alignment unit 4306 may be mounted in any suitable rear-facing position on the tractor. The alignment unit 4306 includes one or more cameras configured to capture video of the trailer 4302. The alignment unit 4306 also includes video processing components that analyze captured video and determine information for maneuvering a tractor to connect with the trailer 4302. Some embodiments of the alignment unit 4306 process video frames to determine the trailer's orientation. After the alignment unit identifies the trailer's orientation, it can provide guidance information to the tractor's driving and guidance controller (or other components), which can use the guidance information to maneuver the tractor to connect to the trailer 4302.

In some embodiments, the alignment unit 4306 determines the trailer's orientation by processing images. The alignment unit 4306 can determine whether the trailer has a "straight-on" orientation, a left orientation, or a right orientation relative to the tractor. In FIG. 43A, the trailer 4203 has a straight-on orientation with its connection components 4305 exposed for use. In some embodiments, the alignment unit 4306 determines the orientation by processing one or more captured images to identify ends and sides of a trailer. In processing images, some embodiments of the alignment unit 4306 identify ends and sides of the trailer by identifying rectangular polygons of the box 4301 and other trailer components, such as a fifth wheel coupling 4305 and landing gear 4307.

In the orientation shown FIG. 43A, only one end of the trailer's box 4301 is visible. In some embodiments, if image processing reveals that only one relatively square polygon of the trailer's box 4301 appears in the image, the alignment unit 4306 determines that the trailer is in a straight-on orientation. Some embodiments may determine that other conditions must be satisfied before concluding the trailer is in straight-on orientation. For example, in addition to only one rectangular polygon of the trailer box, some embodiments may also want to identify the fifth wheel coupling and landing gear directly below the rectangular polygon. Some embodiments associate these components with polygons or other shapes that are identifiable via image processing. Also, some embodiments may have size parameters relative to the single rectangular polygon to avoid confusing a straight-on orientation with a side view of the trailer. After determining the trailer 4302 is in a straight-on orientation relative to the tractor, the alignment unit 4306 can provide guidance information used for maneuvering the tractor straight back to the trailer 4302 (see arrow 4304). After maneuvering straight back, the tractor can connect to the trailer.

Figure 43B:
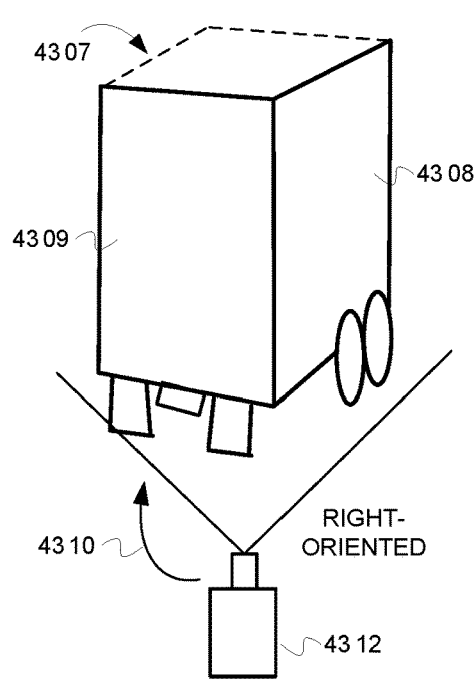
FIG. 43B is a diagrammatic illustration of a tractor-mounted alignment unit configured to guide back-up of a tractor, according to some embodiments.

FIG. 43B is a diagrammatic illustration of a tractor-mounted alignment unit configured to guide back-up of a tractor, according to some embodiments. FIG. 43B shows an alignment unit 4312 configured to mount on a tractor in a rearward-facing position. The alignment unit 4312 can determine an orientation of a trailer 4307 and provide information for guiding a tractor (not shown) to connect with the trailer 4307. In FIG. 43B, the trailer 4307 is in a right-oriented position relative to a tractor (not shown). A trailer is right-oriented relative to the tractor when, from the alignment unit's perspective, the trailer's front end and a side of the trailer's box are visible in a captured frame. A captured fame depicting the right-oriented trailer 4307 of FIG. 43B includes two rectangular polygons (4309 and 4308) that make-up the trailer's box. The polygon associated with the landing gear and fifth wheel coupling identify an end of the trailer 4307. Some embodiments recognize wheels (circles), where wheels appearing with a polygon indicate a side of the trailer 4307. In a rightward orientation, the visible trailer side appears rightward of the trailer's front end. To autonomously back-up to a right-oriented trailer, the tractor should perform a clock-wise maneuver to align relatively straight-on with the trailer (see arrow 4310). The alignment unit 4312 can provide guidance information to the tractor's driving and guidance controller, so it can perform the clockwise maneuver and connect to the trailer 4307.

Some embodiments of the alignment unit can determine a path (e.g., a path for the clockwise maneuver) that will result the tractor positioned to connect with the trailer. This determination (e.g., facilitated by image processing) may be based on determined distances between tractor components and trailer components, orientation of the trailer relative to the tractor, and tractor maneuverability (e.g., size, steerability, steering radius, etc.). The tractor can maneuver according to the path. In some embodiments, the tractor's driving and guidance controller determines the path based on information received from the alignment unit.

Figure 43C:
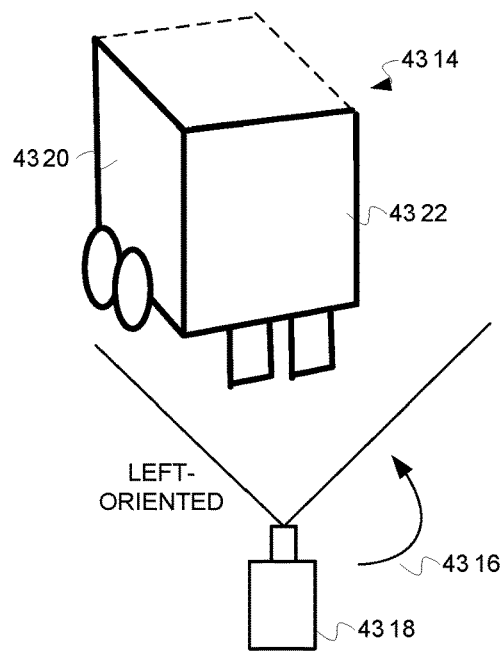
FIG. 43C is a diagrammatic illustration of a tractor-mounted alignment unit configured to guide back-up of a tractor, according to some embodiments.

FIG. 43C is a diagrammatic illustration of a tractor-mounted alignment unit configured to guide back-up of a tractor, according to some embodiments. In FIG. 43C, the trailer 4307 is in a left-oriented position relative to a tractor (not shown). A trailer is left-oriented relative to the tractor when, from the alignment unit's perspective (see alignment unit 4318), the trailer's front end and a side of the trailer's box are visible in a captured frame. A captured fame depicting the left-oriented trailer 4314 of FIG. 43C includes two rectangular polygons (4320 and 4322) that make-up the trailer's box. The polygon associated with the landing gear and fifth wheel coupling identify the trailer's front end 4322. Some embodiments recognize wheels (circles), where wheels appearing with a polygon indicate a side of the trailer 4314. In a leftward orientation, the visible trailer side appears leftward of the trailer's front end (from the alignment unit's perspective). To autonomously back-up to a left-oriented trailer, the tractor should perform a counterclockwise maneuver (see arrow 4316) to align relatively straight-on with the trailer (see arrow 4310). The alignment unit 4318 can provide guidance information to the tractor's driving and guidance controller, so it can perform the counterclockwise maneuver and connect to the trailer 4314.

Figure 44:
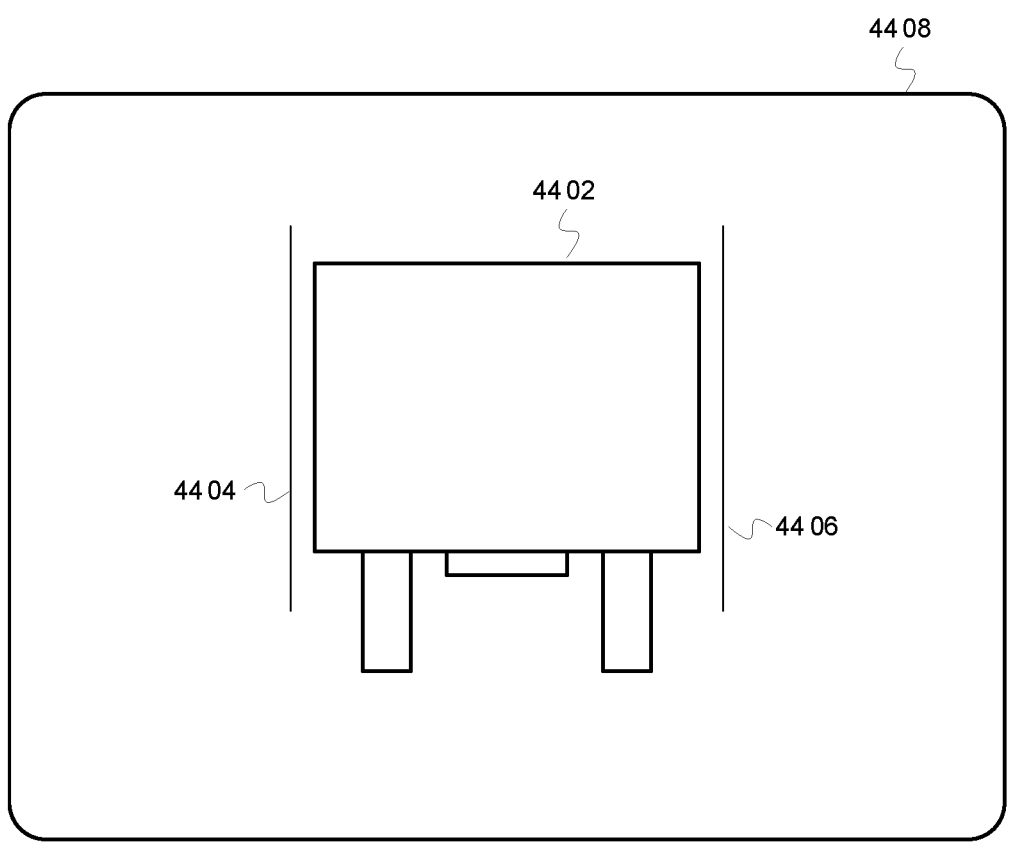
FIG. 44 is a diagrammatic illustration of an image frame captured by an alignment unit, according to some embodiments.

FIG. 44 is a diagrammatic illustration of an image frame captured by an alignment unit, according to some embodiments. As shown, the image frame 4408 shows a trailer 4402 in a straight-on orientation. In some embodiments, the alignment unit determines guidelines 4406 in which the tractor must keep the trailer 4402 during a backing maneuver. As noted, for a trailer in a straight-on orientation, the tractor can connect by maneuvering straight back to the trailer. If the trailer maneuvers such that the trailer 4402 is not depicted inside the guidelines 4404, the alignment unit can provide guidance information identifying a path that will result in positioning the tractor for a connection with the trailer 4402. When the tractor is progressing on a path to be in position to connect with the trailer 4402, the trailer will be inside the guidelines 4406. In some embodiments, the image frame 4408 is not presented for viewing. In some embodiments, the image frame 4408 is presented for viewing.

Figure 45:
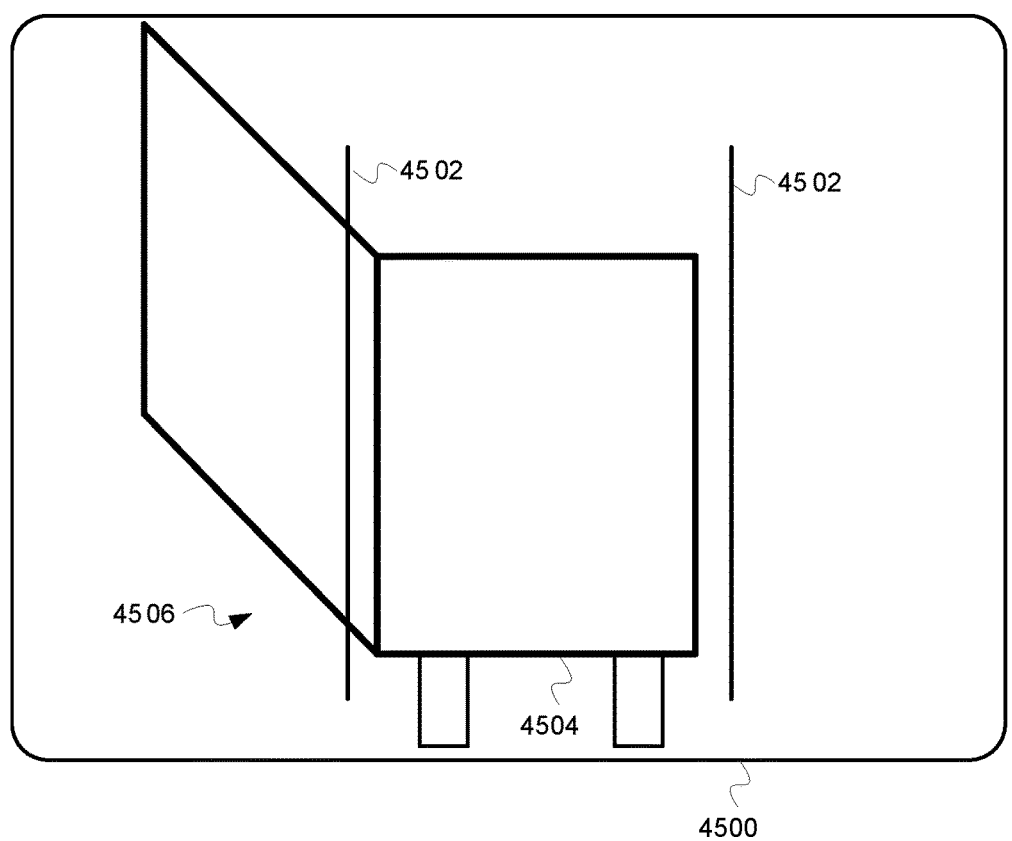
FIG. 45 is a diagrammatic illustration of an image frame captured by an alignment unit, according to some embodiments.

FIG. 45 is a diagrammatic illustration of an image frame captured by an alignment unit, according to some embodiments. As shown, the image frame 4500 shows a trailer 4506 in a left orientation. In some embodiments, the alignment unit determines guidelines 4502 in which the tractor must keep the trailer 4506 during a backing maneuver. Because the trailer is left-oriented, the trailer is not contained within the guidelines 4502. The tractor can perform a counterclockwise maneuver to reposition itself such that the trailer 4506 is in a straight-on orientation relative to the tractor (see discussion above). After the trailer is in a straight-on orientation relative to the tractor, the tractor can connect by maneuvering straight back to the trailer.

Figure 46:
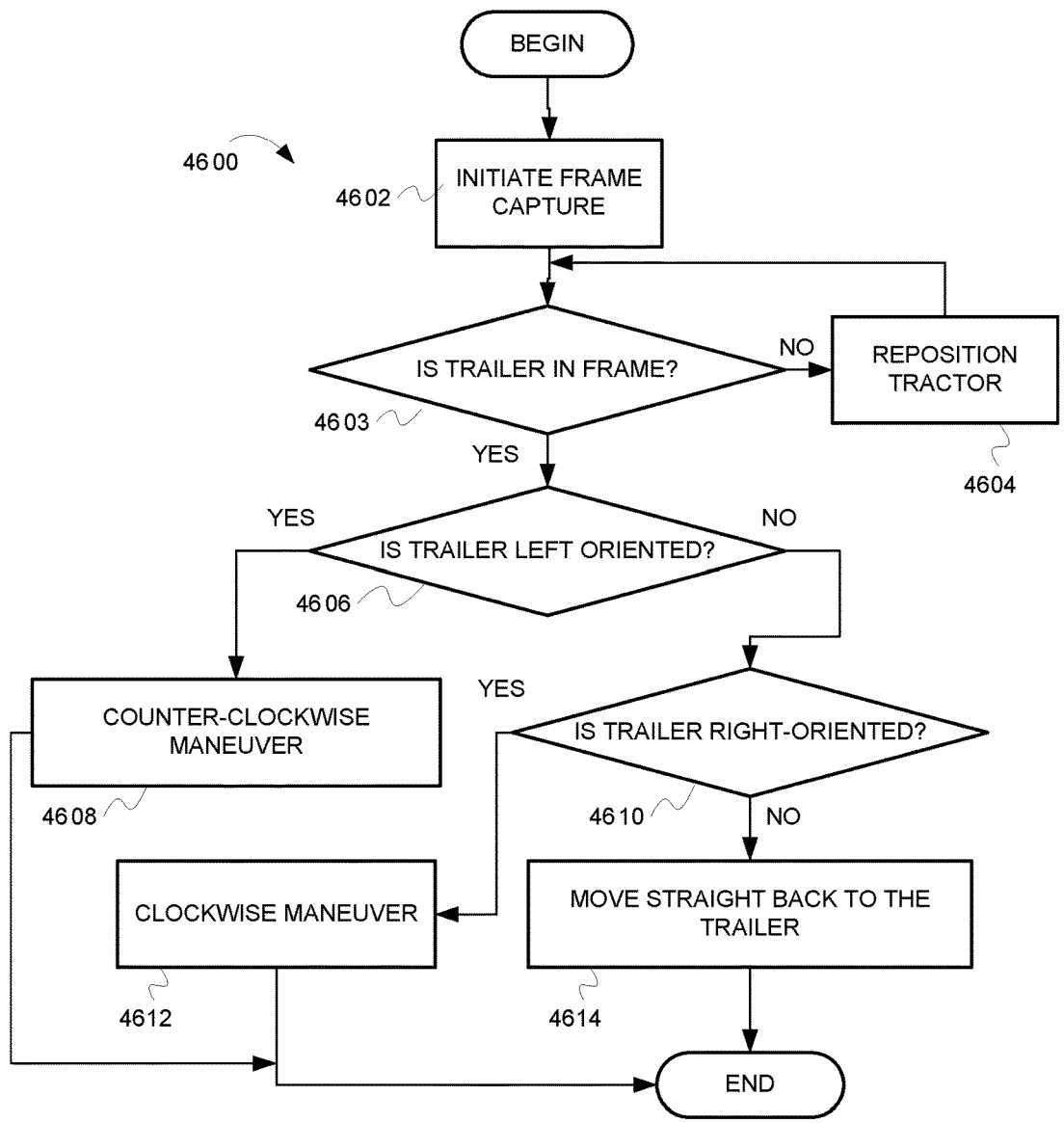
FIG. 46 is a flow diagram illustrating operations for autonomously positioning a tractor to connect with the trailer, according to some embodiments.

FIG. 46 is a flow diagram illustrating operations for autonomously positioning a tractor to connect with the trailer, according to some embodiments. In FIG. 46, a flow 4600 begins at block 4602. At block 4602, a tractor's alignment unit initiates frame capture. That is, a rear-facing tractor-mounted alignment unit begins capturing frames to be processed according to operations shown in the flow 4600. The flow continues at block 4603.

At block 4603, the alignment unit determines whether a trailer is in a captured frame. The alignment unit employs image processing to detect polygons associated with trailer components, such as sides of the trailer's box, landing gear, fifth wheel coupling, etc. If the trailer is in a captured frame, the flow continues at block 4606. If not, the flow continues at block 4604.

At block 4604, because the trailer is not in a captured frame, the tractor repositions itself. The flow continues at block 4603.

At block 4606, after determining that the trailer is within a captured frame, the alignment unit determines whether the trailer is left oriented. If the trailer is left oriented, the flow continues at block 4608. If not, the flow continues at block 4610.

At block 4608, because the trailer is left oriented, the tractor performs a counterclockwise maneuver to position itself for a connection with the trailer. From block 4608, the flow ends.

At block 4610, the alignment unit determines whether the trailer is right oriented. If the trailer is right oriented, the flow continues at 4612. If not, the flow continues at 4614.

At block 4612, the tractor performs a clockwise maneuver. The tractor's driving and guidance unit performs a clockwise maneuver based on information provided by the alignment unit. The clockwise maneuver moves the tractor along a clockwise arc to reposition the tractor for connecting to the trailer.

At block 4614, the tractor moves straight back to the trailer. The tractor's driving and guidance unit can control the straight back maneuver. In some embodiments, during the straight back maneuver, the driving and guidance unit utilizes information from the alignment unit. For example, during maneuvers, the alignment unit may perform image processing to verify the tractor is between guidelines (see discussion above) and provide guidance information to the driving and guidance controller (or other components).

Although FIG. 46 shows the flow ending after performance of counterclockwise and clockwise maneuvers, some embodiments do not end after these maneuvers. Instead, some embodiments loop back to the 4603 and perform additional operations. For example, after performing counterclockwise or clockwise maneuvers, some embodiments determine the trailer is in a straight-on orientation and maneuver straight back to the trailer.

Although this section refers to a tractor connecting to a trailer, embodiments contemplate any autonomous vehicle connecting to a trailer. Therefore, some embodiments include vehicles that are not necessarily categorized as tractors, but that are capable of connecting trailers.

Applicability to Stand-Alone Autonomous Vehicles

In some embodiments, the operations described herein may be performed by stand-alone autonomous vehicles that are not part of a ride-provision service. For example, an autonomous vehicle owned by a private person may perform any of the functions described herein. For example, a ride service controller may be a component (e.g., a mobile application) configured to interact with an autonomous vehicle that is not part of a greater ride-provisioning platform In some instances, the ride service controller serves as a input means by which a vehicle operator interacts with an autonomous vehicle (e.g., to input turn-by-turn route instructions) irrespective of other external systems with which the autonomous vehicle may communicate. Functionality such as secure ride pick-up/drop-off, specific pick-up/drop-off locations, ride coordination for events, remote inputs (non-passenger) affecting vehicle state, configuring vehicle parameters based on history and information from other vehicles, safe drop-off, marker-assisted path determination, etc. may be performed by privately-owned autonomous vehicles that are not part of a ride-provisioning platform. In some embodiments, the ride service controller and autonomous vehicle can interact with external systems to request service.

Additional Discussion

Autonomous wheel-based terrain vehicles include automobiles, semi-tractor trailers, two-wheeled vehicles (e.g., motorcycles, Segways®, Hoverboards®, etc.), three-wheeled vehicles (e.g., Can-Am® three-wheeled vehicles, wheel chair scooters, etc.), and multi-wheel vehicles (e.g., trains), tracked vehicles (e.g., bulldozers, tanks, etc.). Autonomous watercraft can include boats, personal watercraft, submersibles, etc. Autonomous hovercraft can include multi-propeller vehicles (commonly referred to drones). Autonomous aircraft can include planes, helicopters, multi-propeller aircraft (commonly referred to as drones).

As will be appreciated by one skilled in the art, aspects of the present inventive subject matter may be embodied as a system, method or computer program product.

Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable storage medium does not include computer readable signal media (described below).

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer program code for carrying out operations (e.g., operations described with respect to the flow diagrams) for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. Operations represented in the operational flow diagrams and/or block diagrams can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagrams and/or block diagrams.

These computer program instructions may also be stored in a computer readable medium that can direct a computer, other programmable data processing apparatus, or other devices to function in a particular manner, such that the instructions stored in the computer readable medium produce an article of manufacture including instructions which implement one or more functions/acts specified in any flow diagram and/or block diagram.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in any flow diagram and/or block diagram.

The flow diagrams and block diagrams in the Figures illustrate the architecture, functionality, and operation of possible implementations of systems, methods, and computer program products according to various embodiments. In this regard, each operation in any flow diagram or block in any block diagram may represent a module, segment, or portion of instructions, which comprises one or more executable instructions for implementing the specified logical function(s). In some alternative implementations, the functions noted in any operational flow diagram may occur out of the order noted in the Figures. For example, two operations shown in succession may, in fact, be executed substantially concurrently, or the blocks may sometimes be executed in the reverse order, depending upon the functionality involved. It will also be noted that each block of the block diagrams and/or operational flow illustration, and combinations of blocks in the block diagrams and/or flow illustrations, can be implemented by special purpose hardware-based systems that perform the specified functions or acts or carry out combinations of special purpose hardware and computer instructions.

As noted above, in some embodiments, the operations shown in the Figures may be performed by different components. For example, in some embodiments, the autonomous vehicle and ride service controller can operate as peers without any fleet controller. In these embodiments, operations performed by the fleet controller are either omitted (e.g., forwarding operations) or performed by the peers. Furthermore, some embodiments may omit certain operations, such as authentication and value provision. However, other embodiments may omit certain operations. Furthermore, all components shown in a Figure need not be present to constitute an embodiment of the inventive subject matter. For example, an embodiment may include only components (or operations performed by) the autonomous vehicle without other external components (or operation) such as the ride service controller and fleet controller. In some instances, when operations and capabilities are incorporated into different components (not shown in the drawings), information (e.g., results, messages, etc.) is communicated between components in ways that are not necessary in other implementations. In some implementations, capabilities can be moved between ride service controllers, fleet controllers, and autonomous vehicles, or can be incorporated in components not shown herein. As a result, the operational flows discussed herein can be modified to move operations to different components. In so doing, embodiments may include additional communications that are not shown in the figures or discussed in the description. Such communications can include result forwarding, communication forwarding, etc. Furthermore, moving capabilities between components can result in fewer communications than shown in the drawings. For example, moving communications may eliminate the need to forward results between components.

Although this description mentions operations for maneuvering or otherwise driving autonomous vehicles, some embodiments do not perform those operations, as those embodiments provide functionality exclusive of such maneuvering/driving. That is, some embodiments may rely on, exchange data with, and otherwise cooperate with driving and guidance components, but not include those components. For these certain embodiments, in the operational flows described herein, operations for maneuvering the vehicle are not included in these certain embodiments, but represented in the flows for contextual completeness. However, for other embodiments, components and operations for maneuvering and driving are included in such embodiments.

The invention claimed is:

1. A method for an autonomous vehicle obtaining services, the method comprising:
   determining, by an autonomous vehicle, that the autonomous vehicle needs a service;
   transmitting, over a wireless network by the autonomous vehicle, a request for the service to a fleet controller;
   receiving, by the fleet controller, the request for the service;
   determining, by the fleet controller, a meeting location at which the service will be provided;
   transmitting, by the fleet controller, the meeting location and the service request to the autonomous vehicle and to a plurality of electronic devices each associated with one of a plurality of service providers;
   presenting, by an electronic device of the plurality of electronic devices, the service request in a graphical user interface (GUI);
   detecting, by the electronic device, an indication that a service provider of the plurality of service providers has accepted the service request;
   transmitting, by the electronic device over the wireless network, a service acknowledgment indicating the service request was accepted by the service provider;
   receiving, by the fleet controller, the service acknowledgment;
   transmitting, by the fleet controller, an authentication code to the electronic device;
   receiving, by the electronic device, the authentication code;
   maneuvering, by the autonomous vehicle, to the meeting location;
   requesting, over a local area network, the authentication code from the electronic device;
   enabling, by the autonomous vehicle, access to components of the autonomous vehicle;
   transmitting, by the electronic device over the wireless network, a service status indicator indicating status of the service;
   receiving, by the fleet controller, the service status indicator;
   transmitting, by the fleet controller over the wireless network, the service status indicator to the autonomous vehicle;
   receiving, by the autonomous vehicle, the service status indicator;
   querying, by the autonomous vehicle, sensor information associated with the service;
   determining, by the autonomous vehicle, that the sensor information is consistent with the service status indicator;
   transmitting, by the autonomous vehicle over the wireless network, an indication that the service is complete;
   receiving, by the fleet controller the indication that the service is complete; and
   providing, by the fleet controller, value to the service provider.

2. The method of claim 1, wherein the sensor information indicates a level of fuel in the autonomous vehicle.

3. The method of claim 1, wherein the meeting location is a gas station.

4. The method of claim 1, wherein the service status indicator indicates at least one of a quantity of fuel provided to the autonomous vehicle, volume of fluids added to the autonomous vehicle, and indication that the service is complete.

5. The method of claim 1, wherein the providing value to the service provider includes transferring monetary value to an account associated with the service provider.

6. One or more non-transitory computer-readable storage mediums including computer-executable program code that, when executed by one or more processors, causes at least one of the processors to perform operations for enabling autonomous vehicles to obtain service, the computer executable program code comprising:
   program code to determine, by an autonomous vehicle, that the autonomous vehicle needs a service to a fleet controller;
   program code to transmit, over a wireless network by the autonomous vehicle, a request for the service;
   program code to receive, by the fleet controller, the request for the service;
   program code to determine, by the fleet controller, a meeting location at which the service will be provided;
   program code to transmit, by the fleet controller, the meeting location and the service request to the autonomous vehicle and to a plurality of electronic devices each associated with one of a plurality of service providers;
   program code to present, by an electronic device of the plurality of electronic devices, the service request in a graphical user interface (GUI);
   program code to detect, by the electronic device, an indication that a service provider of the plurality of service providers has accepted the service request;
   program code to transmit, by the electronic device over the wireless network, a service acknowledgment indicating the service request was accepted by the service provider;
   program code to receive, by the fleet controller, the service acknowledgment;

program code to transmit, by the fleet controller, an authentication code to the electronic device;
program code to receive, by the electronic device, the authentication code;
program code to maneuver, by the autonomous vehicle, to the meeting location;
program code to request, over a local area network, the authentication code from the electronic device;
program code to enable, by the autonomous vehicle, access to components of the autonomous vehicle;
program code to transmit, by the electronic device over the wireless network, a service status indicator indicating status of the service;
program code to receive, by the fleet controller, the service status indicator;
program code to transmit, by the fleet controller over the wireless network, the service status indicator to the autonomous vehicle;
program code to receive, by the autonomous vehicle, the service status indicator;
program code to query, by the autonomous vehicle, sensor information associated with the service;
program code to determine, by the autonomous vehicle, that the sensor information is consistent with the service status indicator;
program code to transmit, by the autonomous vehicle over the wireless network, an indication that the service is complete;
program code to receive, by the fleet controller the indication that the service is complete; and
program code to provide, by the fleet controller, value to the service provider.

7. The one or more non-transitory computer-readable storage mediums of claim 6, wherein the sensor information indicates a level of fuel in the autonomous vehicle.

8. The one or more non-transitory computer-readable storage mediums of claim 6, wherein the meeting location is a gas station.

9. The one or more non-transitory computer-readable storage mediums of claim 6, wherein the service status indicator indicates at least one of a quantity of fuel provided to the autonomous vehicle, volume of fluids added to the autonomous vehicle, and indication that the service is complete.

10. The one or more non-transitory computer-readable storage mediums of claim 6, wherein the program code to provide value to the service provider includes transferring monetary value to an account associated with the service provider.

* * * * *